US012567221B2

(12) United States Patent
Gerth et al.

(10) Patent No.: US 12,567,221 B2
(45) Date of Patent: Mar. 3, 2026

(54) DETERMINING A PREPARATION SURFACE

(71) Applicant: EXOCAD GMBH, Darmstadt (DE)

(72) Inventors: Maik Gerth, Seeheim-Jugenheim (DE); Esther Moll, Warthausen (DE)

(73) Assignee: EXOCAD GMBH, Darmstadt (DE)

( * ) Notice: Subject to any disclaimer, the term of this patent is extended or adjusted under 35 U.S.C. 154(b) by 192 days.

(21) Appl. No.: 18/120,869

(22) Filed: Mar. 13, 2023

(65) Prior Publication Data

US 2024/0312165 A1     Sep. 19, 2024

(51) Int. Cl.
*G06T 19/20*          (2011.01)
*A61C 13/34*          (2006.01)

(52) U.S. Cl.
CPC .............. *G06T 19/20* (2013.01); *A61C 13/34* (2013.01); *G06T 2219/2004* (2013.01); *G06T 2219/2021* (2013.01)

(58) Field of Classification Search
CPC .............. G06T 19/20; G06T 2219/2004; G06T 2219/2021; A61C 13/34
See application file for complete search history.

(56) References Cited

U.S. PATENT DOCUMENTS

| | | | | |
|---|---|---|---|---|
| 12,167,951 B1 * | 12/2024 | Bram | ........................ | A61C 3/02 |
| 2014/0335470 A1 * | 11/2014 | Fisker | ..................... | G06F 30/00 |
| | | | | 700/98 |
| 2018/0368952 A1 * | 12/2018 | Chou | ...................... | A61C 19/05 |
| 2020/0390522 A1 * | 12/2020 | Pokotilov | .............. | A61C 7/002 |
| 2021/0169607 A1 * | 6/2021 | Fisker | ...................... | G16B 5/00 |
| 2022/0183789 A1 * | 6/2022 | Ciriello | ................ | A61B 5/0088 |
| 2023/0162457 A1 * | 5/2023 | Hansen | .................. | A61C 9/004 |
| | | | | 345/420 |
| 2023/0263591 A1 * | 8/2023 | Fares | ...................... | A61C 1/082 |
| | | | | 433/226 |
| 2024/0177397 A1 * | 5/2024 | Li | ......................... | A61C 9/0053 |

* cited by examiner

*Primary Examiner* — Yu Chen

(74) *Attorney, Agent, or Firm* — PERRY + CURRIER INC.

(57) ABSTRACT

The invention relates to a method for determining a preparation surface of a tooth for preparing the tooth for receiving a dental restoration element. The method comprises receiving a three-dimensional digital tooth model, a three-dimensional digital restorative tooth model, a definition of a restoration area, a first value selected for a basic preparation depth of the preparation, and a second value selected for a restoration thickness of the dental restoration element. The method further comprises determining a first reference surface using the selected first value, determining a second reference surface using the selected second value, determining one or more preparation reference surface sections using the first and second reference surface, and determining the preparation surface of the tooth using the determined one or more preparation reference surface sections.

23 Claims, 41 Drawing Sheets

| Receiving 3D digital tooth model | 200 |
| Receiving 3D digital restorative tooth model | 206 |
| Receiving definition of restoration area | 208 |
| Receiving selected first value | 210 |
| Receiving selected second value | 212 |
| Determining first reference surface | 216 |
| Determining second reference surface | 218 |
| Determining preparation reference surface sections | 220 |
| Determining preparation surface | 222 |

| Receiving 3D digital tooth model | 200 |
| Receiving 3D digital restorative tooth model | 206 |
| Receiving definition of restoration area | 208 |
| Receiving selected first value | 210 |
| Receiving selected second value | 212 |
| Receiving selected third value | 214 |
| Determining first reference surface | 216 |
| Determining second reference surface | 218 |

| Determining preparation reference surface sections | 220 |
| Determining preparation surface | 222 |
| Determining third reference surface | 224 |
| Determining restoration reference surface sections | 226 |
| Determining restoration surface | 228 |
| Generating 3D digital dental restoration model | 230 |
| Manufacturing dental restoration element | 232 |

DETERMINING A PREPARATION SURFACE

FIELD OF THE INVENTION

The invention relates to the field of dental technology, in particular to a determining of a preparation surface of a tooth.

BACKGROUND

In modern dental technology, computer-based approaches are used for determining parameters of measures to be applied to a tooth. For example, parameters like a preparation surface of a tooth may be determined.

It is an objective to provide for a preparation surface of a tooth for preparing the tooth for receiving a dental restoration element, a computer program product for determining a preparation surface of a tooth for preparing the tooth for receiving a dental restoration element, a computer device for determining a preparation surface of a tooth for preparing the tooth for receiving a dental restoration element, and a system comprising such a computer device.

SUMMARY

In one aspect, the invention relates to a method for determining a preparation surface of a tooth for preparing the tooth for receiving a dental restoration element. The method comprises a receiving of a three-dimensional digital tooth model. The three-dimensional digital tooth model is descriptive of a current form and of a position of the tooth within a dental situation of a patient. A three-dimensional digital restorative tooth model is received, which defines a preliminary target form of the tooth to be achieved by applying the dental restoration element. A definition of a restoration area is received. The definition indicates a surface area of the tooth, at which the dental restoration element is to be arranged. A first value selected for a basic preparation depth of the preparation within the restoration area of the three-dimensional digital tooth model is received. Furthermore, a second value selected for a restoration thickness of the dental restoration element is received. A first reference surface using an inward projection of the restoration area of the three-dimensional digital tooth model into the three-dimensional digital tooth model depending on the first value selected for the basic preparation depth. Furthermore, a second reference surface is determined using an inward projection of a surface section of the three-dimensional digital restorative tooth model overlapping with the restoration area into the three-dimensional digital restorative tooth model depending on the second value selected for the restoration thickness. One or more preparation reference surface sections are determined using the first and second reference surface. The determined one or more preparation reference surface sections are used to determine the preparation surface of the tooth.

The position of the tooth defined by the three-dimensional digital tooth model may, e.g., be a current position of the tooth within the patient current dental situation. The current position may, e.g., be a natural position of the respective tooth within the patient's dentition. The current position may, e.g., be a result of an orthodontic adjustment of the respective tooth using orthodontic measures. The position of the tooth defined by the three-dimensional digital tooth model may, e.g., be a planned position to be achieved by an orthodontic adjustment of the respective tooth using orthodontic measures.

The preliminary target form defined by the three-dimensional digital restorative tooth model may, e.g., be used as a template for a final form of the dental restoration element and thus of the restored tooth, in case the preliminary target form does not collide with the preparation surface being determined. The preliminary target form defined by the three-dimensional digital restorative tooth model may, e.g., be adjusted using the preparation surface being determined, in order to provide a final form of the dental restoration element.

The restoration area may, e.g., be defined by defining a margin line of the restoration area on the surface of the three-dimensional digital tooth model. The margin line may define a boundary of the respective restoration area, which may, e.g., be indicated on the three-dimensional digital tooth model.

The basic preparation depth may, e.g., be a depth of a basic preparation of the tooth, which is required within the restoration area in order to bond the dental restoration element to the tooth, independently any other features of the dental restoration element. The basic preparation depth may, e.g., be defined independently of a required minimum thickness of a material used for manufacturing the dental restoration element.

In case no basic preparation is required, e.g., for bonding the dental restoration element to the tooth, the selected first value may be zero. Otherwise, the selected first value may be non-zero.

The selected second value defines a restoration thickness of the dental restoration element, i.e., an assumed thickness of the dental restoration element arranged on the prepared tooth. Thus, the restoration thickness may define an assumed amount of space required by the dental restoration element, in order to be able to arrange the dental restoration element within the contours defined by the three-dimensional digital restorative tooth model.

The first reference surface is defined relative to the three-dimensional digital tooth model and takes into account the basic preparation of the tooth defined by the three-dimensional digital tooth model. In case the selected first value is zero, the first reference surface coincides with the restoration area, i.e., the surface section of the three-dimensional digital tooth model limited by the boundary of the restoration area. In case the selected first value is non-zero, the first reference surface may extend below the three-dimensional digital tooth model with a distance equal to the non-zero first value.

The second reference surface is defined relative to the three-dimensional digital restorative tooth model and takes into account an amount of free space required for arranging a dental restoration element below the surface of the three-dimensional digital restorative tooth model, i.e., with the contours defined by the three-dimensional digital restorative tooth model.

The first and second reference surface are used for determining the preparation surface. For this purpose, it is determined, which sections of the first and second reference surface define an upper limit for the preparation. These sections are used as the one or more preparation reference surface sections, which together may form the preparation surface. Considering overlapping sections of the first and second reference surface, in each case the lower section, i.e., the section further inward in a direction towards the tooth, may define an upper limit for the preparation and therefore be selected as a preparation reference surface section. If the first reference surface, e.g., extends below the second reference surface, the first reference surface may be determined to form the preparation surface. In this case, there may be only one preparation reference surface section in form of the first reference surface. If the first reference surface, e.g., fully coincides with the second reference surface, the first reference surface or equivalently the second reference surface may be determined to form the preparation surface. In this case, there may be only one preparation reference surface section in form of the first reference surface equivalently the second reference surface. If the second reference surface, e.g., extends below the first reference surface, the second reference surface may be determined to form the preparation surface. In this case, there may be only one preparation reference surface section in form of the second reference surface.

If the first reference surface and second, e.g., intersect each other one or more times, there may be more than one preparation reference surface section provided by both reference surfaces. The preparation reference surface sections may be determined section-by-section depending on which of the reference surfaces extends below the other.

Thus, both models, i.e., the three-dimensional digital tooth model as well as the three-dimensional digital restorative tooth model are taken into account for defining the preparation surface. Thereby, it may be prevented to determine a preparation surface for the preparation, which requires to remove more tooth mass from the tooth as defined by the three-dimensional digital tooth model than actually required for simultaneously satisfying the requirements of providing a basic preparation as well as sufficient space for the assumed restoration thickness of dental restoration element.

A section of a surface may, e.g., be defined to extend above another section of another surface, if it is distanced further away from a center of the tooth, e.g., a geometric center, than the other section of the other surface. The section of the surface may, e.g., be distanced further away from the center of the tooth, if for each point of the surface there is another point of the other section of the other surface, which is intersected by a straight line extending from the center of the tooth to the point of the surface, with the point of the surface being distanced further away from the center than the respective other point of the other section of the other surface.

A section of a surface may, e.g., be defined to extend below another section of another surface, if it is distanced less far away from a center of the tooth, e.g., a geometric center, than the other section of the other surface. The section of the surface may, e.g., be distanced less far away from the center of the tooth, if for each point of the surface there is another point of the other section of the other surface, which is intersected by a straight line extending from the center of the tooth through the point of the surface and further to the respective intersected other point of the other section of the other surface, with the respective other point of the other section of the other surface being further distanced away from the center than the point of the surface.

The method may, e.g., comprise generating the three-dimensional digital restorative tooth model being received. Generating the three-dimensional digital restorative tooth model may comprise generating a three-dimensional digital model representing a preliminary target form of the tooth, e.g., using a three-dimensional digital tooth model from a three-dimensional digital dental tooth library. In order to generate the three-dimensional digital restorative tooth model, the respective three-dimensional digital model representing the preliminary target form may further be arranged at the position of the three-dimensional digital tooth model within the patient's dentition, i.e., a three-dimensional digital dentition model of the patient's dentition.

The three-dimensional digital tooth model is descriptive of a current form and of a position of the tooth within the dentition of the patient. For example, the position is a current position and three-dimensional digital tooth model is descriptive of a current state of the tooth within the dentition of the patient.

The three-dimensional digital tooth model may be provided using scan data of the respective tooth of the patient acquired using a scanner, e.g., an optical scanner. The scan may be a direct scan of the patient's tooth, e.g., an intraoral scan. Alternatively or additionally, an indirect scan of the patient's tooth may be used to acquire the scan data. For example, a dental impression of the patient's tooth or a dental model of the respective tooth dentition, like a plaster model, may be scanned.

For example, the scan data of the tooth may be comprised by scan data of the patient's dentition. The scan data of the dentition may be acquired using a scanner, e.g., an optical scanner. The scan may be a direct scan of the patient's dentition, e.g., an intraoral scan. Alternatively or additionally, an indirect scan of the patient's dentition may be used to acquire the scan data. For example, a dental impression of the patient's dentition or a dental model of the dentition, like a plaster model, may be scanned.

The three-dimensional digital tooth model may, e.g., be provided as part of a three-dimensional digital dentition model of the dentition of the patient. The three-dimensional digital dentition model of the dentition of the patient may be provided using scan data of the patient's dentition. The three-dimensional digital tooth model may be identified within the three-dimensional digital dentition model of the dentition of the patient using segmentation.

The three-dimensional digital tooth model may be a three-dimensional digital model of a current state of the tooth. This three-dimensional digital tooth model as a current state model of the respective tooth may resemble an actual state of the patient's tooth, i.e., it may be a digital replica of the physical tooth. The three-dimensional digital tooth model may, in particular, resemble the geometric form of the tooth. The three-dimensional digital tooth model may further resemble the current position of the physical tooth within the physical dentition. The three-dimensional digital tooth model may, e.g., be generated by a computer system executing the method for determining the preparation surface or it may be received from an external source. The external source may, e.g., be a server, like a cloud server, providing the three-dimensional digital tooth model via a network. The external source may, e.g., be a removable storage device providing the three-dimensional digital tooth model via a direct communication connection, e.g., wireless or via a wire.

The three-dimensional digital tooth model may be provided as part of a three-dimensional digital dentition model of the dentition of the patient. The three-dimensional digital dentition model may be a three-dimensional digital model of a current state the dentition. This three-dimensional digital dentition model may be generated using the scan data of a direct and/or indirect scan of the dentition. The three-dimensional digital dentition model as a current state model of the respective dentition may resemble an actual state of the patient's dentition, i.e., it may be a digital replica of the physical dentition. The three-dimensional digital dentition model of the respective tooth may, in particular, resemble the geometric form of the physical dentition as well as the relative positions of the teeth comprised by the dentition. The three-dimensional digital dentition model may be generated by the computer system executing the method for determining the preparation surface or it may be received from an external source. The external source may, e.g., be a server, like a cloud server, providing the three-dimensional digital dentition model via a network. The external source may, e.g., be a removable storage device providing the three-dimensional digital dentition model via a direct communication connection, e.g., wireless or via a wire.

The three-dimensional digital restorative tooth model may, e.g., define a preliminary target form of the tooth. The three-dimensional digital restorative tooth model may, e.g., be generated by a computer system executing the method for determining the preparation surface or it may be received from an external source. The external source may, e.g., be a server, like a cloud server, providing the three-dimensional digital restorative tooth model via a network. The external source may, e.g., be a removable storage device providing the three-dimensional digital restorative tooth model via a direct communication connection, e.g., wireless or via a wire.

For generating the three-dimensional digital restorative tooth model, e.g., a three-dimensional digital library tooth model from a digital tooth library may be used. For example, the three-dimensional digital library tooth model may in addition be adjusted to the dentition of the patient. For example, a three-dimensional digital model of another tooth of the patient's dentition, e.g., an opposite tooth within the same dental arch or an antagonist, may be used for generating the three-dimensional digital restorative tooth model. The three-dimensional digital model of the other tooth may be generated using scan data of the respective other tooth. For example, the three-dimensional digital model of the other tooth may in addition be adjusted to the dentition of the patient. For example, the three-dimensional digital tooth model descriptive of a current form and of a position of the tooth within the dentition may be used for generating the generating the three-dimensional digital restorative tooth model. For example, the three-dimensional digital tooth model may be adjusted to resemble a preliminary target form of the tooth to be achieved by using a dental restoration element. For example, the three-dimensional digital restorative tooth model may be generated from scratch.

The three-dimensional digital restorative tooth model, i.e., the preliminary target form defined by the three-dimensional digital restorative tooth model, may, e.g., be adjusted using additional predefined dental constraints, like, e.g., compliance with a static occlusion and/or compliance with a dynamic occlusion, e.g., defined using a virtual articular. Such an additional adjustment may, e.g., result in a decrease of the size of the three-dimensional digital restorative tooth model. Such a decrease of the size of the three-dimensional digital restorative tooth model may, e.g., result in a decrease of a three-dimensional digital preparation tooth model defining the preparation and thus the form of the prepared tooth. For generating the three-dimensional digital restorative tooth model, i.e., the preliminary target form defined by the three-dimensional digital restorative tooth model, e.g., a virtual articulator may be used. Using the virtual articulator, a dynamic occlusion and/or a dynamic opposing bite may be taken into account. The three-dimensional digital restorative tooth model may be generated and/or adjusted such that it complies with the dynamic occlusion and/or a dynamic opposing bite defined using the virtual articulator.

For example, a virtual smile design visualizing a smile of the patient may be provided comprising the three-dimensional digital restorative tooth model and used for communication with the patient, e.g., for bespeaking different advantages and/or disadvantages of materials, like metal vs. glass ceramic, and/or preparation shapes, like crown vs. veneer. For example, different three-dimensional digital restorative tooth models may be used for different materials and/or different restoration shapes. The three-dimensional digital restorative tooth model may, e.g., be used to visualize a result of a restoration on the patient's smile.

For example, a virtual smile design visualizing a smile of the patient be provided comprising the three-dimensional digital tooth model and used for communication with the patient, e.g., for bespeaking different advantages and/or disadvantages of materials, like metal vs. glass ceramic, and/or preparation shapes, like crown vs. veneer. The three-dimensional digital tooth model may, e.g., be used to visualize a starting point of a restoration, in order to illustrate an effect of the restoration on the patient's smile.

For example, a trained machine learning module may be used for generating the three-dimensional digital restorative tooth model. For generating the three-dimensional digital restorative tooth model, the trained machine learning module may, e.g., use the three-dimensional digital tooth model. The three-dimensional digital restorative tooth model may be received as output from the trained machine learning module in response to providing the three-dimensional digital tooth model as input. For example, the three-dimensional digital tooth model may be provided as part of a three-dimensional digital dentition model as input to the trained machine learning module.

The trained machine learning module may be trained to provide the three-dimensional digital restorative tooth model as output in response to receiving the three-dimensional digital tooth model as input. The trained machine learning module may be trained to provide the three-dimensional digital restorative tooth model as output in response to receiving a three-dimensional digital dentition model comprising the three-dimensional digital tooth model as input.

For example, a providing of the trained machine learning module may comprise providing a machine learning module to be trained. A set of training datasets may be provided for training the machine learning module to be trained. For example, each training dataset may comprise a three-dimensional digital training tooth model as well as a three-dimensional digital training restorative tooth model. The machine learning module to be trained may be trained to provide the three-dimensional digital training restorative tooth models of the training datasets as an output in response to receiving the three-dimensional digital training tooth models of the respective training datasets as input.

For example, each training dataset may comprise a three-dimensional digital training dentition model as well as a three-dimensional digital training restorative tooth model. The three-dimensional digital training dentition models may comprise three-dimensional digital training tooth models, for which the three-dimensional digital training restorative tooth model are to be provided. The machine learning module to be trained may be trained to provide the three-dimensional digital training restorative tooth models of the training datasets as an output in response to receiving the three-dimensional digital training dentition models of the respective training datasets as input. The three-dimensional digital training restorative tooth models may, e.g., be provided in form of three-dimensional digital training restorative dentition models comprising the three-dimensional digital training restorative tooth models. The three-dimensional digital training restorative dentition models may correspond to the comprising the three-dimensional digital training dentition models with the three-dimensional digital training tooth models replaced by the three-dimensional digital training restorative tooth models.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

The term "machine learning" (ML) refers to a computer algorithm used to extract useful information from training data sets by building probabilistic models, which are referred to as machine learning modules or models, in an automated way. A machine learning module may also be referred to as a predictive model. Machine learning algorithms build a mathematical model based on sample data, known as "training data", in order to make predictions or decisions without being explicitly programmed to perform the task. The machine learning module may be performed using a learning algorithm such as supervised or unsupervised learning. The machine learning module may be based on various techniques such as clustering, classification, linear regression, reinforcement, self-learning, support vector machines, neural networks, etc. A machine learning module may, e.g., be a data structure or program such as a neural network, in particular a convolutional neural network, a support vector machine, a decision tree, a Bayesian network etc. The machine learning module may be adapted to predict an unmeasured value, e.g., a three-dimensional digital restorative tooth model as output by the trained machine learning module. The trained machine learning module may predict the unmeasured value from other, known values, e.g., a three-dimensional digital tooth model as input. The three-dimensional digital tooth model may be comprised by a three-dimensional digital dentition tooth model. For example, an identifier may be provided identifying the three-dimensional digital tooth model comprised by the three-dimensional digital dentition model. According to an example, the machine learning module may comprise a deep learning model.

The three-dimensional digital restorative tooth model may be provided as part of a three-dimensional digital dentition model of the dentition of the patient. The three-dimensional digital dentition model may be a three-dimensional digital model of a current state the dentition. This three-dimensional digital dentition model may be generated using the scan data of a direct and/or indirect scan of the dentition. The three-dimensional digital dentition model as a current state model of the respective dentition may resemble an actual state of the patient's dentition, i.e., it may be a digital replica of the physical dentition. The three-dimensional digital dentition model of the respective tooth may, in particular, resemble the geometric form of the physical dentition as well as the relative positions of the teeth comprised by the dentition. The three-dimensional digital dentition model may be generated by the computer system executing the method for determining the preparation surface or it may be received from an external source. The external source may, e.g., be a server, like a cloud server, providing the three-dimensional digital dentition model via a network. The external source may, e.g., be a removable storage device providing the three-dimensional digital dentition model via a direct communication connection, e.g., wireless or via a wire.

For example, the method further comprises a receiving of a three-dimensional digital gingiva model. The three-dimensional digital gingiva model is descriptive of a current form and of a position, e.g., a current position of a gingiva around the tooth within the dentition.

The three-dimensional digital gingiva model may be provided using scan data of the gingiva of the patient acquired, at least around the tooth, using a scanner, e.g., an optical scanner. The scan may be a direct scan of the patient's gingiva, e.g., an intraoral scan. Alternatively or additionally, an indirect scan of the patient's gingiva may be used to acquire the scan data. For example, an impression of the patient's dentition comprising the gingiva or a physical model of the detention, like a plaster model, comprising the gingiva may be scanned.

The three-dimensional digital gingiva model may, e.g., be provided as part of a three-dimensional digital dentition model of the dentition of the patient. The three-dimensional digital gingiva model may be a three-dimensional digital model of a current state of the gingiva, at least around the tooth. This three-dimensional digital gingiva model as a current state model of the gingiva may resemble an actual state of the patient's gingiva, i.e., it may be a digital replica of the physical gingiva. The three-dimensional digital gingiva model may, in particular, resemble the geometric form of the gingiva. The three-dimensional digital gingiva model may further resemble the current position of the physical gingiva relative to the teeth within the physical dentition. The three-dimensional digital gingiva model may, e.g., be generated by a computer system executing the method for determining the preparation surface or it may be received from an external source. The external source may, e.g., be a server, like a cloud server, providing the three-dimensional digital gingiva model via a network. The external source may, e.g., be a removable storage device providing the three-dimensional digital gingiva model via a direct communication connection, e.g., wireless or via a wire.

For example, each of the determined preparation reference surface sections satisfies one of the following criteria:

the preparation reference section being a section of the first reference surface extending below the second reference surface; the preparation reference surface section being a section of the first reference surface coinciding with a section of the second reference surface; the preparation reference surface section being a section of the second reference surface extending below the first reference surface.

In case a section of the first reference surface extends below the second reference surface or coincide with the second reference surface, it may be identified as a preparation reference surface section and thus being part of the preparation surface. In case a section of the second reference surface extends below the first reference surface or coincide with the second reference surface, it may be identified as a preparation reference surface section and thus being part of the preparation surface. Thereby, the sections of the first and second reference surface defining upper limits for the preparation may be identified and used for determining the preparation surface.

For example, the method further comprises receiving a third value selected for a required material thickness of the dental restoration element. A third reference surface is determined using an outward projection of the preparation surface depending on the third value selected for the required material thickness. One or more restoration reference surface sections are determined using the three-dimensional digital restorative tooth model and the third reference surface. The one or more restoration reference surface sections are used to determine a restoration surface of the dental restoration element.

The required material thickness of the dental restoration element may, e.g., be a minimum material thickness required for ensuring one or more of the following: a sufficient minimum structural stability of the dental restoration element, a pre-defined color of the dental restoration element, a pre-defined degree of transparency of the dental restoration element. By ensuring that the dental restoration element has a material thickness at least equal the minimum material thickness may ensure that the resulting dental restoration element has one or more of the following features: a sufficient minimum structural stability, a pre-defined color, a pre-defined degree of transparency. The pre-defined color may be a target color of the dental restoration element on the prepared tooth.

Using the third value descriptive of a required material thickness of the dental restoration element, a restoration surface and thus a form of the dental restoration element may be determined, which complies with the preparation surface determined using the first and second reference surface as well as the material thickness required for ensuring, e.g., a sufficient stability of the dental restoration element. For determining the restoration reference surface sections and thus the preparation surface, the three-dimensional digital restorative tooth model and the third reference surface may be used. Since the form and position of the third reference surface depends on the preparation surface, the preparation surface and the preliminary target form defined by the three-dimensional digital restorative tooth model may be taken into account for determining the restoration surface.

The third reference surface and the surface of the three-dimensional digital restorative tooth model are used for determining the restoration surface. For this purpose, it is determined, which sections of the third reference surface and the surface of the three-dimensional digital restorative tooth model define an upper limit for the preparation relative to the preparation surface. These sections are used as the one or more restoration reference surface sections, which together may form the restoration surface. Considering overlapping sections of the third reference surface and the surface of the three-dimensional digital restorative tooth model, in each case the upper lower section, i.e., the section further distanced away from the preparation surface, may define an upper limit for the restoration and therefore be selected as a restoration reference surface section. If the third reference surface, e.g., fully extends below the surface of the three-dimensional digital restorative tooth model, the surface of the three-dimensional digital restorative tooth model may be determined to form the restoration surface. In this case, there may be only one restoration reference surface section in form of the surface of the three-dimensional digital restorative tooth model. If the third reference surface, e.g., fully extends above the surface of the three-dimensional digital restorative tooth model, the surface of the third reference surface may be determined to form the restoration surface. In this case, there may be only one restoration reference surface section in form of the third reference surface. If the first reference surface, e.g., fully coincides with the surface of the three-dimensional digital restorative tooth model, the surface of the third reference surface may be determined to form the restoration surface. In this case, there may be only one restoration reference surface section in form of the third reference surface.

If the third reference surface and surface of the three-dimensional digital restorative tooth model, e.g., intersect each other one or more times, there may be more than one restoration reference surface section provided by both the third reference surface and surface of the three-dimensional digital restorative tooth model. The restoration reference surface sections may be determined section-by-section depending on which of the third reference surface and surface of the three-dimensional digital restorative tooth model extends above the other.

For example, the determining of the restoration surface of the dental restoration element may further comprise deforming restoration surface, e.g., one or more of the restoration reference surface sections, toward the planned virtual preparation margin limiting the restoration area. Thereby, the minimum material thickness may, e.g., be considered and/or a tooth shape may, e.g., be preserved.

For example, each of the determined restoration reference surface sections satisfying one of the following criteria: the restoration reference surface sections being a section of the third reference surface extending out of the three-dimensional digital restorative tooth model; the restoration reference surface sections being a section of the third reference surface coinciding with a surface section of the three-dimensional digital restorative tooth model; the restoration reference surface sections being a surface section of the three-dimensional digital restorative tooth model extending above the third reference surface.

In case a section of the third reference surface extends above the surface of the three-dimensional digital restorative tooth model, i.e., extends out of the three-dimensional digital restorative tooth model, or coincide with the surface of the three-dimensional digital restorative tooth model, it may be identified as a restoration reference surface section and thus being part of the restoration surface. In case a section of the surface of the three-dimensional digital restorative tooth model extends above the third reference surface or coincide with the third reference surface, it may be identified as a restoration reference surface section and thus being part of the restoration surface. Thereby, the sections of the third reference surface and the surface of the three-dimensional digital restorative tooth model defining upper limits for the restoration may be identified and used for determining the restoration surface.

For example, the determined restoration surface may be check for compliance with one or more occlusion requirements. For example, a virtual articulator may be used. Using the virtual articulator, a dynamic occlusion and/or a dynamic opposing bite may be taken into account. The restoration surface may be checked and if necessary adjusted such that it complies with the dynamic occlusion and/or a dynamic opposing bite defined using the virtual articulator.

For example, one or more adjustments of the geometry of the restoration surface may be received in form of a user input. For example, the method may be repeated one or more times receiving one or more adjustments of the selected first, second and/or third value.

For example, the method further comprises determining a three-dimensional digital core model of a core of the three-dimensional digital tooth model to be excluded from preparation. The determining of the one or more preparation reference surface sections further uses the determined three-dimensional digital core model. One or more of the determined one or more preparation reference surface sections are a surface section of the three-dimensional digital core model extending out of one or more of the following: the first reference surface, the second reference surface.

Thus, it may be prevented that a preparation surface is determined, which violates the core of the of the three-dimensional digital tooth model identified by the three-dimensional digital core model, which is excluded from preparation, e.g., to protect pulp chamber of the tooth comprised by the core defined by the core of the three-dimensional digital tooth model.

For example, the method further comprises determining position and form of three-dimensional digital core model of the tooth within the three-dimensional digital tooth model. The three-dimensional digital core model may, e.g., comprise the pulp chamber of the tooth. For example, the method further comprises determining position and form of a pulp chamber of the tooth within the three-dimensional digital tooth model.

As the core is excluded from preparation, the pulp chamber comprised by the core is excluded from the preparation as well. Excluding the pulp chamber from preparation may protect the pulp chamber with the pulp, i.e., the neurovascular bundle central to each tooth and comprising connective tissue, nerves, blood vessels, and odontoblasts, from being damaged. Violating the pulp chamber may result in the death of the tooth.

The pulp chamber comprises the central pulp chamber as well as the pulp horns. The core may, e.g., further comprise at least parts of the radicular canals of the pulp, depending on how far the three-dimensional digital tooth model extends in radicular direction.

For example, position and form of the pulp chamber within the tooth may be estimated using the form of the three-dimensional digital tooth model. For example, a tooth type specific depth may be used for estimating the form and position of the pulp chamber within the tooth. For example, the three-dimensional digital tooth model may be reduced by predefined tooth type specific depth with the reduced three-dimensional digital tooth model, e.g., being used as the core of the three-dimensional digital tooth model. The tooth type specific depth may, e.g., vary in different tooth direction, i.e., the tooth type specific depth may be a tooth section specific depth.

For a rough estimate of the position and form of the pulp chamber, the three-dimensional digital tooth model may, e.g., be reduced by 2 mm and a resulting reduced three-dimensional digital tooth model may be used as the core of the three-dimensional digital tooth model.

For example, position and form of the pulp chamber within the tooth may be estimated using a library of typical forms of pulp chambers. For example, machine learning module may be used for estimating position and form of the pulp chamber.

By excluding the pulp chamber from the preparation, it may be ensured that the tooth is not prepared too deep. Violating the pulp chamber may result in the death of the tooth. Therefore, in order to determine the core to be excluded from preparation, a form and position of the pulp chamber may be estimated. For example, form and position of the pulp chamber may be estimated using a form of the tooth. For example, a type of tooth may also be taken into account, when estimating form and position of the pulp chamber.

For example, scan data of an X-ray and/or CBCT scan of the tooth are received. For example, DICOM data of X-ray images and/or CBCT images of the tooth are received. For example, scan data of a near-infrared scan of the tooth are received. The scan data may be indicative of the form and/or position of the pulp chamber within the tooth. The respective scan data may be used to determine the form and/or position of the pulp chamber within the tooth. The respective scan data may be used to determine the core comprising the pulp chamber within the tooth.

For example, a machine learning module may be used for determining the pulp chamber and/or for determining the three-dimensional digital core model comprising the pulp chamber.

For example, a trained machine learning module may be used for determining a three-dimensional digital pulp chamber model. For determining the three-dimensional digital pulp chamber model, the trained machine learning module may, e.g., use the three-dimensional digital tooth model. The three-dimensional digital pulp chamber model may be received as output from the trained machine learning module in response to providing the three-dimensional digital tooth model as input. For example, the three-dimensional digital tooth model may be provided as part of a three-dimensional digital dentition model as input to the trained machine learning module.

The trained machine learning module may be trained to provide the three-dimensional digital pulp chamber model as output in response to receiving the three-dimensional digital tooth model as input. The trained machine learning module may be trained to provide the three-dimensional pulp chamber model as output in response to receiving a three-dimensional digital dentition model comprising the three-dimensional digital tooth model as input.

For example, a providing of the trained machine learning module may comprise providing a machine learning module to be trained. A set of training datasets may be provided for training the machine learning module to be trained. For example, each training dataset may comprise a three-dimensional digital training tooth model as well as a three-dimensional digital training pulp chamber model. The machine learning module to be trained may be trained to provide the three-dimensional digital training pulp chamber models of the training datasets as an output in response to receiving the three-dimensional digital training tooth models of the respective training datasets as input.

For example, each training dataset may comprise a three-dimensional digital training dentition model as well as a three-dimensional digital training pulp chamber model. The three-dimensional digital training dentition models may comprise three-dimensional digital training tooth models, for which the three-dimensional digital training pulp chamber model are to be determined. The machine learning module to be trained may be trained to provide the three-dimensional digital training pulp chamber models of the training datasets as an output in response to receiving the three-dimensional digital training dentition models of the respective training datasets as input. The three-dimensional digital training pulp chamber models may, e.g., be provided in form of three-dimensional digital training dentition models comprising the three-dimensional digital training pulp chamber models.

For example, a trained machine learning module may be used for determining a three-dimensional digital core model of a core of a tooth comprising a pulp chamber of the respective tooth. The three-dimensional digital core model may be received as output from the trained machine learning module in response to providing the three-dimensional digital tooth model as input. For example, the three-dimensional digital tooth model may be provided as part of a three-dimensional digital dentition model as input to the trained machine learning module.

The trained machine learning module may be trained to provide the three-dimensional digital core model as output in response to receiving the three-dimensional digital tooth model as input. The trained machine learning module may be trained to provide the three-dimensional core model as output in response to receiving a three-dimensional digital dentition model comprising the three-dimensional digital tooth model as input.

For example, a providing of the trained machine learning module may comprise providing a machine learning module to be trained. A set of training datasets may be provided for training the machine learning module to be trained. For example, each training dataset may comprise a three-dimensional digital training tooth model as well as a three-dimensional digital training core model of a core of the training tooth comprising a pulp chamber of the respective training tooth. The machine learning module to be trained may be trained to provide the three-dimensional digital training core models of the training datasets as an output in response to receiving the three-dimensional digital training tooth models of the respective training datasets as input.

For example, each training dataset may comprise a three-dimensional digital training dentition model as well as a three-dimensional digital training core model. The three-dimensional digital training dentition models may comprise three-dimensional digital training tooth models, for which the three-dimensional digital training core model are to be determined. The machine learning module to be trained may be trained to provide the three-dimensional digital training core models of the training datasets as an output in response to receiving the three-dimensional digital training dentition models of the respective training datasets as input. The three-dimensional digital training core models may, e.g., be provided in form of three-dimensional digital training dentition models comprising the three-dimensional digital training core models.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

By taking into account the pulp chamber or at least an estimated pulp chamber as part of the core, the pulp chamber is excluded from preparation, i.e., it may be ensured that any preparation parameter determined may exclude the pulp chamber from preparation measures. Thus, the pulp chamber may be protected effectively. A protection of the pulp chamber may have the beneficial effect of avoiding any grind down of the tooth to be prepared according to the preparation parameters determined, which could damage the pulp chamber. Thus, a death of the remaining tooth as a consequence of the damaging may be avoided. Otherwise, the death of the remaining tooth may result in an earlier loss of the respective tooth, which may include the restoration.

For example, the core of the three-dimensional digital tooth model further comprises a safety layer of tooth material for protecting the pulp chamber. Taking into account an additional safety layer of tooth material may provide an improved protection of the pulp chamber against negative impacts by the preparation. Grinding down the tooth during preparation may result in heat build-up, which may have a negative impact on the pulp. A safety layer may provide a kind of thermal insulation protecting the pulp from overheating due to a heating caused by the preparation.

For example, when using a trained machine learning module for determining the core of the tooth, the machine learning module may be trained for determining a three-dimensional digital core model of the core of the tooth comprising in addition to the pulp chamber of the respective tooth a safety layer of tooth material for protecting the pulp chamber.

In case the three-dimensional digital core model is intersected by the first and/or the second reference surface, i.e., one or more sections of the three-dimensional digital core model extend out of the first and/or the second reference surface, these sections may be determined as preparation reference surface sections, in order too prevent the core of the three-dimensional digital tooth model from being inter-sected by the preparation surface.

For example, the method further comprises using the preparation surface and the three-dimensional digital tooth model for generating a three-dimensional digital preparation tooth model defining a form of the prepared tooth.

Thus, a three-dimensional digital preparation tooth model may be provided defining a preparation and thus a form of the prepared tooth. In particular, the three-dimensional digital preparation tooth model may define the preparation surface.

For example, a virtual smile design visualizing a smile of the patient be provided comprising the three-dimensional digital preparation tooth model and used for communication with the patient, e.g., for bespeaking different advantages and/or disadvantages of materials, like metal vs. glass ceramic, and/or preparation shapes, like crown vs. veneer. For example, different three-dimensional digital restorative tooth models may be determined for different materials and/or different restoration shapes. The three-dimensional digital preparation tooth model may, e.g., be used to visu-alize a required preparation of the tooth, in order to achieve a desired result of a restoration on the patient's smile.

For example, the method further comprises using the preparation surface of the tooth and the three-dimensional digital preparation tooth model for determining a tooth mass loss resulting from preparing the preparation surface.

Thus, a tooth mass loss resulting from preparing the preparation surface may be determined. Based on the size of the tooth mass loss, the preparation may be adjusted, in order to reduce the tooth mass loss.

For example, the method further comprises for reducing the tooth mass loss an adjusting a position of the three-dimensional digital restorative tooth model relative to the position of the tooth. An effect of the adjusting of the position of the three-dimensional digital restorative tooth model on the tooth mass loss is determined. The determining of the effect on the tooth mass loss comprises an adjusting the second reference surface for the adjusted position of the three-dimensional digital restorative tooth model. The one or more preparation reference surface sections are re-deter-mined using the first reference surface and the adjusted second reference surface. The preparation surface of the tooth is re-determined using the re-determined one or more preparation reference surface sections. The re-determined preparation surface of the tooth and the three-dimensional digital preparation tooth model are used for re-determining the tooth mass loss for the adjusted position of the three-dimensional digital restorative tooth model.

Thus, am adjusted position of the three-dimensional digi-tal restorative tooth model relative to the position of the tooth may be determined, e.g., automatically, resulting in an adjusted preparation surface with a reduced tooth mass loss.

For example, the method further comprises performing the adjusting of the position of the three-dimensional digital restorative tooth model and the determining of the effect on the tooth mass loss iteratively until one or more predefined first criteria are satisfied.

For example, the one or more predefined first criteria comprise one or more of the following criteria: the adjusted second reference surface comprising no sections extending below the first reference surface due to the iterative one or more iterative adjustments; the re-determining tooth mass loss being equal to a basic tooth mass loss determined using the first reference surface and the three-dimensional digital preparation tooth model; the re-determined tooth mass loss reaching a minimum; the adjustment of the position of the three-dimensional digital restorative tooth model reaching a predefined first threshold; the iteration reaching a predefined first maximum number of iteration steps.

For example, the method further comprises for reducing the tooth mass loss an adjusting the definition of the pre-liminary target form of the tooth by adjusting a form of the three-dimensional digital restorative tooth model. An effect of the adjusting of the form of the three-dimensional digital restorative tooth model on the tooth mass loss is determined. The determining of the effect on the tooth mass loss com-prises an adjusting the second reference surface for the adjusted form of the three-dimensional digital restorative tooth model. The one or more preparation reference surface sections are re-determined using the first reference surface and the adjusted second reference surface. The preparation surface of the tooth is re-determined using the re-determined one or more preparation reference surface sections. The re-determined preparation surface of the tooth and the three-dimensional digital preparation tooth model are used for re-determining the tooth mass loss for the adjusted form of the three-dimensional digital restorative tooth model.

Thus, an adjusted form of the three-dimensional digital restorative tooth model may be determined, e.g., automati-cally, resulting in an adjusted preparation surface with a reduced tooth mass loss.

For example, the method further comprises performing the adjusting of the form of the three-dimensional digital restorative tooth model and the determining of the effect on the tooth mass loss iteratively until one or more predefined second criteria are satisfied.

For example, the one or more predefined second criteria comprise one or more of the following criteria: the adjusted second reference surface comprising no sections extending below the first reference surface due to the iterative one or more iterative adjustments; the re-determining tooth mass loss being equal to the basic tooth mass loss; the re-determined tooth mass loss reaching a minimum; the adjust-ment of the form of the three-dimensional digital restorative tooth model reaching a predefined second threshold; the iteration reaching a predefined second maximum number of iteration steps.

For example, the method further comprises for reducing the tooth mass loss an adjusting the second value selected for the restoration thickness of the dental restoration element. An effect of the adjusting of the second value on the tooth mass loss is determined. The determining of the effect on the tooth mass loss comprises adjusting the second reference surface using the adjusted second value. The one or more preparation reference surface sections are re-determined using the first reference surface and the adjusted second reference surface. The preparation surface of the tooth is re-determined using the re-determined one or more prepa-ration reference surface sections. The re-determined prepa-ration surface of the tooth and the three-dimensional digital preparation tooth model are used for re-determining the tooth mass loss for the adjusted second value.

Thus, an adjusted restoration thickness of the dental restoration element may be determined, e.g., automatically, resulting in an adjusted preparation surface with a reduced tooth mass loss.

For example, the method further comprises performing the adjusting of the second value selected for a restoration thickness of the dental restoration element and the deter-mining of the effect on the tooth mass loss iteratively until one or more predefined third criteria are satisfied.

For example, the one or more predefined third criteria comprising one or more of the following criteria: the adjusted second reference surface comprising no sections extending below the first reference surface due to the iterative one or more iterative adjustments; the re-determining tooth mass loss being equal to the basic tooth mass loss; the re-determined tooth mass loss reaching a minimum; the adjustment of the second value reaching a predefined third threshold; the iteration reaching a predefined third maximum number of iteration steps.

For example, the method further comprises controlling a manufacturing device for manufacturing on or more of the following: a positive of at least a part of the prepared tooth in form of a physical copy of at least a part the three-dimensional digital preparation tooth model, a negative of the at least a part of the prepared tooth in form of a physical copy of at least a part of a three-dimensional digital negative of the three-dimensional digital preparation tooth model.

For example, the manufacturing device is controlled for manufacturing a positive of the prepared tooth in form of a physical copy of the three-dimensional digital preparation tooth model. For example, the manufacturing device is controlled for manufacturing a negative of the prepared tooth in form of a physical copy of a three-dimensional digital negative of the three-dimensional digital preparation tooth model. Such a three-dimensional digital negative of the three-dimensional digital preparation tooth model may, e.g., be generated using the three-dimensional digital preparation tooth model.

Such a positive may, e.g., be configured for usage as a reference for a visual check during a preparation of the tooth to be prepared by a doctor and/or a practitioner. It may further be used, e.g., for generating one or more preparation check surfaces for checking, whether a sufficient amount of tooth material has been removed, e.g., drilled down, e.g., using a suck-down technique from silicon.

Such a negative may, e.g., be configured for usage as a reference for a geometric check during a preparation of the tooth to be prepared by a doctor and/or a practitioner. It may, e.g., comprise one or more preparation check surfaces for checking, whether a sufficient amount of tooth material has been removed, e.g., drilled down, e.g., using a suck-down technique from silicon.

For manufacturing the respective positive and/or negative, e.g., computer-controlled additive and/or subtractive methods may be used. For example, the respective positive and/or negative may be manufactured using one of the following: machining, 3D printing, casting.

Examples may have the beneficial effect, that the respective positive and/or negative may be manufactured using a machining device configured to manufacture the positive and/or negative by processing a blank. For example, the respective positive and/or negative may be manufactured using a 3D printing device, i.e., a printer, configured to print the respective positive and/or negative. For example, a computer-controlled additive and/or subtractive method may be used for manufacturing a casting matrix configured for casting the respective positive and/or negative by inserting casting material into the casting matrix and curing the inserted casting material.

For example, the method further comprises using the preparation surface of the tooth and the restoration surface of the dental restoration element for generating a three-dimensional digital dental restoration model defining a form of the dental restoration element.

Thus, a three-dimensional digital dental restoration model defining the dental restoration element may, e.g., be provided. This three-dimensional digital dental restoration model may, e.g., be used as a template for manufacturing the dental restoration element as a physical copy of the template.

For example, a virtual smile design visualizing a smile of the patient be provided comprising the three-dimensional digital dental restoration model and used for communication with the patient, e.g., for bespeaking different advantages and/or disadvantages of materials, like metal vs. glass ceramic, and/or preparation shapes, like crown vs. veneer. For example, different three-dimensional digital dental restoration models may be determined for different materials and/or different restoration shapes. The three-dimensional digital dental restoration model may, e.g., be used to visualize a starting point of a restoration, in order to visualize a result of a restoration on the patient's smile.

For example, the method further comprises controlling the manufacturing device for manufacturing the dental restoration element in form of a physical copy of the three-dimensional digital dental restoration model.

For manufacturing the dental restoration element, e.g., computer-controlled additive and/or subtractive methods may be used. For example, the dental restoration element may be manufactured using one of the following: machining, 3D printing, casting.

Examples may have the beneficial effect, that the dental restoration element may be manufactured using a machining device configured to manufacture the dental restoration element by processing a blank of restoration material. The resulting dental restoration element may be configured to be arranged on the prepared tooth resulting in a restored tooth with restoration surface as determined. For example, the dental restoration element may be manufactured using a 3D printing device, i.e., a printer, configured to print the dental restoration element. The resulting dental restoration element may be configured to be arranged on the prepared tooth resulting in a restored tooth with restoration surface as determined.

For example, a computer-controlled additive and/or subtractive method may be used for manufacturing a casting matrix configured for casting the dental restoration element by inserting restoration material into the casting matrix and curing the inserted restoration material.

For generating the three-dimensional restorative tooth model, the three-dimensional digital dental preparation tooth model and/or the three-dimensional digital dental restoration model, e.g., an insertion direction of the dental restoration element onto prepared tooth may be taken into account. Examples may facilitate an insertion of the dental restoration element along the insertion direction. The insertion direction may, e.g., be chosen in order to improve the hold of the dental restoration element on the prepared tooth. For example, the insertion direction may be chosen to extend parallel to a direction of maximal force applied on the dental restoration element during an intended use, e.g., chewing. The respective insertion direction may, e.g., be chosen to extend parallel to an occlusal direction. The respective insertion direction may, e.g., be chosen to extend parallel to a direction of extension of roots of the tooth, which is a direction of anchoring of the tooth within a bone of a jaw, mandible or maxilla. This direction of anchoring may provide a highest stability, i.e., forces acting in this direction may be best absorbed by the tooth. In this case, forces acting in the insertion direction may be best absorbed by the tooth.

For generating the three-dimensional restorative tooth model and/or the three-dimensional digital dental restoration model, e.g., a blocking out of one or more undercuts of the shape of the three-dimensional digital dental preparation tooth model in the insertion direction of the dental restoration element may be taken into account.

A blocking-out of undercuts may have the beneficial effect of a tight fit of the dental restoration element to the prepared tooth may be provided. For example, a bottom of a crown may be enabled to tightly fit to the prepared tooth. Thus, tolerances of the fitting of the dental restoration element onto the prepared tooth may be reduced. In particular, a clearance under the dental restoration element may be avoided, which could reduce the hold of the dental restoration element on the prepared tooth.

For example, the method further comprises a determining of a direction of extension of roots of the tooth described by the three-dimensional digital tooth model. A beneficial insertion direction may be related to the direction of the roots of the tooth, since these roots ensure the stability of the tooth.

For example, scan data of an X-ray and/or CBCT scan of the tooth are received. The scan data may be indicative of the direction of extension of roots of the three-dimensional digital tooth model. The scan data is used to determine the direction of extension of roots of the three-dimensional digital tooth model.

For example, the direction of extension of roots of the three-dimensional digital tooth model may be estimated using the form of the three-dimensional digital tooth model. For example, the direction of extension of roots of the three-dimensional digital tooth model may be estimated using a library of typical forms of roots. For example, machine learning module may be used for estimating the direction of extension of roots of the three-dimensional digital tooth model.

For example, a trained machine learning module may be used for determining a direction of extension of roots. A description of the direction of extension of roots may be received as output from the trained machine learning module in response to providing the three-dimensional digital tooth model as input. For example, the three-dimensional digital tooth model may be provided as part of a three-dimensional digital dentition model as input to the trained machine learning module.

The trained machine learning module may be trained to provide the description of the direction of extension of roots as output in response to receiving the three-dimensional digital tooth model as input. The trained machine learning module may be trained to provide the description of the direction of extension of roots as output in response to receiving a three-dimensional digital dentition model comprising the three-dimensional digital tooth model as input.

For example, a providing of the trained machine learning module may comprise providing a machine learning module to be trained. A set of training datasets may be provided for training the machine learning module to be trained. For example, each training dataset may comprise a three-dimensional digital training tooth model as well as a training description of the direction of extension of roots. The machine learning module to be trained may be trained to provide the training descriptions of the directions of extension of roots of the training datasets as an output in response to receiving the three-dimensional digital training tooth models of the respective training datasets as input.

For example, each training dataset may comprise a three-dimensional digital training dentition model as well as a training description of a direction of extension of roots. The three-dimensional digital training dentition models may comprise three-dimensional digital training tooth models, for which the training descriptions of the directions of extension of roots are to be determined. The machine learning module to be trained may be trained to provide the training descriptions of the directions of extension of roots of the training datasets as an output in response to receiving the three-dimensional digital training dentition models of the respective training datasets as input.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

For example, the three-dimensional digital tooth model may comprise one or more defects of the tooth to be repaired by the preparation of the tooth and the usage of the edental restoration model. The preparation of the tooth, e.g., the preparation surface may be adjusted to remove the defects.

For example, larger sections of the three-dimensional digital tooth model, i.e., locally more tooth material, may be removed by preparation than required according to the first and second reference sections. In order to remove the defects, additional tooth material may be removed at the locations of the defects resulting in a three-dimensional digital prepared tooth model, which is smaller than the three-dimensional digital preparation tooth model defined using the first and second reference sections only. The additional tooth material being removed may comprise the defects to be removed, thereby removing the respective defects.

Scan data descriptive on an inner structure of the tooth, e.g., NIRI data or X-ray data, may be used to determine additional preparation depth required to remove the defects, e.g., carve out existing caries or other damages of a tooth.

For example, the dental restoration element is one of the following: veneer, a coping with coating, an inlay, an onlay, an overlay, crown, a bridge, a mockup, a waxup, a provisional.

A veneer is a layer of restoration material placed over a tooth, in order to cover one or more surfaces of the tooth.

Veneers may, e.g., improve the aesthetics of a smile and/or protect the tooth's surface from damage. Indirect veneers are manufactured outside of a patient's oral cavity and then arranged on a tooth within the oral cavity. Direct veneers are built-up directly on a tooth inside a patient's oral cavity. The tooth may be prepared for receiving the veneer.

For example, two main types of restoration material may be used for manufacturing a veneer: composite and dental porcelain. A composite veneer may be directly placed on the tooth, i.e., built-up in the mouth of patient, or indirectly manufactured outside the mouth of the patient and later bonded to the tooth. In contrast, a porcelain veneer may only be indirectly manufactured outside the mouth of the patient. A full veneer crown, on the one hand, is dental restoration element that is configured to cover all the coronal tooth surfaces, i.e., the mesial, distal, facial, lingual and occlusal surfaces. A laminate veneer, on the other hand, is a thin layer of restoration material that may, e.g., cover only a single surface of a tooth, e.g., a labial surface. A laminate veneer may generally be used for aesthetic purposes.

Coping with coating refers to a dental restoration element, which is directly built on the tooth to be restored. An underlying coping is arranged on the tooth. The coping is configured to replicate the performance of a natural tooth. On the coping a coating is applied, which is configured to replicate the natural aesthetics of the tooth to be restored. For example, a ceramic coating may be used. Using a coping with coating to restore a tooth may have the beneficial effect of providing a dental restoration element that combines both durability and natural aesthetics.

Inlays, onlays, and overlays are forms of indirect restoration manufactured outside of a patient's oral cavity as a single, solid piece that fits a specific size and shape of a reception prepared within a tooth of the oral cavity. The inlay, onlay, or overlay is arranged within the respective reception and bonded, e.g., cemented, in place on the prepared tooth. In contrary to a crown, inlays, onlays, and overlays are arranged within a reception prepared within a damaged tooth.

An inlay is configured to cover an inner, e.g., central, section of an occlusal surface of a tooth. Thus, an inlay may be used to replace an internal part of a damaged tooth and cover part of the occlusal surface of the respective tooth. The inlay is positioned within hard tissues of the tooth, but does not cover a cusp or pointed part of the tooth. In comparison to an inlay, an onlay in addition covers at least one of the cusps of the tooth. In comparison to an onlay, an overlay covers a larger portion of the occlusal surface of the tooth extending beyond the cusps.

The inlays, onlays, and overlays may, e.g., be configured as pinlays. Pinlays are characterized by an additional use of pins to increase their retention. Thus, any inlay, onlay, or overlay may be configured as a pinlay by being braced by pins. Such a pin may, e.g., be inserted at an edge of the tooth or parallel to a groove. In general, the base of a pin is selected to lie in a section of the tooth surface that is free of damage.

A crown is a dental restoration element in form of a dental cap. Such a crown may, e.g., be provided in form of a full coverage crown or a partial crown, like a ⅞ crown or a ¾ crown. Partial crowns, like ⅞ and ¾ crowns, are hybrids between an onlay and a full coverage crown. They are categorized based on an estimated degree of wall coverage of the walls of the prepared tooth, on which the respective crown is arranged. For example, a ¾ crown aims to cover three thirds of the walls of the tooth to be restored, e.g., three out of the four walls, e.g., with the buccal wall being spared.

For example, a ⅞ crown aims to cover seven eights of the walls of the tooth to be restored. A full coverage crown completely caps or encircles a prepared tooth. A crown may, e.g., be required when a large cavity threatens the health of a tooth. A crown may be bonded to the tooth prepared for receiving the crown using a bonding material, e.g., a dental cement. A crown may be made from various materials, which may be fabricated using indirect methods, i.e., outside the patient's oral cavity. Crowns may be used to improve strength, to improve appearance of teeth and/or to halt deterioration.

A bridge is a dental restoration element in form of a permanent appliance used to replace one or more missing teeth. A dental bridge comprises a plurality of artificial dental elements that are fused together, e.g., one or more artificial replacement teeth are definitively joined to adjacent teeth. A conventional bridge may be supported, e.g., by full coverage crowns, partial crowns, overlays, onlays or inlays on the abutment teeth. The abutment teeth require preparation and reduction to support the bridge.

A mockup prosthetic restoration composite is a composite to be arranged within a patient*'s mouth in order to visualize for the patient a result of a prosthetic restoration, before the actual prosthetic restoration is executed. Thus, the patient as well as a dentist may asses the expected esthetic and functional outcome of the prosthetic restoration. The final result to be expected may thus be visualized at an early stage of planning prosthetic restoration. This approach may ensure that the patient as well as the dentist may the same result to be achieved in mind and allows for potential adjustments to be made prior to the final restorations manufactured and applied, e.g., cemented.

A waxup prosthetic restoration refers to a prosthetic restoration made from laboratory wax. Such a waxup prosthetic restoration is used for acquiring information indicative of whether a specific prosthetic restoration is appropriate. A planned prosthetic restoration may be generated using from laboratory wax. The waxup prosthetic restoration may be used to test, whether the planned prosthetic restoration is appropriate. Using wax may have the beneficial effect, that the waxup prosthetic restoration may be easily adjusted to also test adjustments of the planned prosthetic restoration and/or adjusting the planned prosthetic restoration to requirements determined using the waxup prosthetic restoration.

A waxup model may, e.g., be used by a doctor and/or a practitioner for visualization purposes. Furthermore, it may, e.g., also be used for generating one or more in-mouth preparation guiding surfaces, e.g., using silicon imprints, where the doctor and/or practitioner may measure and/or visually gauge, whether a planned tooth reduction has been performed.

A provisional is a type of interim dental restoration designed to be a template for the final restoration. It is used to verify, e.g., a comfort in occlusion for the patient, esthetic parameters that satisfy the patient's and dentist's expected goals and/or phonetic evaluation for speech and airflow. Esthetic parameters ma, e.g., comprise shape, midlines, smile line, embrasure shapes, and/or position of contacts. The phonetic evaluation for speech and airflow may ensure that no sibilance, whistlers, and/or lisp occur and a clear articulation being enabled by the prosthetic restoration resembled by the provisional.

Designed tooth shapes may, e.g., be re-using for manufacturing temporaries and/or final restorations. This may, e.g., be executed automatically by registering the prepared tooth after a preparation, e.g., using a re-can of the patient's detention after the preparation, with a pre-planning patient-scan, i.e., a scan of the patient's detention before the preparation and/or determination of the preparation surface. The planned three-dimensional digital dental restoration model may then, e.g., be arranged on a three-dimensional digital model of the prepared tooth generated using scan data of the prepared tooth provided by the re-can of the patient's dentition.

In another aspect, the invention relates to a computer program product for determining a preparation surface of a tooth for preparing the tooth for receiving a dental restoration element. The computer program product comprises a computer readable storage medium having program instructions embodied therewith. The program instructions are executable by a processor of a computer device to cause the computer device to receive a three-dimensional digital tooth model. The three-dimensional digital tooth model is descriptive of a current form and of a position of the tooth within a dental situation of a patient. A three-dimensional digital restorative tooth model is received, which defines a preliminary target form of the tooth to be achieved by applying the dental restoration element. A definition of a restoration area is received. The definition indicates a surface area of the tooth, at which the dental restoration element is to be arranged. A first value selected for a basic preparation depth of the preparation within the restoration area of the three-dimensional digital tooth model is received. Furthermore, a second value selected for a restoration thickness of the dental restoration element is received. A first reference surface using an inward projection of the restoration area of the three-dimensional digital tooth model into the three-dimensional digital tooth model depending on the first value selected for the basic preparation depth. Furthermore, a second reference surface is determined using an inward projection of a surface section of the three-dimensional digital restorative tooth model overlapping with the restoration area into the three-dimensional digital restorative tooth model depending on the second value selected for the restoration thickness. One or more preparation reference surface sections are determined using the first and second reference surface. The determined one or more preparation reference surface sections are used to determine the preparation surface of the tooth.

The program instructions provided by the computer program product may further be executable by the processor of the computer device to cause the computer device to execute any of the aforementioned examples of the method for determining the preparation surface of the tooth.

In another aspect, the invention relates to a computer program for determining a preparation surface of a tooth for preparing the tooth for receiving a dental restoration element. The computer program comprises program instructions embodied therewith. The program instructions are executable by a processor of a computer device to cause the computer device to receive a three-dimensional digital tooth model. The three-dimensional digital tooth model is descriptive of a current form and of a position of the tooth within a dental situation of a patient. A three-dimensional digital restorative tooth model is received, which defines a preliminary target form of the tooth to be achieved by applying the dental restoration element. A definition of a restoration area is received. The definition indicates a surface area of the tooth, at which the dental restoration element is to be arranged. A first value selected for a basic preparation depth of the preparation within the restoration area of the three-dimensional digital tooth model is received. Furthermore, a second value selected for a restoration thickness of the dental restoration element is received. A first reference surface using an inward projection of the restoration area of the three-dimensional digital tooth model into the three-dimensional digital tooth model depending on the first value selected for the basic preparation depth. Furthermore, a second reference surface is determined using an inward projection of a surface section of the three-dimensional digital restorative tooth model overlapping with the restoration area into the three-dimensional digital restorative tooth model depending on the second value selected for the restoration thickness. One or more preparation reference surface sections are determined using the first and second reference surface. The determined one or more preparation reference surface sections are used to determine the preparation surface of the tooth.

The program instructions provided by the computer program may further be executable by the processor of the computer device to cause the computer device to execute any of the aforementioned examples of the method for determining the preparation surface of the tooth.

In another aspect, the invention relates to a computer device for determining a preparation surface of a tooth for preparing the tooth for receiving a dental restoration element. The computer device comprises a processor and a memory storing program instructions executable by the processor. Execution of the program instructions by the processor causes the computer device to receive a three-dimensional digital tooth model. The three-dimensional digital tooth model is descriptive of a current form and of a position of the tooth within a dental situation of a patient. A three-dimensional digital restorative tooth model is received, which defines a preliminary target form of the tooth to be achieved by applying the dental restoration element. A definition of a restoration area is received. The definition indicates a surface area of the tooth, at which the dental restoration element is to be arranged. A first value selected for a basic preparation depth of the preparation within the restoration area of the three-dimensional digital tooth model is received. Furthermore, a second value selected for a restoration thickness of the dental restoration element is received. A first reference surface using an inward projection of the restoration area of the three-dimensional digital tooth model into the three-dimensional digital tooth model depending on the first value selected for the basic preparation depth. Furthermore, a second reference surface is determined using an inward projection of a surface section of the three-dimensional digital restorative tooth model overlapping with the restoration area into the three-dimensional digital restorative tooth model depending on the second value selected for the restoration thickness. One or more preparation reference surface sections are determined using the first and second reference surface. The determined one or more preparation reference surface sections are used to determine the preparation surface of the tooth.

Execution of the program instructions by the processor of the computer device may further cause the computer device to execute any of the aforementioned examples of the method for determining the preparation surface of the tooth.

In another aspect, the invention relates to a system comprising the computer device according to any of the aforementioned examples of a computer device. The system further comprises a manufacturing device configured for manufacturing the dental restoration element. Execution of the program instructions by the processor further causes the computer device to use the preparation surface of the tooth and the restoration surface of the dental restoration element for generating a three-dimensional digital dental restoration model defining a form of the dental restoration element and to control the manufacturing device for manufacturing the dental restoration element in form of a physical copy of the three-dimensional digital dental restoration model.

Execution of the program instructions by the processor of the computer device may further cause the computer device to execute any of the aforementioned examples of the method for manufacturing any of the aforementioned examples of the dental restoration element.

For example, the manufacturing device may comprise at least one of the following: a machining device, a 3D printing device.

The above-described examples and embodiments may be combined freely as long as the combinations are not mutually exclusive.

BRIEF DESCRIPTION OF THE DRAWINGS

In the following, examples are described in greater detail making reference to the drawings in which:

DETAILED DESCRIPTION in the following, similar elements are denoted by the same reference numerals. Elements which have been discussed previously will not necessarily be discussed in later figures if the function is equivalent.

FIG. 1 shows a cross-sectional view of an exemplary three-dimensional digital tooth model 100. The three-dimensional digital tooth model 100 is descriptive of a current form and of a position of a tooth of a patient within a dental situation of the patient. For this tooth, e.g., a preparation surface for preparing the tooth for receiving a dental restoration element is to be determined. In addition, a three-dimensional digital gingiva model 102 of a gingiva of the patient is shown, within which the tooth, i.e., the three-dimensional digital tooth model 100 is arranged.

FIG. 2 shows the three-dimensional digital tooth model 100 and the three-dimensional digital gingiva model 102 of FIG. 1 with a three-dimensional digital restorative tooth model 106 added. The three-dimensional digital restorative tooth model 106 defines a preliminary target form of the tooth to be achieved by applying the dental restoration element. The three-dimensional digital restorative tooth model 106 is arranged relative to the three-dimensional digital tooth model 100, such as the dental restoration element should be positioned relative to the position of the tooth as defined by the three-dimensional digital tooth model 100. In case of FIG. 2, the three-dimensional digital restorative tooth model 106 is arranged approximately at the same position with the same orientation as the three-dimensional digital tooth model 100, i.e., the patient's tooth. Furthermore, a definition of a restoration area is provided, e.g., by a margin line, defining a boundary 104 of the restoration area 104 on the surface of the three-dimensional digital tooth model 100. This definition indicates a surface area of the tooth, i.e., three-dimensional digital tooth model 100, at which the dental restoration element is to be arranged.

FIG. 3 corresponds to FIG. 2 with a first reference surface 108 and a second reference surface 110 added. The first reference surface 108 is defined relative to the three-dimensional digital tooth model 100, while the second reference surface 110 is defined relative to the three-dimensional digital restorative tooth model 106. For this purpose, a first value selected for a basic preparation depth 112 of the preparation within the restoration area defined within the boundaries 104 on the three-dimensional digital tooth model 100 is selected. Furthermore, a second value is selected for a restoration thickness 114 of the dental restoration element. The first reference surface 108 is determined using an inward projection of the restoration area limited by boundaries 104 into the three-dimensional digital tooth model 100 depending on the first value selected for the basic preparation depth 112. For example, the first reference surface 108 is arranged within the three-dimensional digital tooth model 100 below the restoration area with a uniform distance, which is equal to the basic preparation depth 112 defined by the selected first value. Furthermore, the second reference surface 110 is determined using an inward projection of a surface section of the three-dimensional digital restorative tooth model 106 overlapping with the restoration area limited by the boundaries 104 into the three-dimensional digital restorative tooth model 106 depending on the second value selected for the restoration thickness 114. For example, the second reference surface 110 is arranged within the three-dimensional digital restorative tooth model 106 below its surface with a uniform distance, which is equal to the restoration thickness 114 defined by the selected second value.

Figure 3:
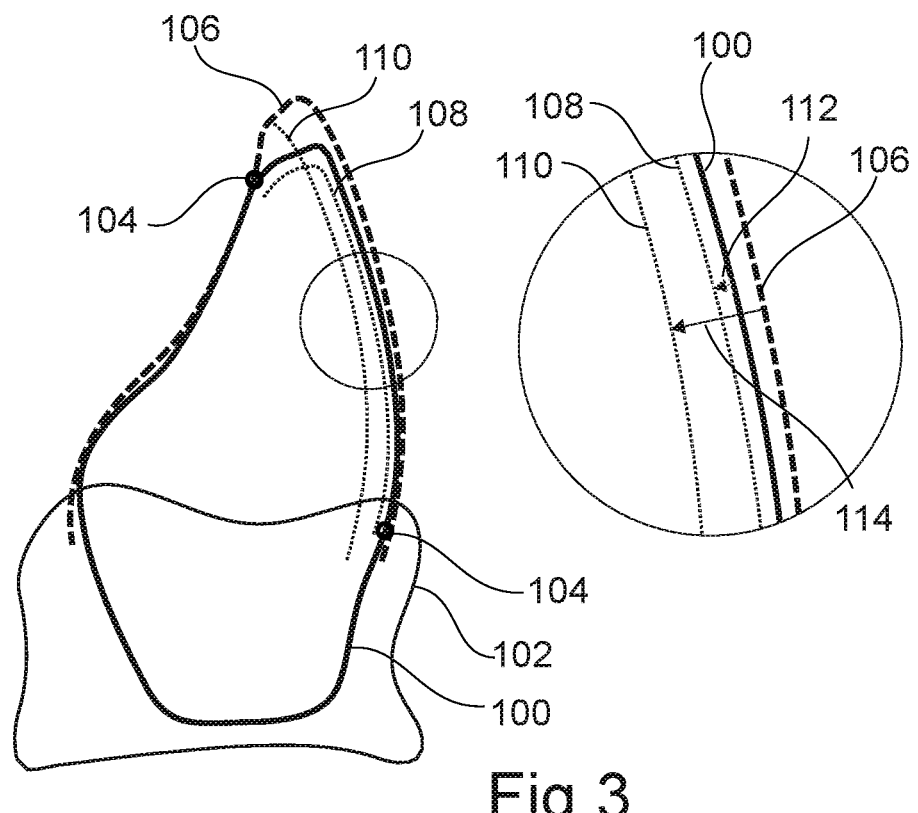
FIG. 3 shows a cross-sectional view of the exemplary three-dimensional digital restorative tooth model of FIG. 2 with a first and second reference surface added.

In case of FIG. 3, the second reference surface 110 mainly extends below the first reference surface 108. Only a small incisal section of the first reference surface 108 extends below the second reference surface 110.

Figure 2:
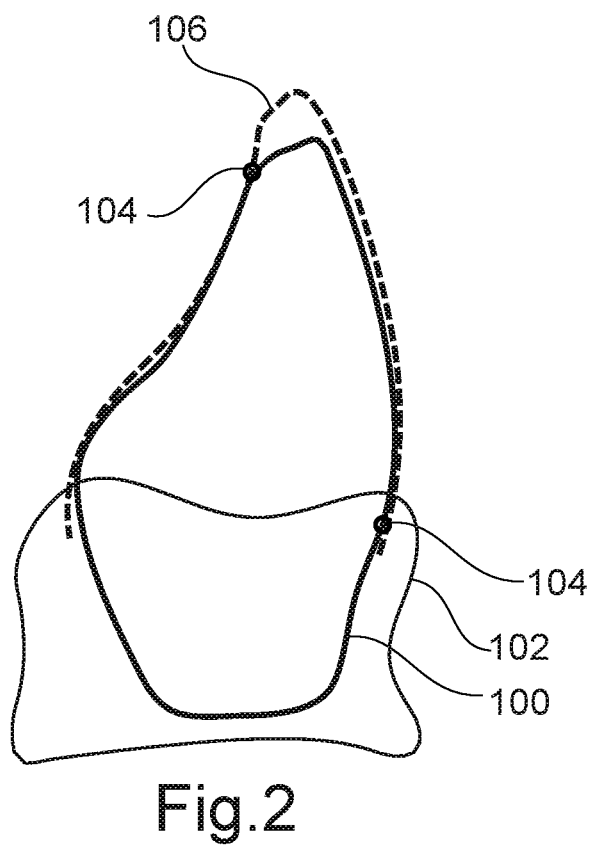
FIG. 2 shows a cross-sectional view of an exemplary three-dimensional digital restorative tooth model for the tooth of FIG. 1.
Figure 4:
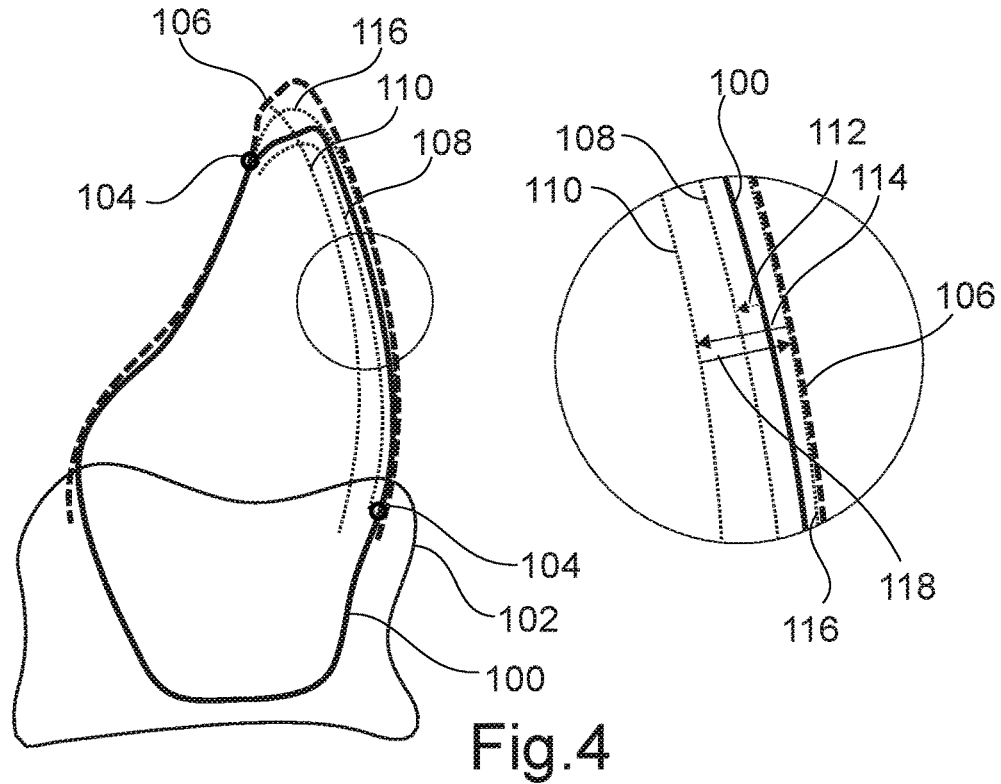
FIG. 4 shows a cross-sectional view of the exemplary three-dimensional digital restorative tooth model of FIG. 3 with a third reference surface added.

FIG. 4 corresponds to FIG. 2 with a third reference surface 116 added. The third reference surface 116 is defined relative to a preparation surface. For determining the preparation surface, one or more preparation reference surface sections are identified using the first and second reference surface 108, 110. For example, it is determined, which sections of the first reference surface 108 extend below the second reference surface 110 or coincide with a section of the second reference surface 110. Furthermore, it may be determined, which section of the second reference surface 110 extend below the first reference surface 108. The sections of first and/or second reference surface 108, 110 identified this way may, e.g., provide the preparation reference surface sections, which together may form the preparation surface.

The third reference surface 116 may be defined relative to the preparation surface. For this purpose, a third value for a required material thickness 118 of the dental restoration element may be provided. The third reference surface 116 is determined using an outward projection of the preparation surface depending on the third value selected for the required material thickness 118. For example, the third reference surface 116 is arranged above the restoration surface with a uniform distance, which is equal to the required material thickness 118. For example, a boundary of the third reference surface 116 may be defined by the boundary 104 of the restoration area. Thus, in a circumferential boundary region, the third reference surface 116 may be curved towards the boundary 104 defined on the surface of the three-dimensional digital tooth model 100. Only in this circumferential boundary region, the distance to the restoration surface may, e.g., decrease towards the boundary 104 and fall below the required material thickness 118.

In case of FIG. 4, the preparation surface may mainly be defined by the second reference surface 110 extending below the first reference surface 108. Only a small incisal section of the first reference surface 108 extends below the second reference surface 110 and defines part of the preparation surface. Thus, the third reference surface 116 is mainly arranged above the second reference surface 110 in a distance equals the he third value selected for the required material thickness 118.

Figure 5:
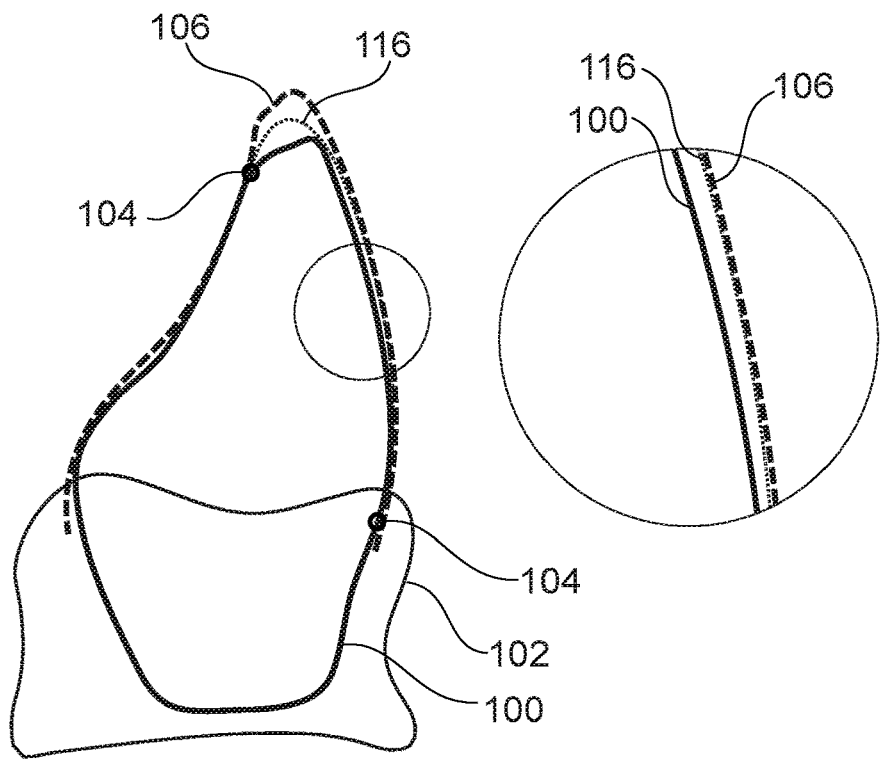
FIG. 5 shows a cross-sectional view of the exemplary three-dimensional digital restorative tooth model of FIG. 2 with a restoration surface.

FIG. 5 illustrates the form and position of the third reference surface 116 relative to the three-dimensional digital restorative tooth model 106. Furthermore, the three-dimensional digital tooth model 100 and the three-dimensional digital gingiva model 102 are shown. In case of FIG. 5, the third reference surface 116 mainly coincides with the surface of the three-dimensional digital restorative tooth model 106.

Figures 6, 7:
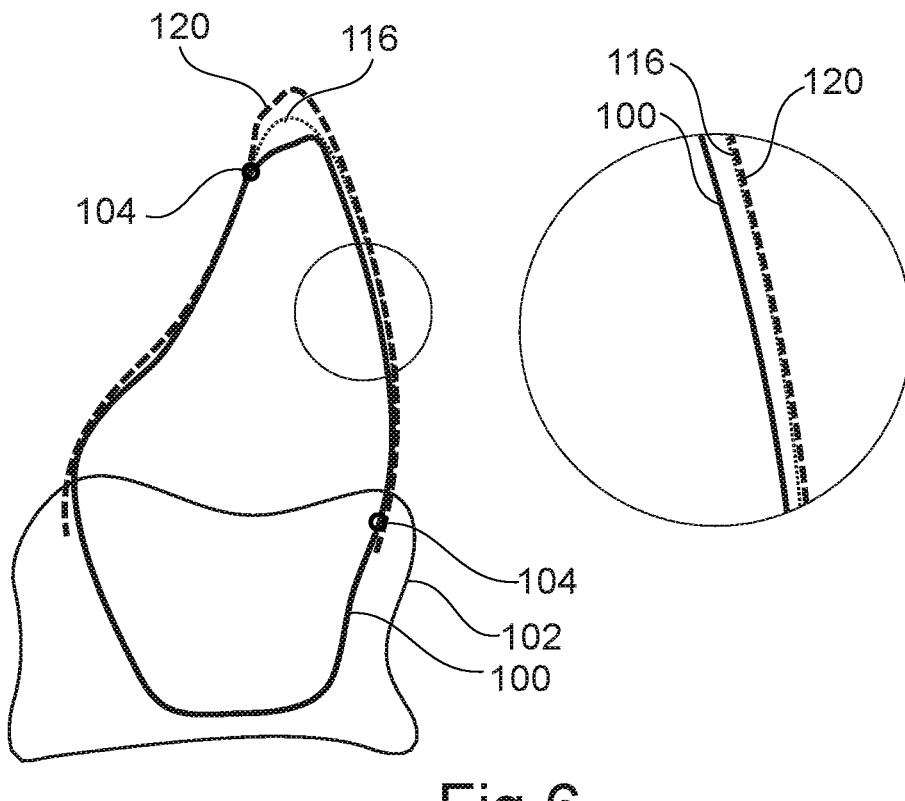
FIG. 6 shows a cross-sectional view of an exemplary three-dimensional digital tooth model of FIG. 1 with the restoration surface.
FIG. 7 shows a cross-sectional view of an exemplary three-dimensional digital preparation tooth model of the tooth of FIG. 1.

FIG. 6 shows a restoration surface 120 of the dental restoration element. For determining the restoration surface 120, one or more restoration reference surface sections are used. These one or more restoration reference surface sections are determined using the three-dimensional digital restorative tooth model 106 and the third reference surface 116 as illustrated in FIG. 5.

For example, it is determined, which sections of the third reference surface 116 extend out of the three-dimensional digital restorative tooth model 106 and thus above the surface of the out of the three-dimensional digital restorative tooth model 106 or coincide with a surface section of the three-dimensional digital restorative tooth model 106. Furthermore, it may be determined, which surface section of the three-dimensional digital restorative tooth model 106 extends above the third reference surface 116. The sections of the third reference surface 116 and/or surface sections of the three-dimensional digital restorative tooth model 106 identified this way may, e.g., provide the restoration reference surface sections, which together may form the restoration surface 120.

FIG. 7 shows a three-dimensional digital preparation tooth model 124 defining a form of the prepared tooth resulting from preparing preparation surface 122 within the tooth defined by the three-dimensional digital tooth model 100. Furthermore, it is illustrated how the preparing preparation surface 122 is determined using the first reference surface 108 and the second reference surface 110, i.e., preparation reference surface sections, e.g., provided by the first and second reference surface 108, 110. On the preparation surface 122, a three-dimensional digital dental restoration model 126 defining a form of the dental restoration element is arranged. The three-dimensional digital dental restoration model 126 is generated using the preparation surface 122 of the tooth and the restoration surface 120 of the dental restoration element defining the contours of the three-dimensional digital dental restoration model 126.

In case of FIG. 7, the preparation surface 122 may mainly be defined by the second reference surface 110. Only a small incisal section of the preparation surface 122 may be defined by the first reference section.

Figure 8:
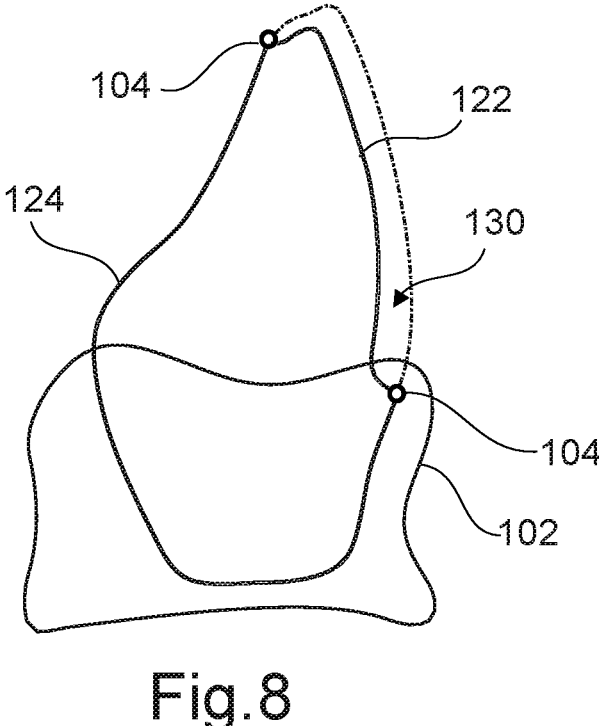
FIG. 8 shows a cross-sectional view of an exemplary tooth mass loss resulting for a preparation defined by the three-dimensional digital preparation tooth model of FIG. 7.

FIG. 8 shows a tooth mass loss 130, i.e., an amount of dental material to be removed from the tooth defined by the three-dimensional digital tooth model 100, in order to prepare the preparation surface 122 within the boundaries 104 of the restoration area defined on the surface of the three-dimensional digital tooth model 100.

Figure 9:
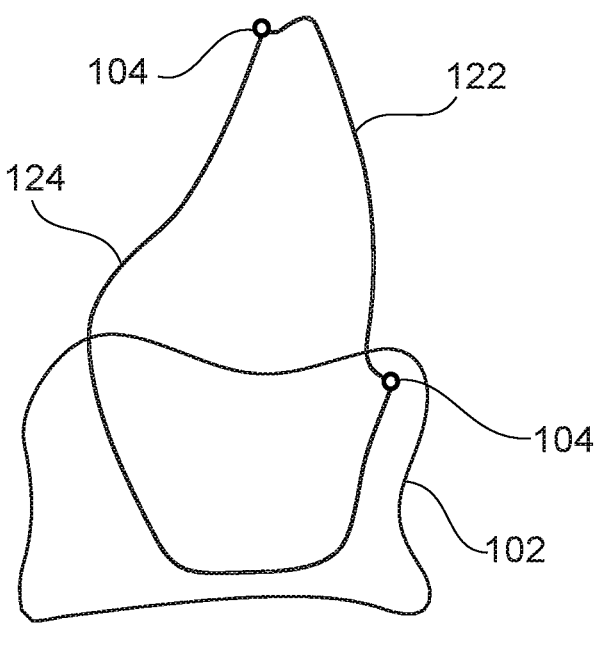
FIG. 9 shows a cross-sectional view of the exemplary three-dimensional digital preparation tooth model of FIG. 7.

FIG. 9 shows the three-dimensional digital preparation tooth model 124 of the prepared tooth with the preparation surface 122 defined within the boundaries 104 of the restoration area.

Figures 10, 11:
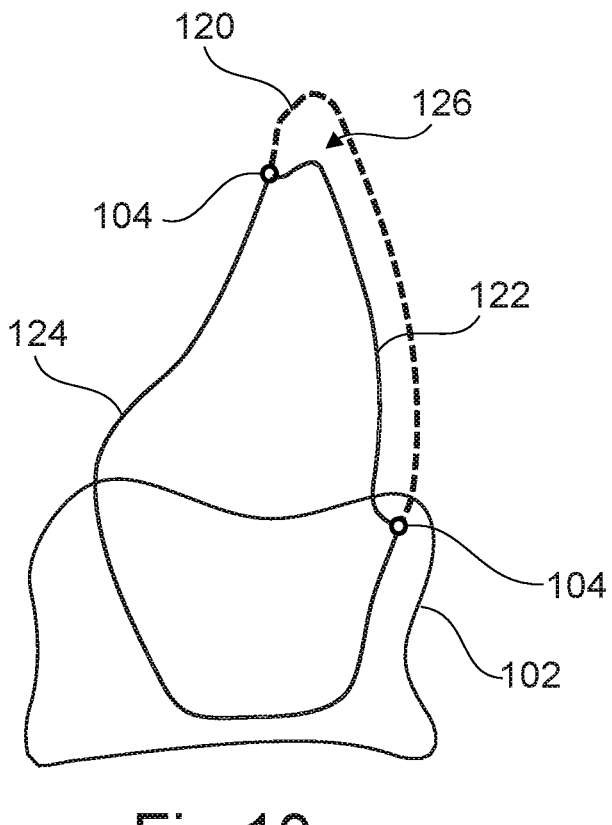
FIG. 10 shows a cross-sectional view of an exemplary three-dimensional digital dental restoration model with the restoration surface of FIG. 5.
FIG. 11 shows a cross-sectional view of the exemplary three-dimensional digital dental restoration model of FIG. 10.

FIG. 10 shows the three-dimensional digital preparation tooth model 124 of the prepared tooth with the three-dimensional digital dental restoration model 126 defining the dental restoration element arranged thereon, i.e., within the restoration area limited by the boundary 104 on the preparation surface 122.

FIG. 11 shows the three-dimensional digital dental restoration model 126 generated using the preparation surface 122 of the tooth and the restoration surface 120 of the dental restoration element defining the contours of the three-dimensional digital dental restoration model 126. The three-dimensional digital dental restoration model 126 illustrated in FIG. 11 may, e.g., be configured to be arranged on the prepared tooth along the insertion direction 144.

Figure 1:
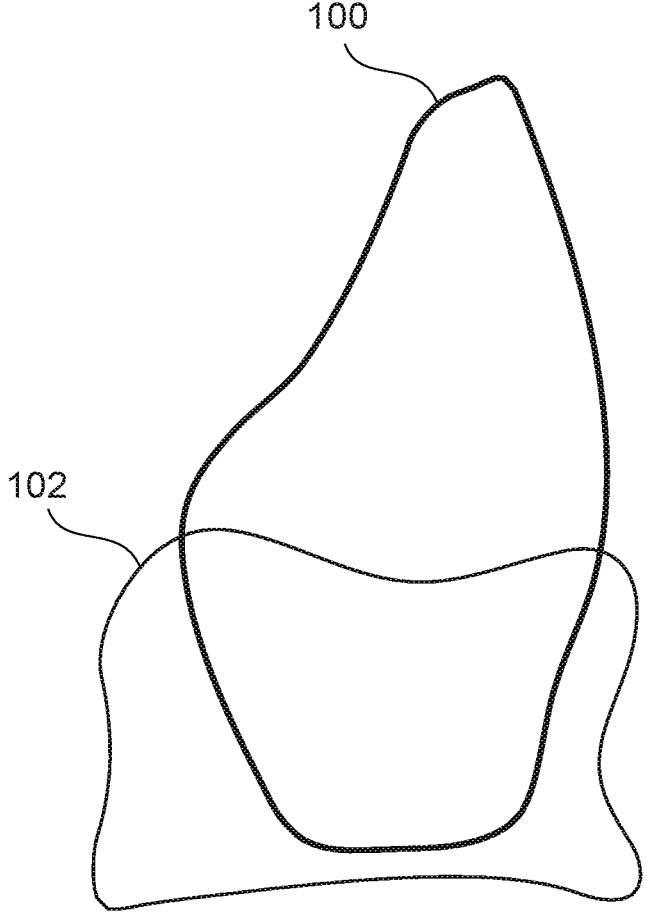
FIG. 1 shows a cross-sectional view of an exemplary three-dimensional digital tooth model of a tooth.
Figure 12:
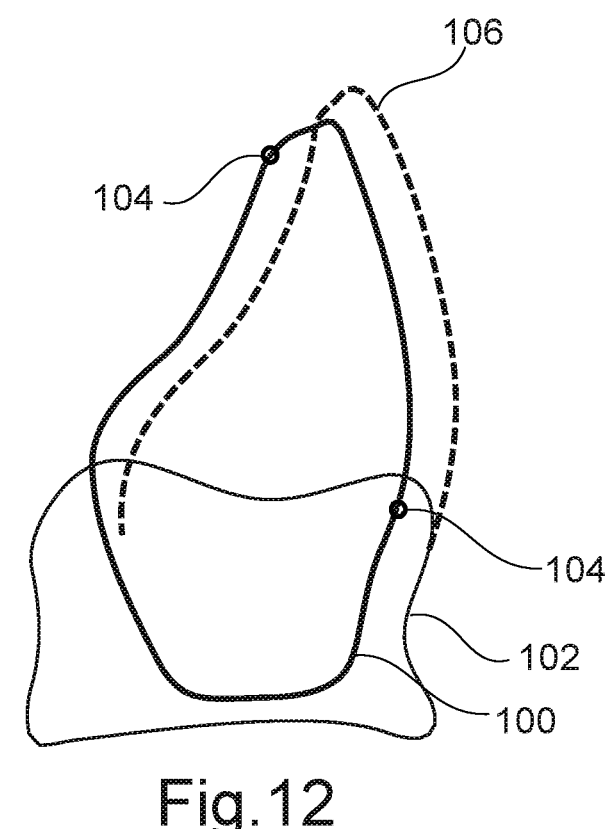
FIG. 12 shows a cross-sectional view of an exemplary three-dimensional digital restorative tooth model for the tooth of FIG. 1.

FIG. 12 shows the three-dimensional digital tooth model 100 and the three-dimensional digital gingiva model 102 of FIG. 1 with a three-dimensional digital restorative tooth model 106 added. The three-dimensional digital restorative tooth model 106 defines a preliminary target form of the tooth to be achieved by applying the dental restoration element. The three-dimensional digital restorative tooth model 106 is arranged relative to the three-dimensional digital tooth model 100, such as the dental restoration element should be positioned relative to the position of the tooth as defined by the three-dimensional digital tooth model 100. Furthermore, a definition of a restoration area is provided, e.g., by a margin line, defining a boundary 104 of the restoration area 104 on the surface of the three-dimensional digital tooth model 100. This definition indicates a surface area of the tooth, i.e., three-dimensional digital tooth model 100, at which the dental restoration element is to be arranged. In case of FIG. 12, the three-dimensional digital restorative tooth model 106 is arranged a bit in front of the three-dimensional digital tooth model 100, i.e., the patient's tooth, in a labial direction.

Figure 13:
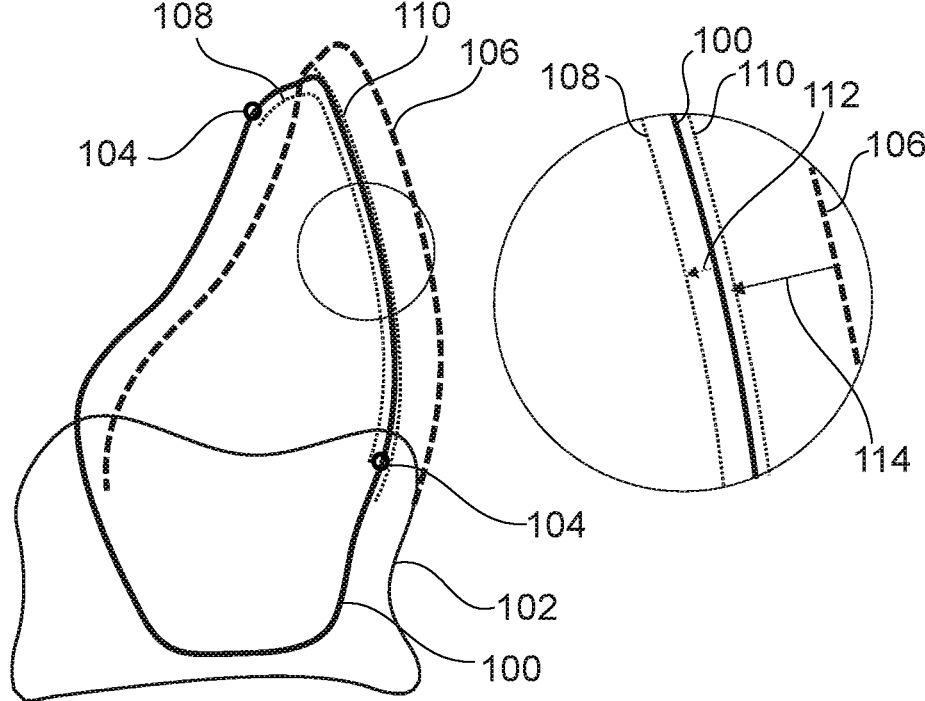
FIG. 13 shows a cross-sectional view of the exemplary three-dimensional digital restorative tooth model of FIG. 12 with a first and second reference surface added.

FIG. 13 corresponds to FIG. 12 with a first reference surface 108 and a second reference surface 110 added. The first reference surface 108 is defined relative to the three-dimensional digital tooth model 100, while the second reference surface 110 is defined relative to the three-dimensional digital restorative tooth model 106. For this purpose, a first value selected for a basic preparation depth 112 of the preparation within the restoration area defined within the boundaries 104 on the three-dimensional digital tooth model 100 is selected. Furthermore, a second value is selected for a restoration thickness 114 of the dental restoration element. The first reference surface 108 is determined using an inward projection of the restoration area limited by boundaries 104 into the three-dimensional digital tooth model 100 depending on the first value selected for the basic preparation depth 112. For example, the first reference surface 108 is arranged within the three-dimensional digital tooth model 100 below the restoration area with a uniform distance, which is equal to the basic preparation depth 112 defined by the selected first value. Furthermore, the second reference surface 110 is determined using an inward projection of a surface section of the three-dimensional digital restorative tooth model 106 overlapping with the restoration area limited by the boundaries 104 into the three-dimensional digital restorative tooth model 106 depending on the second value selected for the restoration thickness 114. For example, the second reference surface 110 is arranged within the three-dimensional digital restorative tooth model 106 below its surface with a uniform distance, which is equal to the restoration thickness 114 defined by the selected second value.

In case of FIG. 13, the first reference surface 108 extends below the second reference surface 110.

Figure 14:
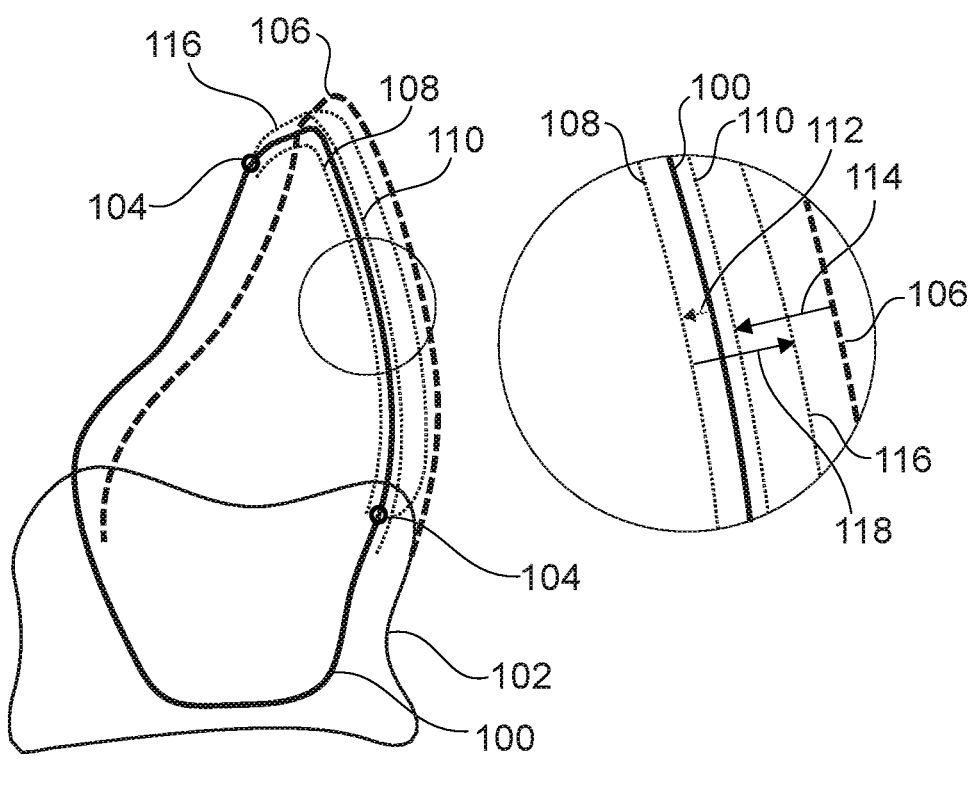
FIG. 14 shows a cross-sectional view of the exemplary three-dimensional digital restorative tooth model of FIG. 13 with a third reference surface added.

FIG. 14 corresponds to FIG. 12 with a third reference surface 116 added. The third reference surface 116 is defined relative to a preparation surface. For determining the preparation surface, one or more preparation reference surface sections are identified using the first and second reference surface 108, 110. For example, it is determined, which sections of the first reference surface 108 extend below the second reference surface 110 or coincide with a section of the second reference surface 110. Furthermore, it may be determined, which section of the second reference surface 110 extend below the first reference surface 108. The sections of first and/or second reference surface 108, 110 identified this way may, e.g., provide the preparation reference surface sections, which together may form the preparation surface.

The third reference surface 116 may be defined relative to the preparation surface. For this purpose, a third value for a required material thickness 118 of the dental restoration element may be provided. The third reference surface 116 is determined using an outward projection of the preparation surface depending on the third value selected for the required material thickness 118. For example, the third reference surface 116 is arranged above the restoration surface with a uniform distance, which is equal to the required material thickness 118. For example, a boundary of the third reference surface 116 may be defined by the boundary 104 of the restoration area. Thus, in a circumferential boundary region, the third reference surface 116 may be curved towards the boundary 104 defined on the surface of the three-dimensional digital tooth model 100. Only in this circumferential boundary region, the distance to the restoration surface may, e.g., decrease towards the boundary 104 and fall below the required material thickness 118.

Since the first reference surface 108 extends below the second reference surface 110, the preparation surface in case of FIG. 13 may be defined by the first reference surface 108. The third reference surface 116 may therefore be arranged above the first reference surface 108 defining the restoration surface in a distance equal to the selected third value, i.e., the required material thickness 118.

Figure 15:
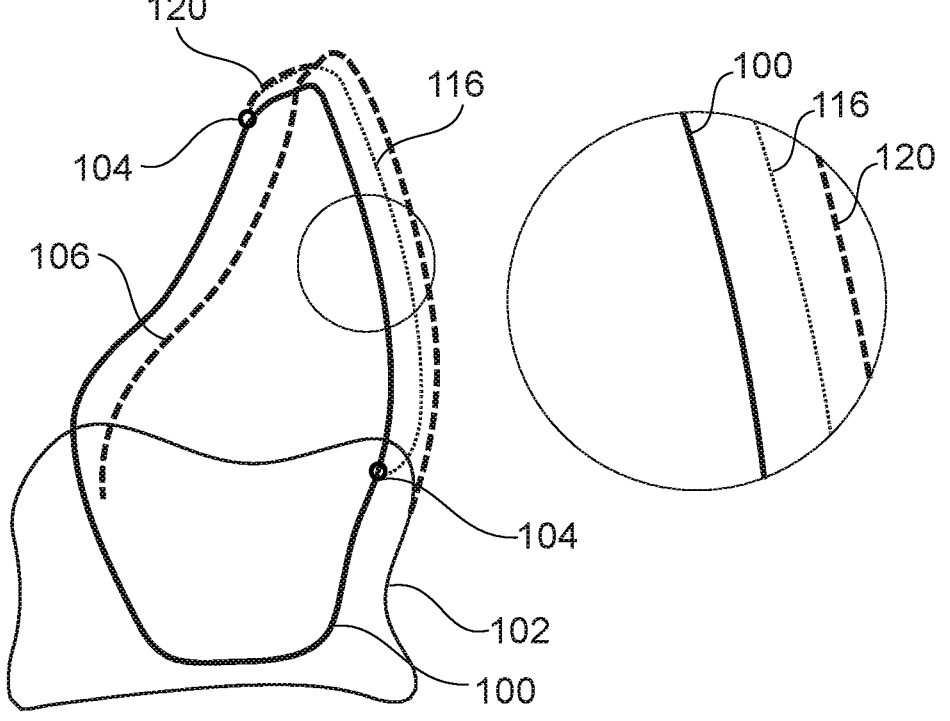
FIG. 15 shows a cross-sectional view of the exemplary three-dimensional digital restorative tooth model of FIG. 12 with a restoration surface.

FIG. 15 illustrates the form and position of the third reference surface 116 relative to the three-dimensional digital restorative tooth model 106. Furthermore, the three-dimensional digital tooth model 100 and the three-dimensional digital gingiva model 102 are shown. Furthermore, a restoration surface 120 of the dental restoration element defined by the third reference surface 116 and the surface of the three-dimensional digital restorative tooth model 106 is shown. In an incisal section of the tooth, restoration surface 120 is defined by the third reference surface 116, while in a labial section, the restoration surface 120 is defined by the surface of the three-dimensional digital restorative tooth model 106.

Figure 16:
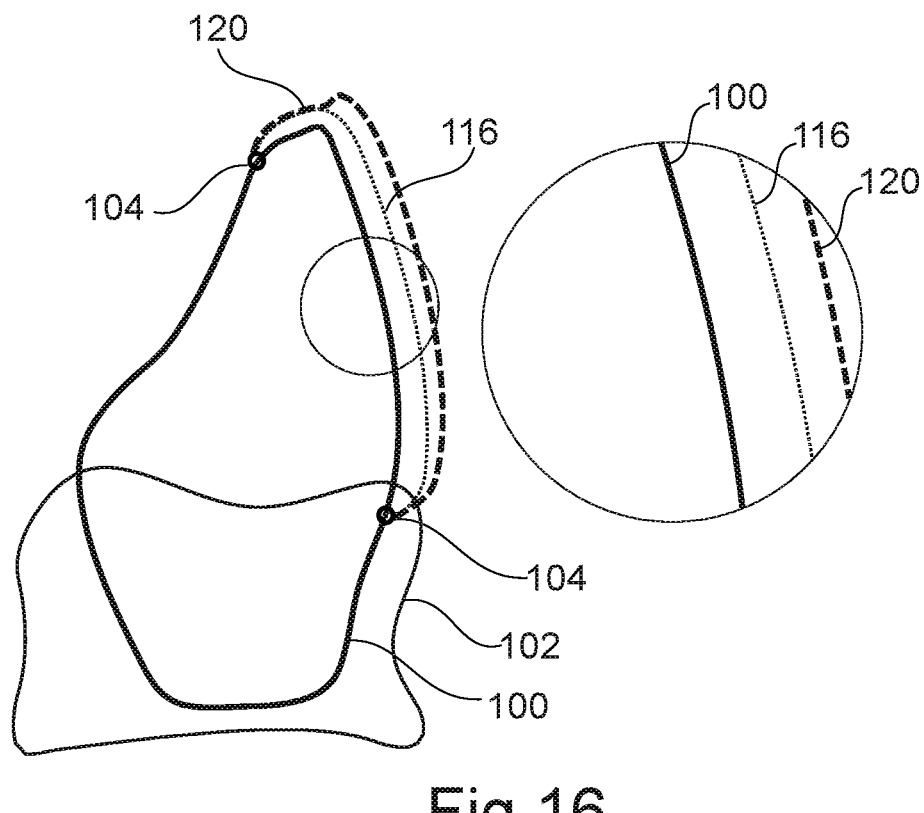
FIG. 16 shows a cross-sectional view of an exemplary three-dimensional digital tooth model of FIG. 1 with the restoration surface.

FIG. 16 shows a restoration surface 120 of the dental restoration element. For determining the restoration surface 120, one or more restoration reference surface sections are used. These one or more restoration reference surface sections are determined using the three-dimensional digital restorative tooth model 106 and the third reference surface 116.

For example, it is determined, which sections of the third reference surface 116 extend out of the three-dimensional digital restorative tooth model 106 and thus above the surface of the out of the three-dimensional digital restorative tooth model 106 or coincide with a surface section of the three-dimensional digital restorative tooth model 106. Furthermore, it may be determined, which surface section of the three-dimensional digital restorative tooth model 106 extends above the third reference surface 116. The sections of the third reference surface 116 and/or surface sections of the three-dimensional digital restorative tooth model 106 identified this way may, e.g., provide the restoration reference surface sections, which together may form the restoration surface 120.

Since a large portion of the surface of the three-dimensional digital restorative tooth model 106 is arranged above the third reference surface 116, the restoration surface 120 may manly be defined by the surface of the three-dimensional digital restorative tooth model 106. Only in an incisal section, the restoration surface 120 may be defined by the third reference surface 116. This may have the effect, that the dental restoration element may mainly have a material thickness larger the required material thickness 118, since the surface of the three-dimensional digital restorative tooth model 106 is further distanced away from the preparation surface than the third reference surface 116. For example, the boundary 104 of the restoration area may, e.g., be moved in the incisal section of the tooth in order smoothen the restoration surface 120 in the incisal section.

Figure 17:
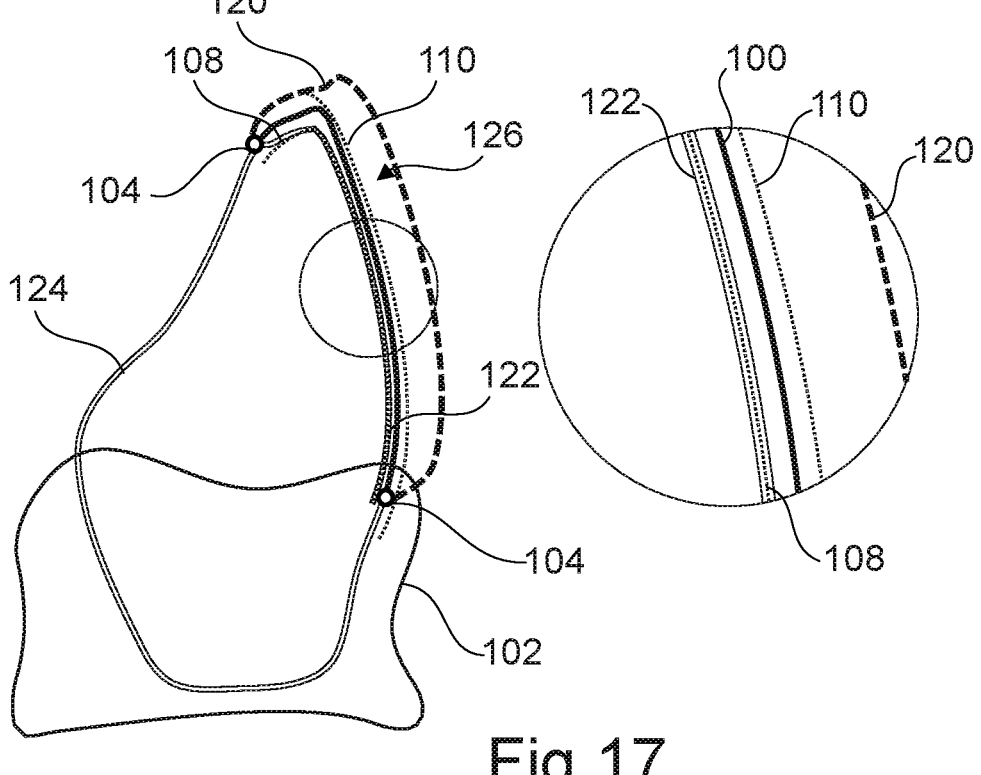
FIG. 17 shows a cross-sectional view of an exemplary three-dimensional digital preparation tooth model of the tooth of FIG. 1.

FIG. 17 shows a three-dimensional digital preparation tooth model 124 defining a form of the prepared tooth resulting from preparing preparation surface 122 within the tooth defined by the three-dimensional digital tooth model 100. Furthermore, it is illustrated how the preparing preparation surface 122 is determined using the first reference surface 108 and the second reference surface 110, i.e., preparation reference surface sections, e.g., provided by the first and second reference surface 108, 110. On the preparation surface 122, a three-dimensional digital dental restoration model 126 defining a form of the dental restoration element is arranged. The three-dimensional digital dental restoration model 126 is generated using the preparation surface 122 of the tooth and the restoration surface 120 of the dental restoration element defining the contours of the three-dimensional digital dental restoration model 126. In case of FIG. 17, the restoration surface 122 may, e.g., be defined by the first reference surface 108.

Figure 18:
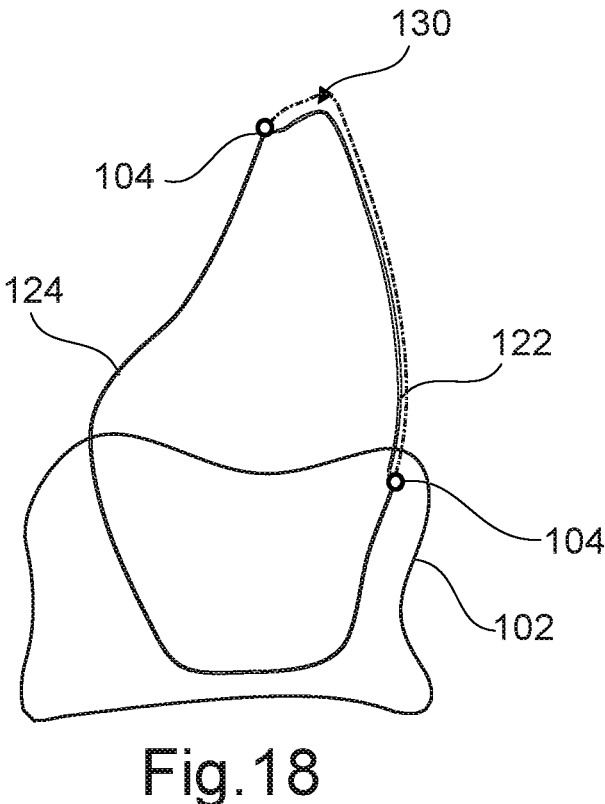
FIG. 18 shows a cross-sectional view of an exemplary tooth mass loss resulting for a preparation defined by the three-dimensional digital preparation tooth model of FIG. 17.

FIG. 18 shows a tooth mass loss 130, i.e., an amount of dental material to be removed from the tooth defined by the three-dimensional digital tooth model 100, in order to prepare the preparation surface 122 within the boundaries 104 of the restoration area defined on the surface of the three-dimensional digital tooth model 100.

Figure 19:
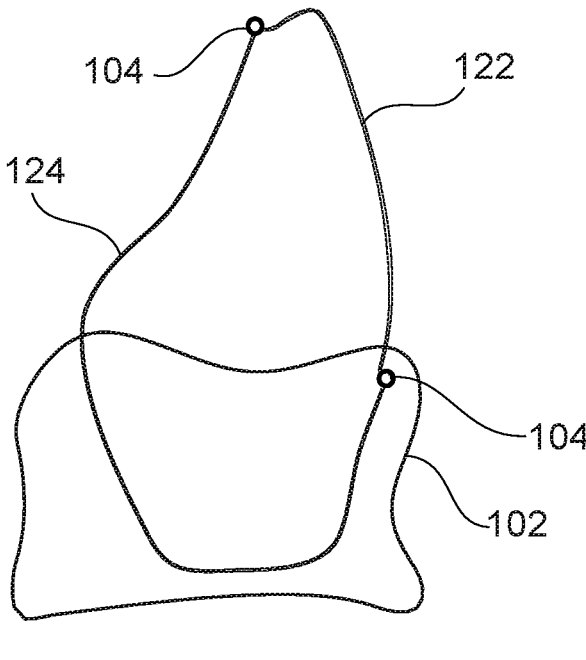
FIG. 19 shows a cross-sectional view of the exemplary three-dimensional digital preparation tooth model of FIG. 17.

FIG. 19 shows the three-dimensional digital preparation tooth model 124 of the prepared tooth with the preparation surface 122 defined within the boundaries 104 of the restoration area.

Figures 20, 21:
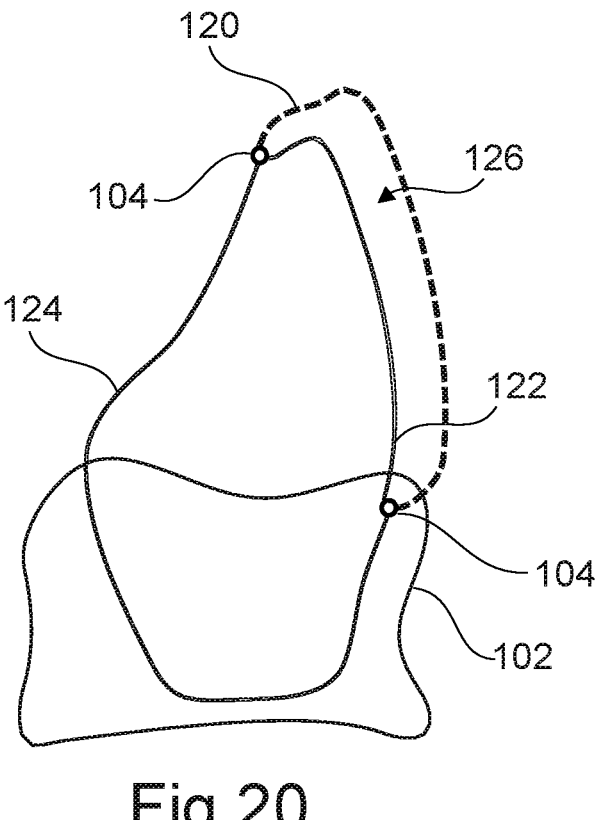
FIG. 20 shows a cross-sectional view of an exemplary three-dimensional digital dental restoration model with the restoration surface of FIG. 15.
FIG. 21 shows a cross-sectional view of the exemplary three-dimensional digital dental restoration model of FIG. 20.

FIG. 20 shows the three-dimensional digital preparation tooth model 124 of the prepared tooth with the three-dimensional digital dental restoration model 126 defining the dental restoration element arranged thereon, i.e., within the restoration area limited by the boundary 104 on the preparation surface 122.

FIG. 21 shows the three-dimensional digital dental restoration model 126 generated using the preparation surface 122 of the tooth and the restoration surface 120 of the dental restoration element defining the contours of the three-dimensional digital dental restoration model 126. The three-dimensional digital dental restoration model 126 illustrated in FIG. 21 may, e.g., be configured to be arranged on the prepared tooth along the insertion direction 144.

Figure 22:
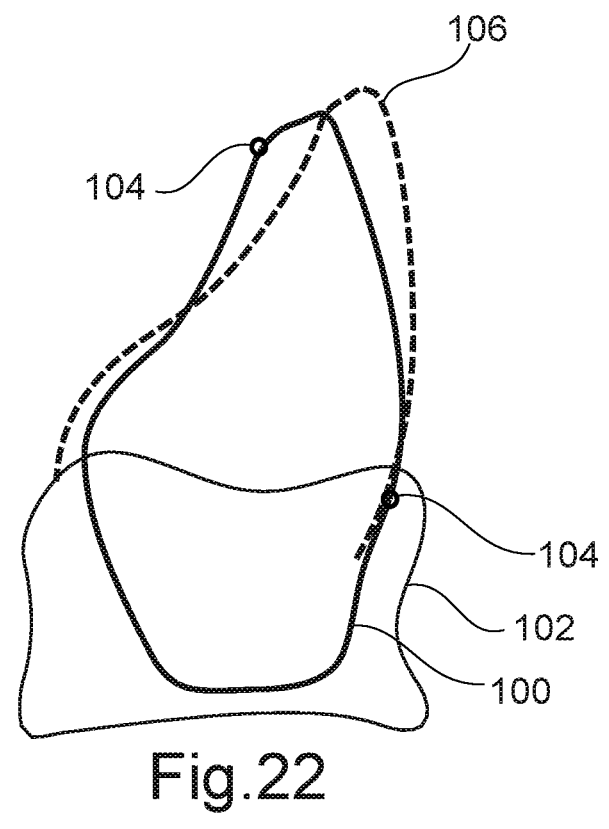
FIG. 22 shows a cross-sectional view of an exemplary three-dimensional digital restorative tooth model for the tooth of FIG. 1.

FIG. 22 shows the three-dimensional digital tooth model 100 and the three-dimensional digital gingiva model 102 of FIG. 1 with a three-dimensional digital restorative tooth model 106 added. The three-dimensional digital restorative tooth model 106 defines a preliminary target form of the tooth to be achieved by applying the dental restoration element. The three-dimensional digital restorative tooth model 106 is arranged relative to the three-dimensional digital tooth model 100, such as the dental restoration element should be positioned relative to the position of the tooth as defined by the three-dimensional digital tooth model 100. Furthermore, a definition of a restoration area is provided, e.g., by a margin line, defining a boundary 104 of the restoration area 104 on the surface of the three-dimensional digital tooth model 100. This definition indicates a surface area of the tooth, i.e., three-dimensional digital tooth model 100, at which the dental restoration element is to be arranged.

In case of FIG. 22, the three-dimensional digital restorative tooth model 106 is tilted in the labial direction relative to the orientation of the three-dimensional digital tooth model 100, i.e., the patient's tooth.

Figure 23:
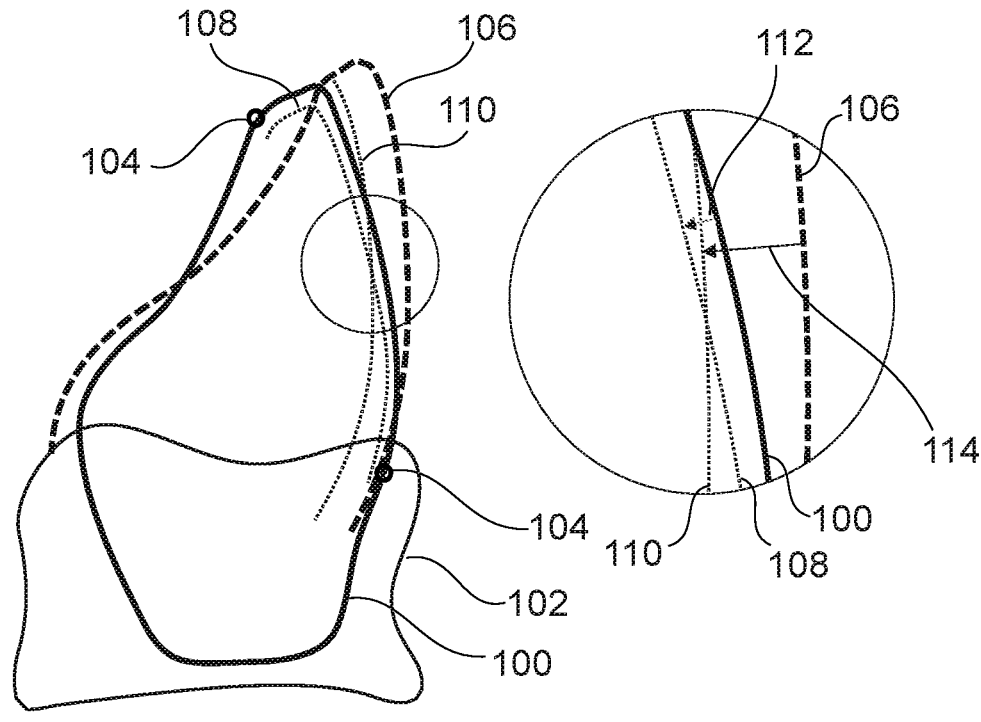
FIG. 23 shows a cross-sectional view of the exemplary three-dimensional digital restorative tooth model of FIG. 22 with a first and second reference surface added.

FIG. 23 corresponds to FIG. 22 with a first reference surface 108 and a second reference surface 110 added. The first reference surface 108 is defined relative to the three-dimensional digital tooth model 100, while the second reference surface 110 is defined relative to the three-dimensional digital restorative tooth model 106. For this purpose, a first value selected for a basic preparation depth 112 of the preparation within the restoration area defined within the boundaries 104 on the three-dimensional digital tooth model 100 is selected. Furthermore, a second value is selected for a restoration thickness 114 of the dental restoration element. The first reference surface 108 is determined using an inward projection of the restoration area limited by boundaries 104 into the three-dimensional digital tooth model 100 depending on the first value selected for the basic preparation depth 112. For example, the first reference surface 108 is arranged within the three-dimensional digital tooth model 100 below the restoration area with a uniform distance, which is equal to the basic preparation depth 112 defined by the selected first value. Furthermore, the second reference surface 110 is determined using an inward projection of a surface section of the three-dimensional digital restorative tooth model 106 overlapping with the restoration area limited by the boundaries 104 into the three-dimensional digital restorative tooth model 106 depending on the second value selected for the restoration thickness 114. For example, the second reference surface 110 is arranged within the three-dimensional digital restorative tooth model 106 below its surface with a uniform distance, which is equal to the restoration thickness 114 defined by the selected second value.

In case of FIG. 23, the first reference surface 108 and the second reference surface 110 intersect. In a labial-cervical section of the tooth, the second reference surface 110 extends below the first reference surface 108. In a labial-incisal section of the tooth, the first reference surface 108 extends below the second reference surface 110.

Figure 24:
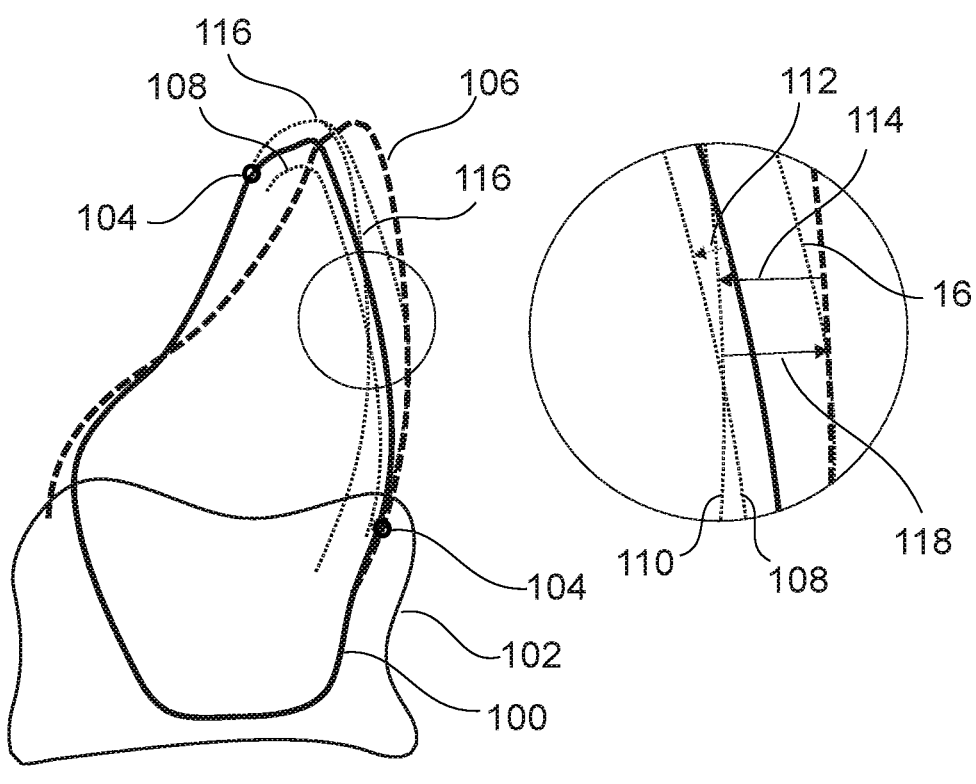
FIG. 24 shows a cross-sectional view of the exemplary three-dimensional digital restorative tooth model of FIG. 23 with a third reference surface added.

FIG. 24 corresponds to FIG. 22 with a third reference surface 116 added. The third reference surface 116 is defined relative to a preparation surface. For determining the preparation surface, one or more preparation reference surface sections are identified using the first and second reference surface 108, 110. For example, it is determined, which sections of the first reference surface 108 extend below the second reference surface 110 or coincide with a section of the second reference surface 110. Furthermore, it may be determined, which section of the second reference surface 110 extend below the first reference surface 108. The sections of first and/or second reference surface 108, 110 identified this way may, e.g., provide the preparation reference surface sections, which together may form the preparation surface.

The third reference surface 116 may be defined relative to the preparation surface. For this purpose, a third value for a required material thickness 118 of the dental restoration element may be provided. The third reference surface 116 is determined using an outward projection of the preparation surface depending on the third value selected for the required material thickness 118. For example, the third reference surface 116 is arranged above the restoration surface with a uniform distance, which is equal to the required material thickness 118. For example, a boundary of the third reference surface 116 may be defined by the boundary 104 of the restoration area. Thus, in a circumferential boundary region, the third reference surface 116 may be curved towards the boundary 104 defined on the surface of the three-dimensional digital tooth model 100. Only in this circumferential boundary region, the distance to the restoration surface may, e.g., decrease towards the boundary 104 and fall below the required material thickness 118.

In case of FIG. 24, the restoration surface is defined by the second reference surface 110 in a labial-cervical section of the tooth, while it is defined by the first reference surface 108 in a labial-incisal section. Therefore, the third reference surface 116 is arranged in the labial-cervical section in a distance equal to the required material thickness 118 above the second reference surface 110 defining the restoration surface in this section. In a labial-incisal section, the third reference surface 116 is arranged in a distance equal to the required material thickness 118 above the first reference surface 108 defining the restoration surface in this section.

Figure 25:
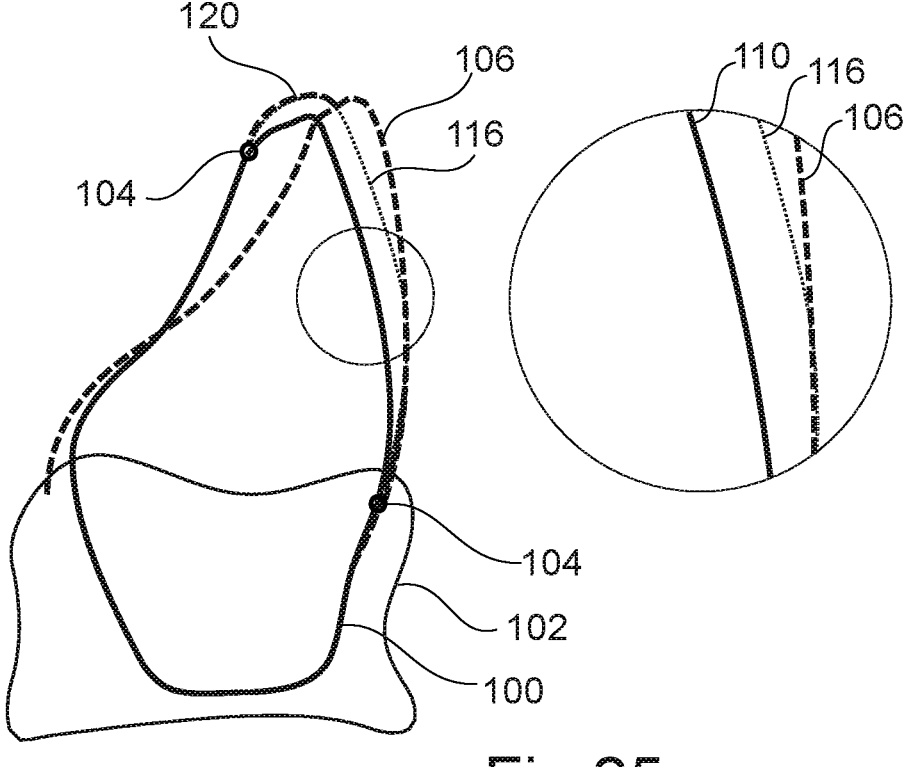
FIG. 25 shows a cross-sectional view of the exemplary three-dimensional digital restorative tooth model of FIG. 22 with a restoration surface.

FIG. 25 illustrates the form and position of the third reference surface 116 relative to the three-dimensional digital restorative tooth model 106. Furthermore, the three-dimensional digital tooth model 100 and the three-dimensional digital gingiva model 102 are shown. Furthermore, a restoration surface 120 of the dental restoration element defined by the third reference surface 116 and the surface of the three-dimensional digital restorative tooth model 106 is shown. In an incisal section of the tooth, restoration surface 120 is defined by the third reference surface 116. In an upper labial section, the restoration surface 120 is defined by the surface of the tilted three-dimensional digital restorative tooth model 106. In a labial-cervical section the third reference surface 116 and the surface of the three-dimensional digital restorative tooth model 106 coincide, both defining the restoration surface 120.

Figures 26, 27:
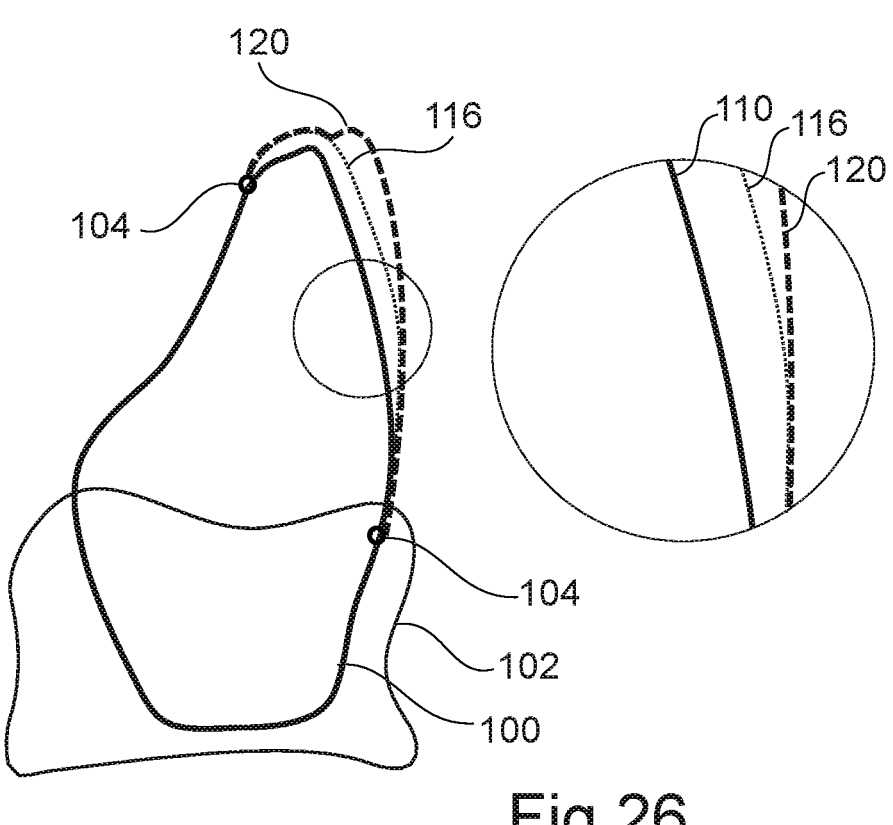
FIG. 26 shows a cross-sectional view of an exemplary three-dimensional digital tooth model of FIG. 1 with the restoration surface.
FIG. 27 shows a cross-sectional view of an exemplary three-dimensional digital preparation tooth model of the tooth of FIG. 1.

FIG. 26 shows the restoration surface 120 of the dental restoration element. For determining the restoration surface 120, one or more restoration reference surface sections are used. These one or more restoration reference surface sections are determined using the three-dimensional digital restorative tooth model 106 and the third reference surface 116.

For example, it is determined, which sections of the third reference surface 116 extend out of the three-dimensional digital restorative tooth model 106 and thus above the surface of the out of the three-dimensional digital restorative tooth model 106 or coincide with a surface section of the three-dimensional digital restorative tooth model 106. Furthermore, it may be determined, which surface section of the three-dimensional digital restorative tooth model 106 extends above the third reference surface 116. The sections of the third reference surface 116 and/or surface sections of the three-dimensional digital restorative tooth model 106 identified this way may, e.g., provide the restoration reference surface sections, which together may form the restoration surface 120.

Due to the tilting a portion of the surface of the three-dimensional digital restorative tooth model 106 is arranged above the third reference surface 116 in an upper labial section. In this section, the restoration surface 120 may be defined by the surface of the three-dimensional digital restorative tooth model 106 having the effect, that the dental restoration element may have a material thickness larger the required material thickness 118 in this section. For example, the boundary 104 of the restoration area may, e.g., be moved in the incisal section of the tooth in order smoothen the restoration surface 120 in the incisal section.

FIG. 27 shows a three-dimensional digital preparation tooth model 124 defining a form of the prepared tooth resulting from preparing preparation surface 122 within the tooth defined by the three-dimensional digital tooth model 100. Furthermore, it is illustrated how the preparing preparation surface 122 is determined using the first reference surface 108 and the second reference surface 110, i.e., preparation reference surface sections, e.g., provided by the first and second reference surface 108, 110. On the preparation surface 122, a three-dimensional digital dental restoration model 126 defining a form of the dental restoration element is arranged. The three-dimensional digital dental restoration model 126 is generated using the preparation surface 122 of the tooth and the restoration surface 120 of the dental restoration element defining the contours of the three-dimensional digital dental restoration model 126.

In case of FIG. 27, the preparation surface 122 is defined by the intersecting first reference surface 108 and second reference surface 110 intersect. In a labial-cervical section of the tooth, the second reference surface 110 extends below the first reference surface 108 and defines the preparation surface 122. In a labial-incisal section of the tooth, the first reference surface 108 extends below the second reference surface 110 and defines the preparation surface 122.

Figures 28, 29:
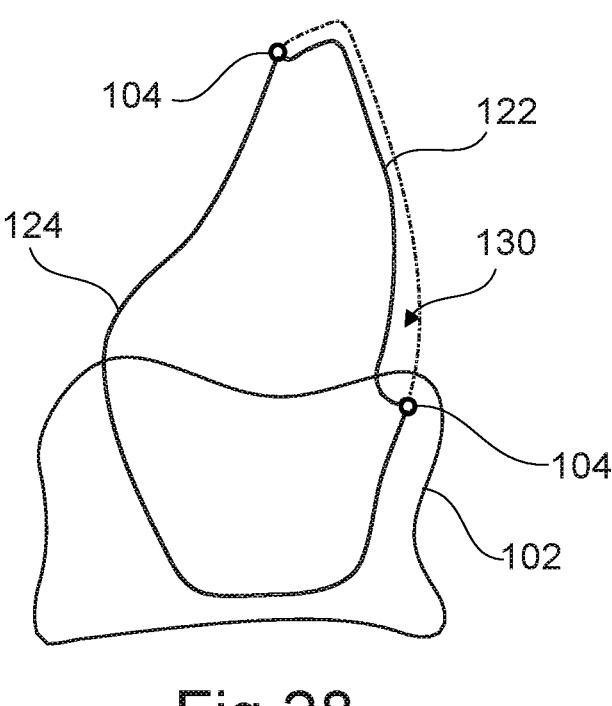
FIG. 28 shows a cross-sectional view of an exemplary tooth mass loss resulting for a preparation defined by the three-dimensional digital preparation tooth model of FIG. 27.
FIG. 29 shows a cross-sectional view of the exemplary three-dimensional digital preparation tooth model of FIG. 27.

FIG. 28 shows a tooth mass loss 130, i.e., an amount of dental material to be removed from the tooth defined by the three-dimensional digital tooth model 100, in order to prepare the preparation surface 122 within the boundaries 104 of the restoration area defined on the surface of the three-dimensional digital tooth model 100.

FIG. 29 shows the three-dimensional digital preparation tooth model 124 of the prepared tooth with the preparation surface 122 defined within the boundaries 104 of the restoration area.

Figures 30, 31:
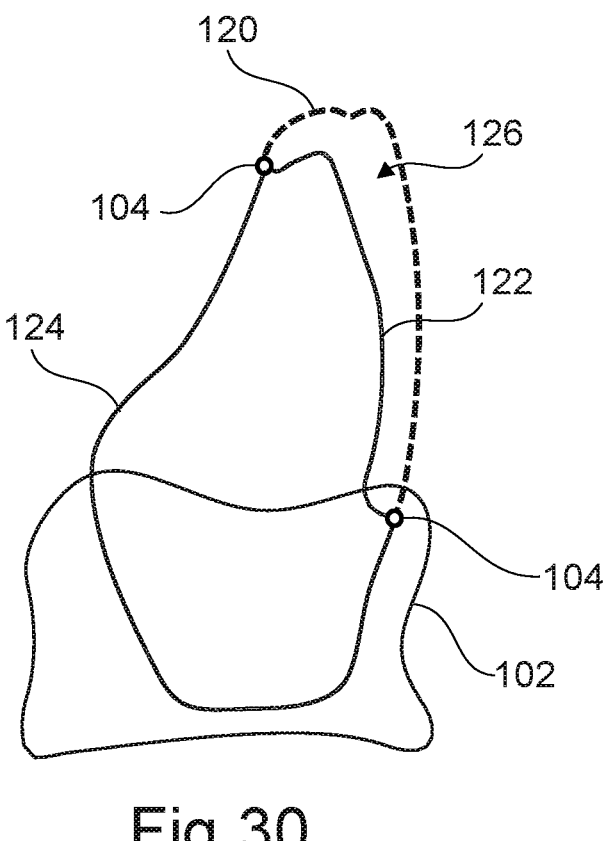
FIG. 30 shows a cross-sectional view of an exemplary three-dimensional digital dental restoration model with the restoration surface of FIG. 25.
FIG. 31 shows a cross-sectional view of the exemplary three-dimensional digital dental restoration model of FIG. 30.

FIG. 30 shows the three-dimensional digital preparation tooth model 124 of the prepared tooth with the three-dimensional digital dental restoration model 126 defining the dental restoration element arranged thereon, i.e., within the restoration area limited by the boundary 104 on the preparation surface 122.

FIG. 31 shows the three-dimensional digital dental restoration model 126 generated using the preparation surface 122 of the tooth and the restoration surface 120 of the dental restoration element defining the contours of the three-dimensional digital dental restoration model 126. The three-dimensional digital dental restoration model 126 illustrated in FIG. 31 may, e.g., be configured to be arranged on the prepared tooth along the insertion direction 144.

Figures 32, 33:
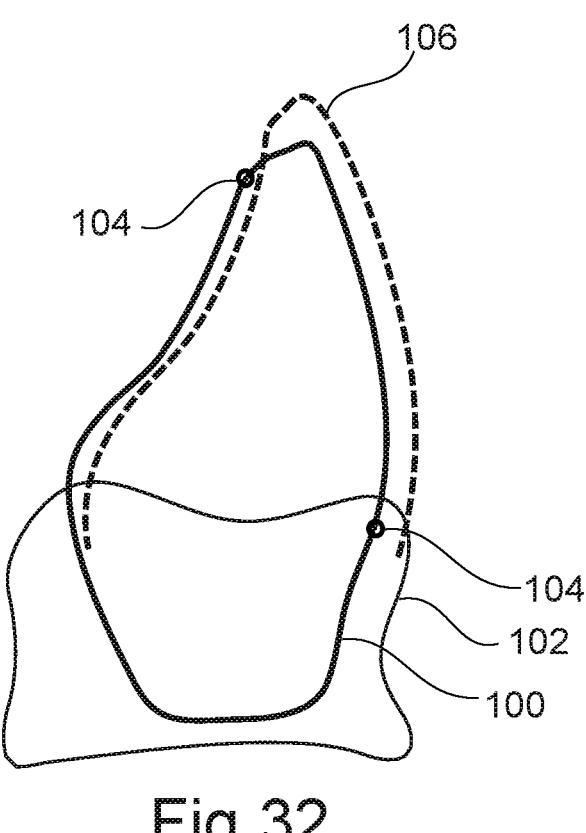
FIG. 32 shows a cross-sectional view of an exemplary three-dimensional digital restorative tooth model for the tooth of FIG. 1.
FIG. 33 shows a cross-sectional view of the exemplary three-dimensional digital restorative tooth model of FIG. 32 with a first and second reference surface added.

FIG. 32 shows the three-dimensional digital tooth model 100 and the three-dimensional digital gingiva model 102 of FIG. 1 with a three-dimensional digital restorative tooth model 106 added. The three-dimensional digital restorative tooth model 106 defines a preliminary target form of the tooth to be achieved by applying the dental restoration element. The three-dimensional digital restorative tooth model 106 is arranged relative to the three-dimensional digital tooth model 100, such as the dental restoration element should be positioned relative to the position of the tooth as defined by the three-dimensional digital tooth model 100. Furthermore, a definition of a restoration area is provided, e.g., by a margin line, defining a boundary 104 of the restoration area 104 on the surface of the three-dimensional digital tooth model 100. This definition indicates a surface area of the tooth, i.e., three-dimensional digital tooth model 100, at which the dental restoration element is to be arranged.

In case of FIG. 32, the three-dimensional digital restorative tooth model 106 is arrange a little bit in front of the three-dimensional digital tooth model 100, i.e., the patient's tooth, in labial direction.

FIG. 33 corresponds to FIG. 32 with a first reference surface 108 and a second reference surface 110 added. The first reference surface 108 is defined relative to the three-dimensional digital tooth model 100, while the second reference surface 110 is defined relative to the three-dimensional digital restorative tooth model 106. For this purpose, a first value selected for a basic preparation depth 112 of the preparation within the restoration area defined within the boundaries 104 on the three-dimensional digital tooth model 100 is selected. Furthermore, a second value is selected for a restoration thickness 114 of the dental restoration element. The first reference surface 108 is determined using an inward projection of the restoration area limited by boundaries 104 into the three-dimensional digital tooth model 100 depending on the first value selected for the basic preparation depth 112. For example, the first reference surface 108 is arranged within the three-dimensional digital tooth model 100 below the restoration area with a uniform distance, which is equal to the basic preparation depth 112 defined by the selected first value. Furthermore, the second reference surface 110 is determined using an inward projection of a surface section of the three-dimensional digital restorative tooth model 106 overlapping with the restoration area limited by the boundaries 104 into the three-dimensional digital restorative tooth model 106 depending on the second value selected for the restoration thickness 114. For example, the second reference surface 110 is arranged within the three-dimensional digital restorative tooth model 106 below its surface with a uniform distance, which is equal to the restoration thickness 114 defined by the selected second value.

In case of FIG. 33, the first reference surface 108 and the second reference surface 110 coincide in a labial section of the tooth.

Figure 34:
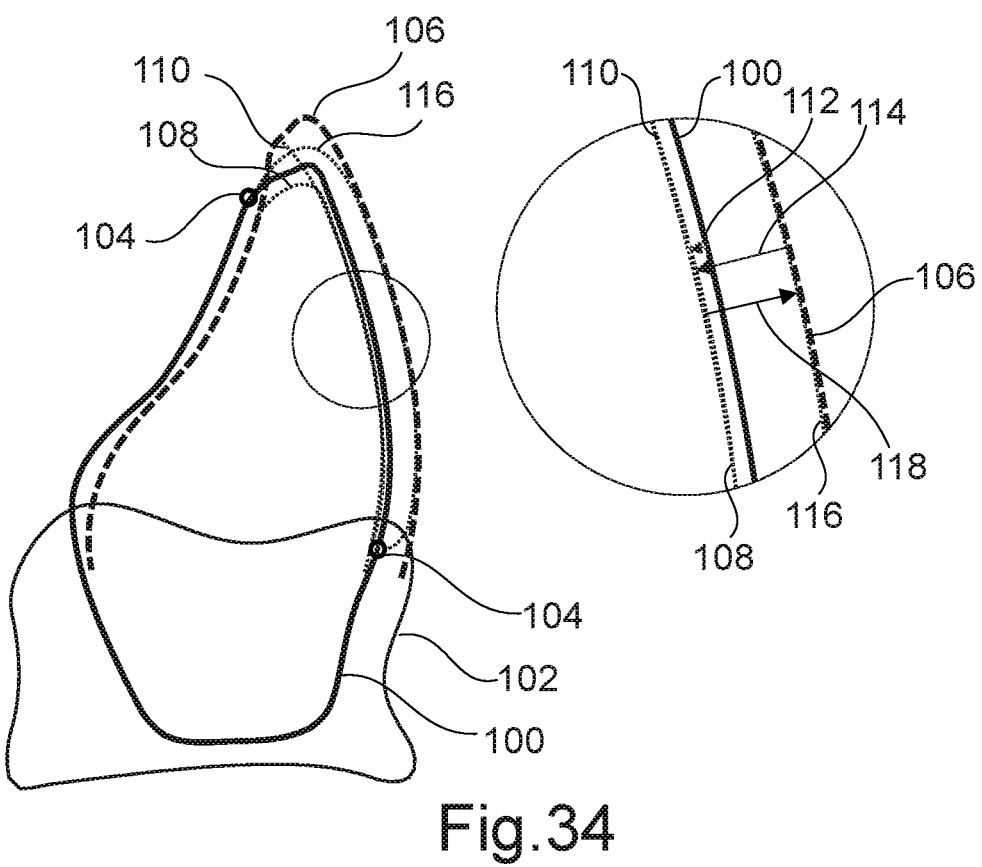
FIG. 34 shows a cross-sectional view of the exemplary three-dimensional digital restorative tooth model of FIG. 33 with a third reference surface added.

FIG. 34 corresponds to FIG. 32 with a third reference surface 116 added. The third reference surface 116 is defined relative to a preparation surface. For determining the preparation surface, one or more preparation reference surface sections are identified using the first and second reference surface 108, 110. For example, it is determined, which sections of the first reference surface 108 extend below the second reference surface 110 or coincide with a section of the second reference surface 110. Furthermore, it may be determined, which section of the second reference surface 110 extend below the first reference surface 108. The sections of first and/or second reference surface 108, 110 identified this way may, e.g., provide the preparation reference surface sections, which together may form the preparation surface.

The third reference surface 116 may be defined relative to the preparation surface. For this purpose, a third value for a required material thickness 118 of the dental restoration element may be provided. The third reference surface 116 is determined using an outward projection of the preparation surface depending on the third value selected for the required material thickness 118. For example, the third reference surface 116 is arranged above the restoration surface with a uniform distance, which is equal to the required material thickness 118. For example, a boundary of the third reference surface 116 may be defined by the boundary 104 of the restoration area. Thus, in a circumferential boundary region, the third reference surface 116 may be curved towards the boundary 104 defined on the surface of the three-dimensional digital tooth model 100. Only in this circumferential boundary region, the distance to the restoration surface may, e.g., decrease towards the boundary 104 and fall below the required material thickness 118.

In case of FIG. 34, the preparation surface in the labial section is defined by the first reference surface 108 and second reference surface 110, which coincide with each other. Only in an incisal section, the preparation surface is defined by the first reference surface 108. Thus, the third reference surface 116 arranged above the restoration surface, i.e., the coinciding first and second reference surface 108, 110, in a distance equal to the required material thickness 118, coincides in the labial section with the surface of the three-dimensional digital restorative tooth model 106.

Figure 35:
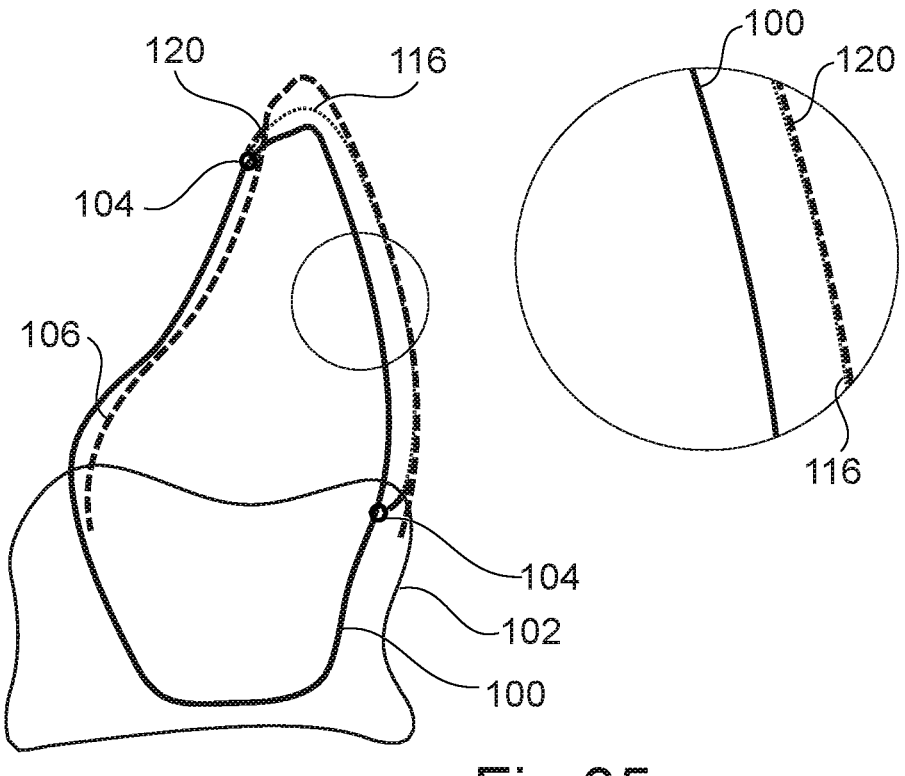
FIG. 35 shows a cross-sectional view of the exemplary three-dimensional digital restorative tooth model of FIG. 32 with a restoration surface.

FIG. 35 illustrates the form and position of the third reference surface 116 relative to the three-dimensional digital restorative tooth model 106. Furthermore, the three-dimensional digital tooth model 100 and the three-dimensional digital gingiva model 102 are shown. Furthermore, a restoration surface 120 of the dental restoration element defined by the third reference surface 116 and the surface of the three-dimensional digital restorative tooth model 106 is shown. In a small oral section, restoration surface 120 is defined by the third reference surface 116. In incisal section, the restoration surface 120 is defined by the surface of the three-dimensional digital restorative tooth model 106. In a labial section, the restoration surface 120 is defined by the third reference surface 116 and the surface of the three-dimensional digital restorative tooth model 106 coinciding with each other.

Figures 36, 37:
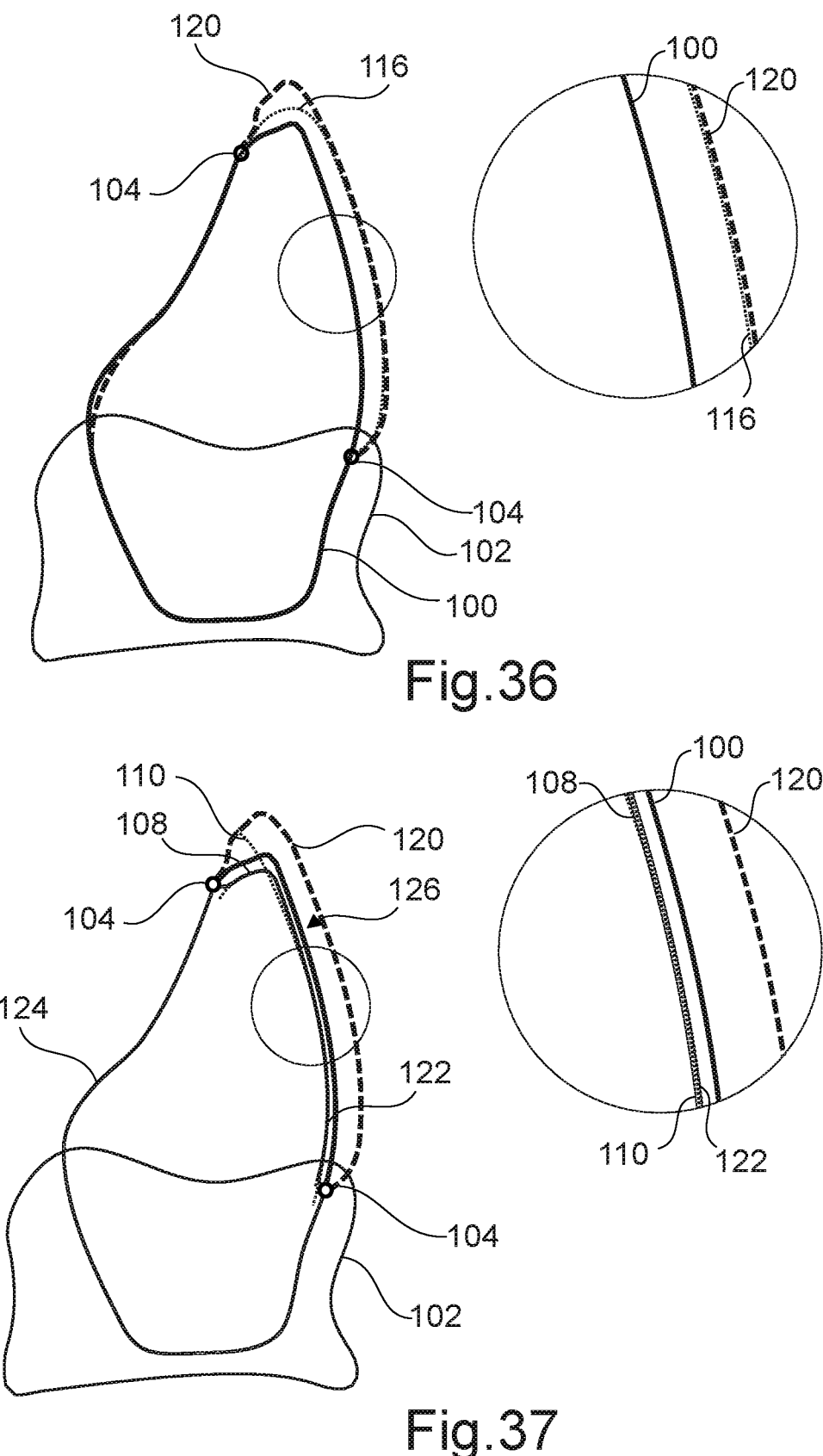
FIG. 36 shows a cross-sectional view of an exemplary three-dimensional digital tooth model of FIG. 1 with the restoration surface.
FIG. 37 shows a cross-sectional view of an exemplary three-dimensional digital preparation tooth model of the tooth of FIG. 1.

FIG. 36 shows a restoration surface 120 of the dental restoration element. For determining the restoration surface 120, one or more restoration reference surface sections are used. These one or more restoration reference surface sections are determined using the three-dimensional digital restorative tooth model 106 and the third reference surface 116.

For example, it is determined, which sections of the third reference surface 116 extend out of the three-dimensional digital restorative tooth model 106 and thus above the surface of the out of the three-dimensional digital restorative tooth model 106 or coincide with a surface section of the three-dimensional digital restorative tooth model 106. Furthermore, it may be determined, which surface section of the three-dimensional digital restorative tooth model 106 extends above the third reference surface 116. The sections of the third reference surface 116 and/or surface sections of the three-dimensional digital restorative tooth model 106 identified this way may, e.g., provide the restoration reference surface sections, which together may form the restoration surface 120.

In case of FIG. 37, the restoration surface 120 is mainly defined by the coinciding first and second reference surface 108, 110.

FIG. 37 shows a three-dimensional digital preparation tooth model 124 defining a form of the prepared tooth resulting from preparing preparation surface 122 within the tooth defined by the three-dimensional digital tooth model 100. Furthermore, it is illustrated how the preparing preparation surface 122 is determined using the first reference surface 108 and the second reference surface 110, i.e., preparation reference surface sections, e.g., provided by the first and second reference surface 108, 110. On the preparation surface 122, a three-dimensional digital dental restoration model 126 defining a form of the dental restoration element is arranged. The three-dimensional digital dental restoration model 126 is generated using the preparation surface 122 of the tooth and the restoration surface 120 of the dental restoration element defining the contours of the three-dimensional digital dental restoration model 126.

Figure 38:
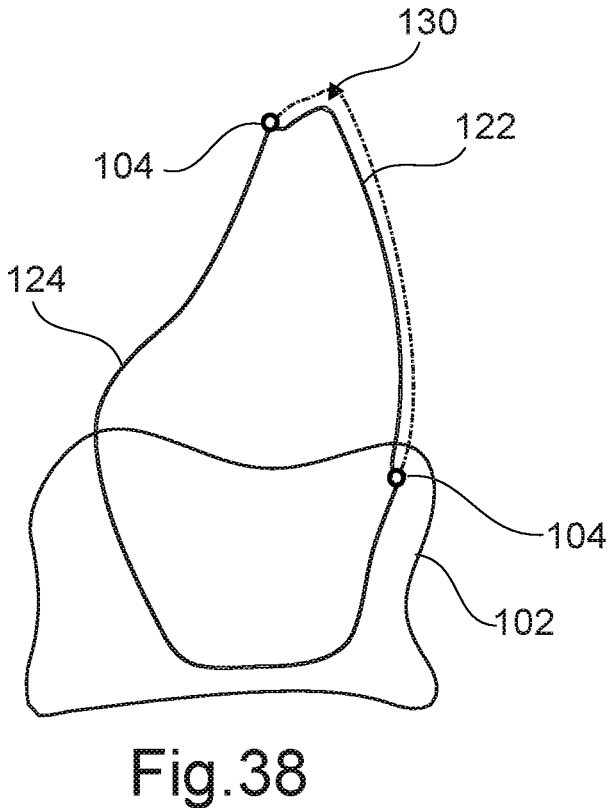
FIG. 38 shows a cross-sectional view of an exemplary tooth mass loss resulting for a preparation defined by the three-dimensional digital preparation tooth model of FIG. 37.

FIG. 38 shows a tooth mass loss 130, i.e., an amount of dental material to be removed from the tooth defined by the three-dimensional digital tooth model 100, in order to prepare the preparation surface 122 within the boundaries 104 of the restoration area defined on the surface of the three-dimensional digital tooth model 100.

Figure 39:
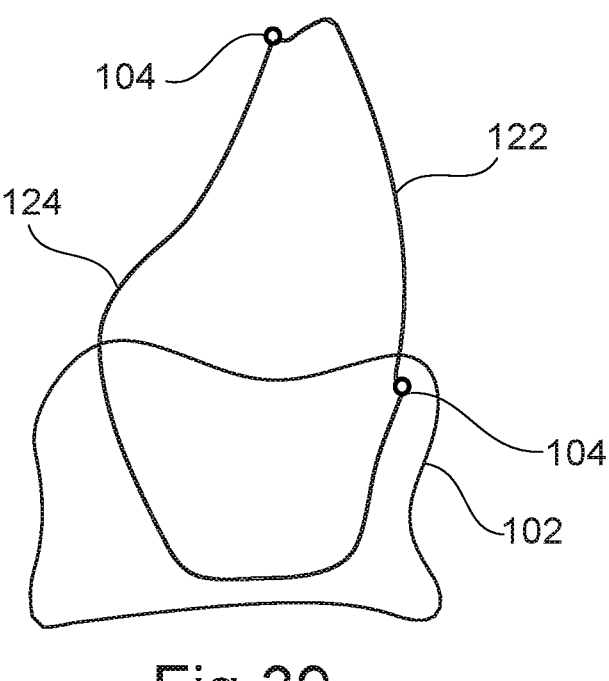
FIG. 39 shows a cross-sectional view of the exemplary three-dimensional digital preparation tooth model of FIG. 37.

FIG. 39 shows the three-dimensional digital preparation tooth model 124 of the prepared tooth with the preparation surface 122 defined within the boundaries 104 of the restoration area.

Figure 40:
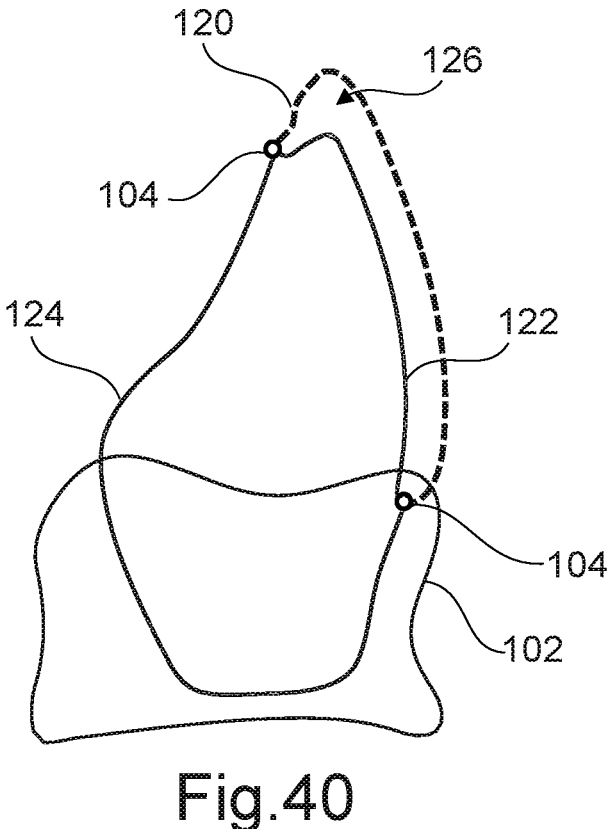
FIG. 40 shows a cross-sectional view of an exemplary three-dimensional digital dental restoration model with the restoration surface of FIG. 35.

FIG. 40 shows the three-dimensional digital preparation tooth model 124 of the prepared tooth with the three-dimensional digital dental restoration model 126 defining the dental restoration element arranged thereon, i.e., within the restoration area limited by the boundary 104 on the preparation surface 122.

Figure 41:
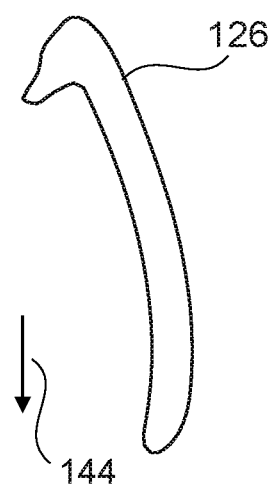
FIG. 41 shows a cross-sectional view of the exemplary three-dimensional digital dental restoration model of FIG. 40.

FIG. 41 shows the three-dimensional digital dental restoration model 126 generated using the preparation surface 122 of the tooth and the restoration surface 120 of the dental restoration element defining the contours of the three-dimensional digital dental restoration model 126. The three-dimensional digital dental restoration model 126 illustrated in FIG. 41 may, e.g., be configured to be arranged on the prepared tooth along the insertion direction 144.

Figure 42:
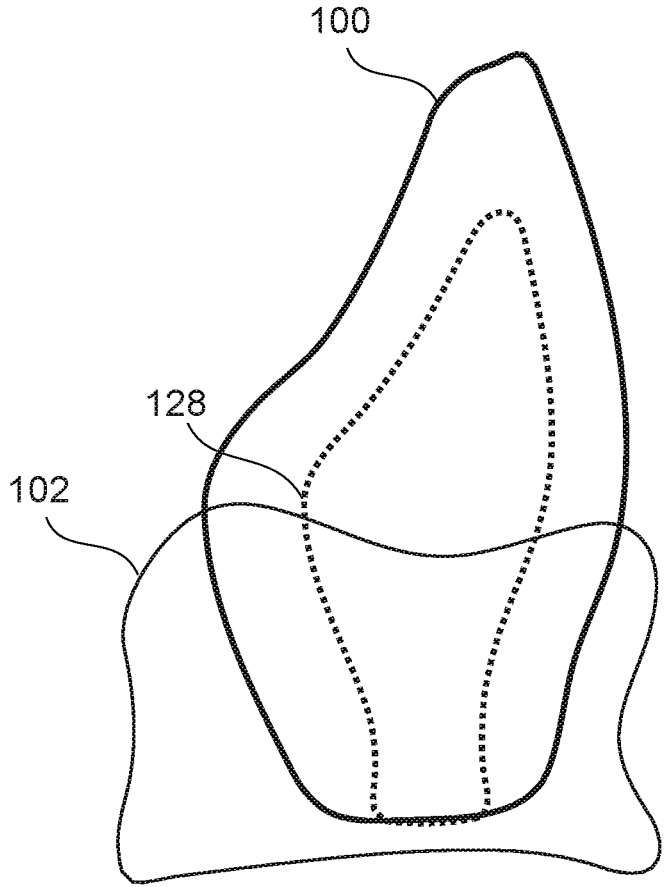
FIG. 42 shows a cross-sectional view of an exemplary three-dimensional digital tooth model of a tooth with an exemplary three-dimensional digital core model.

FIG. 42 shows a cross-sectional view of an exemplary three-dimensional digital tooth model 100. The three-dimensional digital tooth model 100 of FIG. 42 is identical with the three-dimensional digital tooth model 100 of FIG. 1. The three-dimensional digital tooth model 100 is descriptive of a current form and of a position of a tooth of a patient within a dental situation of the patient. For this tooth, e.g., a preparation surface for preparing the tooth for receiving a dental restoration element is to be determined. In addition, a three-dimensional digital gingiva model 102 of a gingiva of the patient is shown, within which the tooth, i.e., the three-dimensional digital tooth model 100 is arranged. The three-dimensional digital gingiva model 102 of FIG. 42 is identical with the three-dimensional digital gingiva model 102 of FIG. 1.

In addition, a three-dimensional digital core model 128 of a core of the three-dimensional digital tooth model 100 to be excluded from preparation is provided. When determining the preparation surface for tooth, i.e., for the three-dimensional digital tooth model 100, it may be ensured that the preparation surface does not intersect the core of the three-dimensional digital tooth model 100 identified by the three-dimensional digital core model 128.

Figure 43:
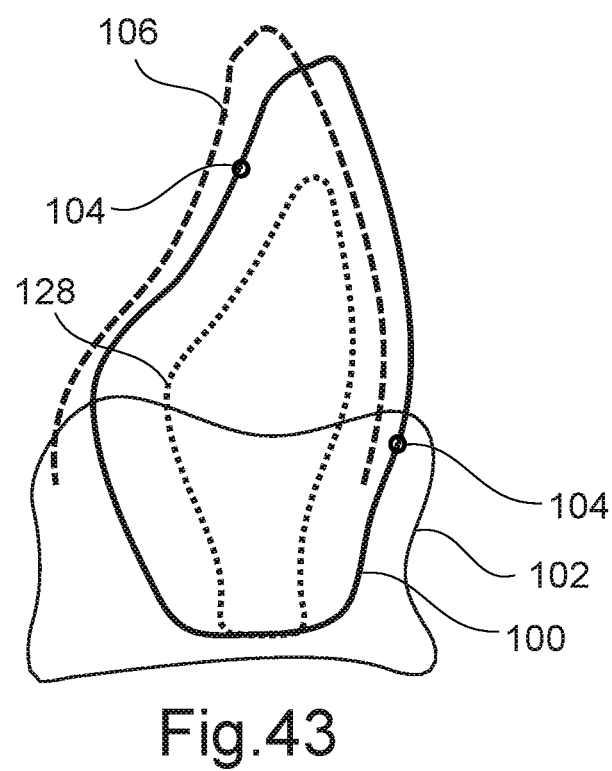
FIG. 43 shows a cross-sectional view of an exemplary three-dimensional digital restorative tooth model for the tooth of FIG. 42.

FIG. 43 shows the three-dimensional digital tooth model 100 and the three-dimensional digital gingiva model 102 of FIG. 42 with a three-dimensional digital restorative tooth model 106 added. The three-dimensional digital restorative tooth model 106 defines a preliminary target form of the tooth to be achieved by applying the dental restoration element. The three-dimensional digital restorative tooth model 106 is arranged relative to the three-dimensional digital tooth model 100, such as the dental restoration element should be positioned relative to the position of the tooth as defined by the three-dimensional digital tooth model 100. Furthermore, a definition of a restoration area is provided, e.g., by a margin line, defining a boundary 104 of the restoration area 104 on the surface of the three-dimensional digital tooth model 100. This definition indicates a surface area of the tooth, i.e., three-dimensional digital tooth model 100, at which the dental restoration element is to be arranged.

In case of FIG. 43, the three-dimensional digital restorative tooth model 106 is arranged a bit behind the three-dimensional digital tooth model 100, i.e., the patient's tooth, in oral direction.

Figure 44:
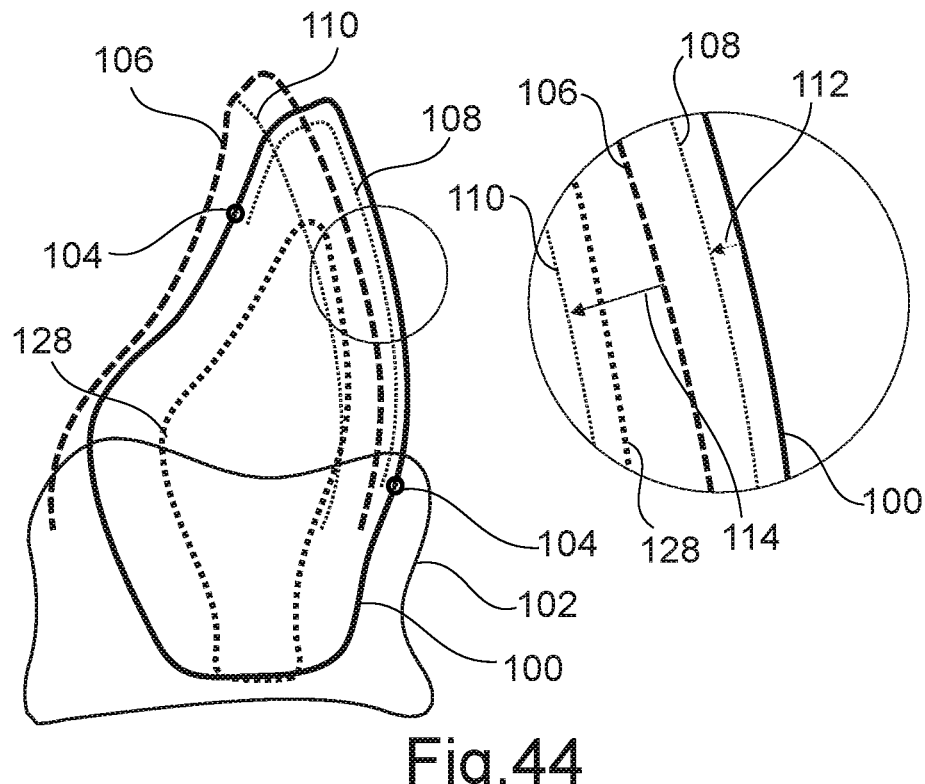
FIG. 44 shows a cross-sectional view of the exemplary three-dimensional digital restorative tooth model of FIG. 43 with a first and second reference surface added.

FIG. 44 corresponds to FIG. 43 with a first reference surface 108 and a second reference surface 110 added. The first reference surface 108 is defined relative to the three-dimensional digital tooth model 100, while the second reference surface 110 is defined relative to the three-dimensional digital restorative tooth model 106. For this purpose, a first value selected for a basic preparation depth 112 of the preparation within the restoration area defined within the boundaries 104 on the three-dimensional digital tooth model 100 is selected. Furthermore, a second value is selected for a restoration thickness 114 of the dental restoration element. The first reference surface 108 is determined using an inward projection of the restoration area limited by boundaries 104 into the three-dimensional digital tooth model 100 depending on the first value selected for the basic preparation depth 112. For example, the first reference surface 108 is arranged within the three-dimensional digital tooth model 100 below the restoration area with a uniform distance, which is equal to the basic preparation depth 112 defined by the selected first value. Furthermore, the second reference surface 110 is determined using an inward projection of a surface section of the three-dimensional digital restorative tooth model 106 overlapping with the restoration area limited by the boundaries 104 into the three-dimensional digital restorative tooth model 106 depending on the second value selected for the restoration thickness 114. For example, the second reference surface 110 is arranged within the three-dimensional digital restorative tooth model 106 below its surface with a uniform distance, which is equal to the restoration thickness 114 defined by the selected second value.

In this example, the second reference surface 110 intersects the core of the three-dimensional digital tooth model 100 identified by the three-dimensional digital core model 128. In order to protect the core of the three-dimensional digital tooth model 100 from the preparation, the sections of the second reference surface 110 intersecting the three-dimensional digital core model 128 may be excluded from being used as preparation reference surface sections. Instead, surface sections of the three-dimensional digital core model 128 limited by the intersection with the second reference surface 110 and extending above the sections of the second reference surface 110, which are excluded from being used as preparation reference surface sections, may be used as preparation reference surface sections.

The preparation surface may be defined in an oral section of the tooth by the first reference surface 108, in an upper labial section by the second reference surface 110 and in a labial-cervical section by the surface of the three-dimensional digital core model 128.

Figure 45:
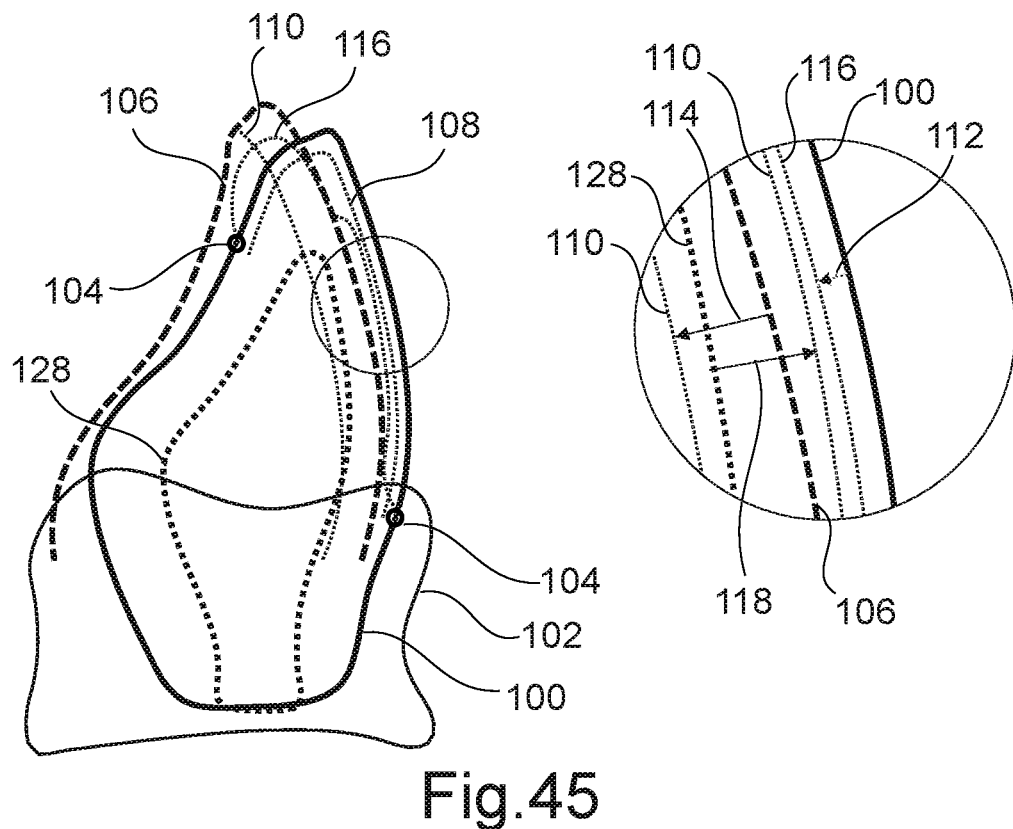
FIG. 45 shows a cross-sectional view of the exemplary three-dimensional digital restorative tooth model of FIG. 44 with a third reference surface added.

FIG. 45 corresponds to FIG. 43 with a third reference surface 116 added. The third reference surface 116 is defined relative to a preparation surface. For determining the preparation surface, one or more preparation reference surface sections are identified using the first and second reference surface 108, 110. For example, it is determined, which sections of the first reference surface 108 extend below the second reference surface 110 or coincide with a section of the second reference surface 110. Furthermore, it may be determined, which section of the second reference surface 110 extend below the first reference surface 108. Sections of the second reference surface 110 intersecting the three-dimensional digital core model 128 may be excluded from being used as preparation reference surface sections. Instead, surface sections of the three-dimensional digital core model 128 limited by the intersection with the second reference surface 110 and extending above the sections of the second reference surface 110, which are excluded from being used as preparation reference surface sections, may be used as preparation reference surface sections. The sections of first reference surface 108, the second reference surface 110 and/or the three-dimensional digital core model 128 identified this way may, e.g., provide the preparation reference surface sections, which together may form the preparation surface.

The third reference surface 116 may be defined relative to the preparation surface. For this purpose, a third value for a required material thickness 118 of the dental restoration element may be provided. The third reference surface 116 is determined using an outward projection of the preparation surface depending on the third value selected for the required material thickness 118. For example, the third reference surface 116 is arranged above the restoration surface with a uniform distance, which is equal to the required material thickness 118. For example, a boundary of the third reference surface 116 may be defined by the boundary 104 of the restoration area. Thus, in a circumferential boundary region, the third reference surface 116 may be curved towards the boundary 104 defined on the surface of the three-dimensional digital tooth model 100. Only in this circumferential boundary region, the distance to the restoration surface may, e.g., decrease towards the boundary 104 and fall below the required material thickness 118.

In case of FIG. 45, the third reference surface 116 is arranged above the restoration surface in a distance equal to the required material thickness 118, i.e., in an oral section above the first reference surface 108, in an upper labial section above the second reference surface 110 and in a labial-cervical section above the surface of the three-dimensional digital core model 128.

Figure 46:
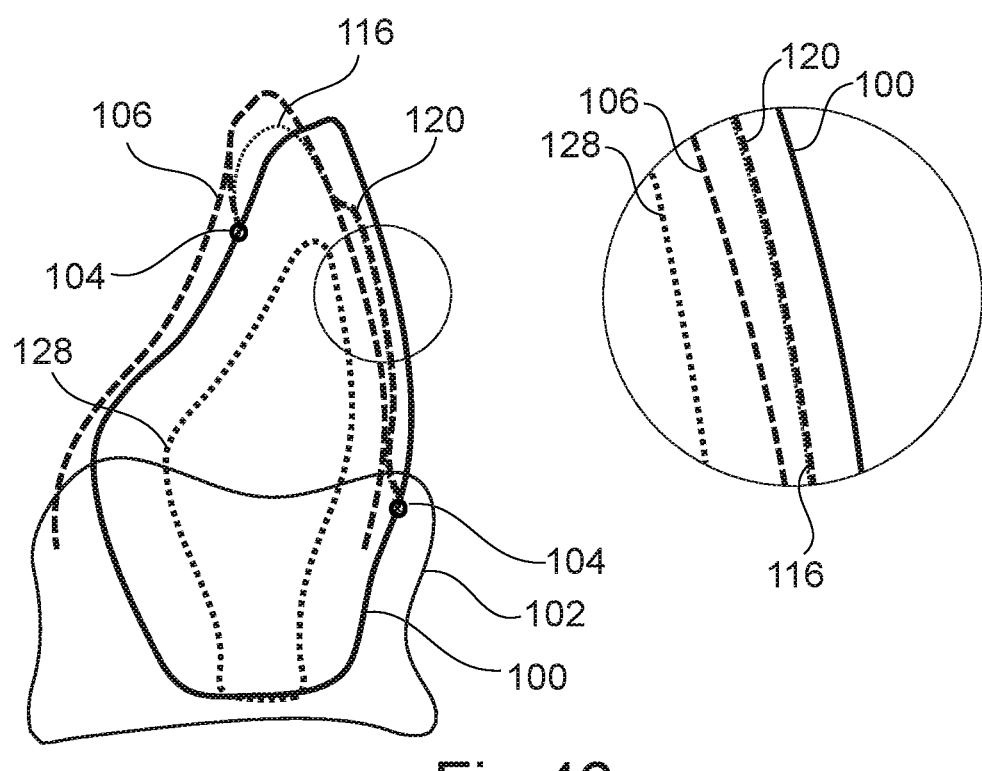
FIG. 46 shows a cross-sectional view of the exemplary three-dimensional digital restorative tooth model of FIG. 43 with a restoration surface.

FIG. 46 illustrates the form and position of the third reference surface 116 relative to the three-dimensional digital restorative tooth model 106. Furthermore, the three-dimensional digital tooth model 100 and the three-dimensional digital gingiva model 102 are shown. Furthermore, a restoration surface 120 of the dental restoration element defined by the third reference surface 116 and the surface of the three-dimensional digital restorative tooth model 106 is shown. In an oral and in an incisal section, restoration surface 120 is defined by the three-dimensional digital restorative tooth model 106. In an upper labial section, restoration surface 120 is defined by the third reference surface 116 and the surface of the three-dimensional digital restorative tooth model 106 coinciding with each other. In the rest of the labial section, restoration surface 120 is defined by the third reference surface 116 extending above the surface of the three-dimensional digital restorative tooth model 106.

Figure 47:
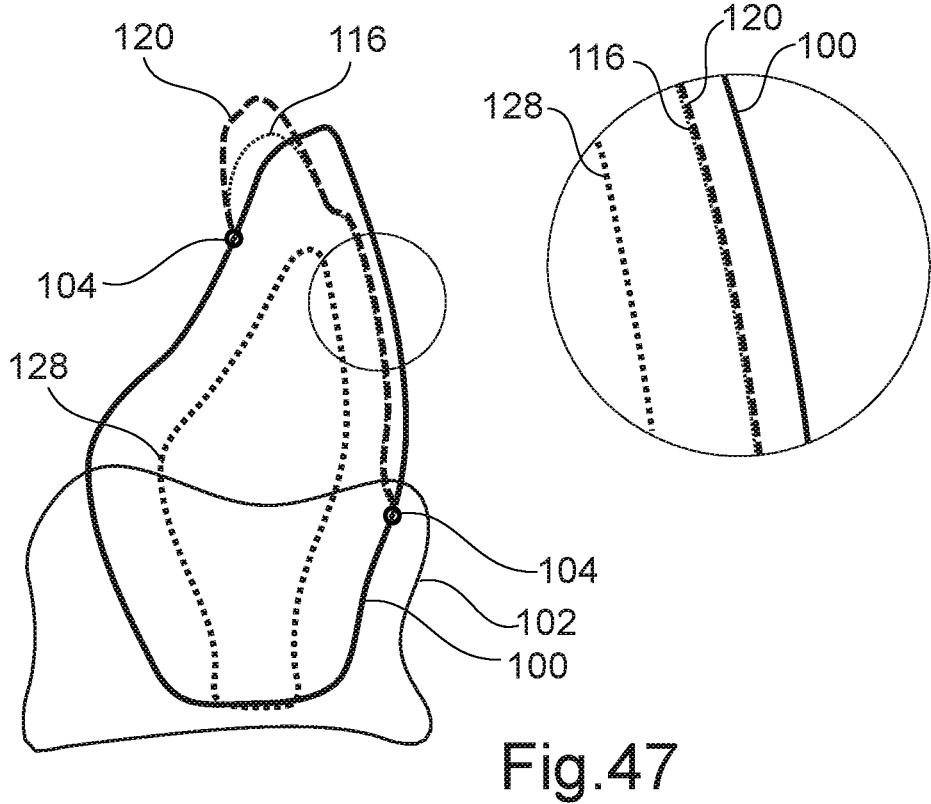
FIG. 47 shows a cross-sectional view of an exemplary three-dimensional digital tooth model of FIG. 42 with the restoration surface.

FIG. 47 shows a restoration surface 120 of the dental restoration element. For determining the restoration surface 120, one or more restoration reference surface sections are used. These one or more restoration reference surface sections are determined using the three-dimensional digital restorative tooth model 106 and the third reference surface 116.

For example, it is determined, which sections of the third reference surface 116 extend out of the three-dimensional digital restorative tooth model 106 and thus above the surface of the out of the three-dimensional digital restorative tooth model 106 or coincide with a surface section of the three-dimensional digital restorative tooth model 106. Furthermore, it may be determined, which surface section of the three-dimensional digital restorative tooth model 106 extends above the third reference surface 116. The sections of the third reference surface 116 and/or surface sections of the three-dimensional digital restorative tooth model 106 identified this way may, e.g., provide the restoration reference surface sections, which together may form the restoration surface 120. For example, the boundary 104 of the restoration area may, e.g., be moved in the oral section of the tooth in order smoothen the transition between restoration surface 120 and the surface of the three-dimensional digital tooth model 100, i.e., the patient's tooth, in the oral section.

Figure 48:
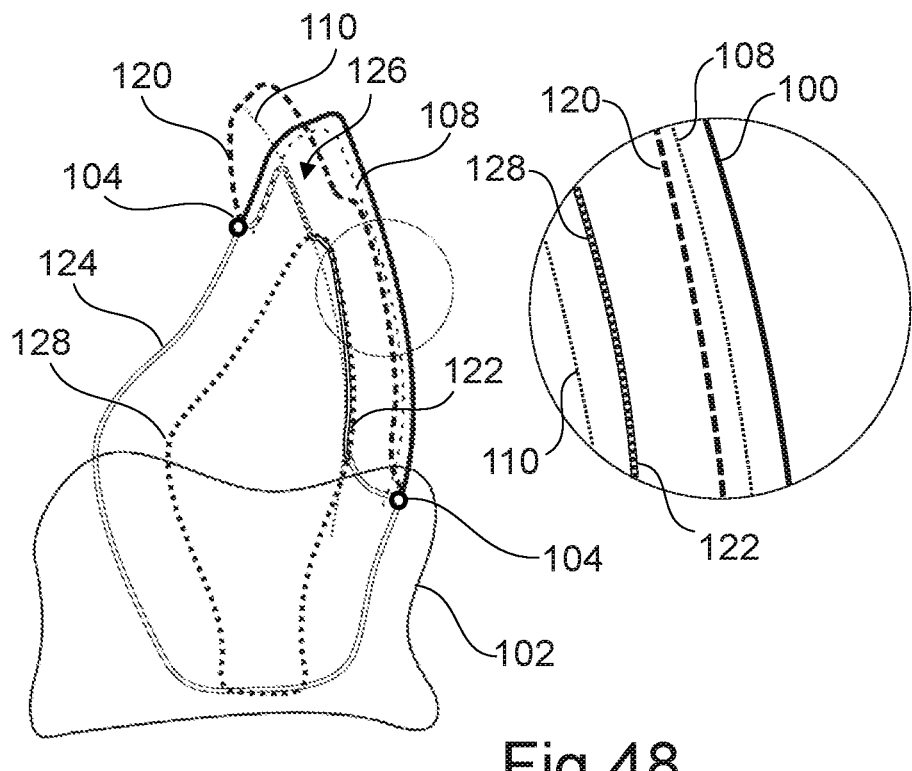
FIG. 48 shows a cross-sectional view of an exemplary three-dimensional digital preparation tooth model of the tooth of FIG. 42.

FIG. 48 shows a three-dimensional digital preparation tooth model 124 defining a form of the prepared tooth resulting from preparing preparation surface 122 within the tooth defined by the three-dimensional digital tooth model 100. A section of the preparation surface 122 is provided by the surface of the three-of the three-dimensional digital tooth model 100 identified by the three-dimensional digital core model 128 dimensional digital core model 128, such that the core of the of the three-dimensional digital tooth model 100 identified by the three-dimensional digital core model 128 is excluded from the preparation. Furthermore, it is illustrated how the preparing preparation surface 122 is determined using the first reference surface 108 and the second reference surface 110, i.e., preparation reference surface sections, e.g., provided by the first and second reference surface 108, 110. On the preparation surface 122, a three-dimensional digital dental restoration model 126 defining a form of the dental restoration element is arranged. The three-dimensional digital dental restoration model 126 is generated using the preparation surface 122 of the tooth and the restoration surface 120 of the dental restoration element defining the contours of the three-dimensional digital dental restoration model 126.

The preparation surface 122 is be defined in the oral section of the tooth by the first reference surface 108, in the upper labial section by the second reference surface 110 and in the labial-cervical section by the surface of the three-dimensional digital core model 128.

Figure 49:
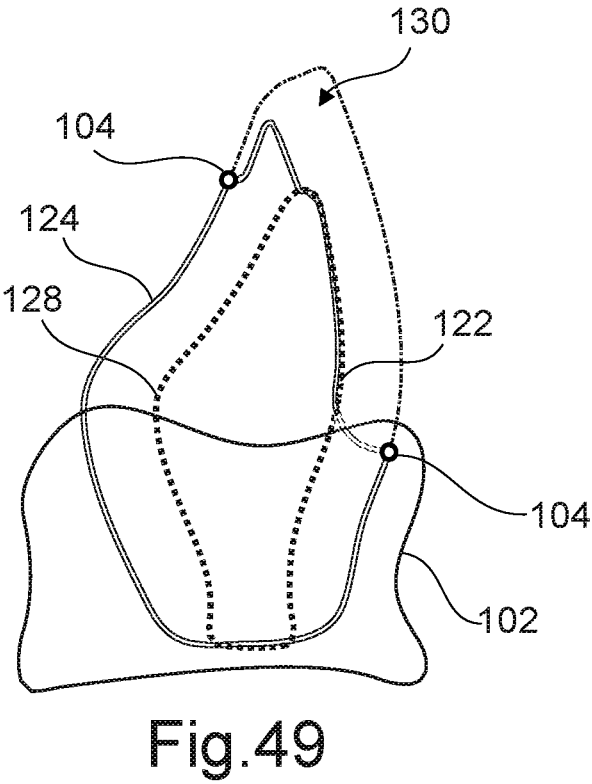
FIG. 49 shows a cross-sectional view of an exemplary tooth mass loss resulting for a preparation defined by the three-dimensional digital preparation tooth model of FIG. 48.

FIG. 49 shows a tooth mass loss 130, i.e., an amount of dental material to be removed from the tooth defined by the three-dimensional digital tooth model 100, in order to prepare the preparation surface 122 within the boundaries 104 of the restoration area defined on the surface of the three-dimensional digital tooth model 100.

Figure 50:
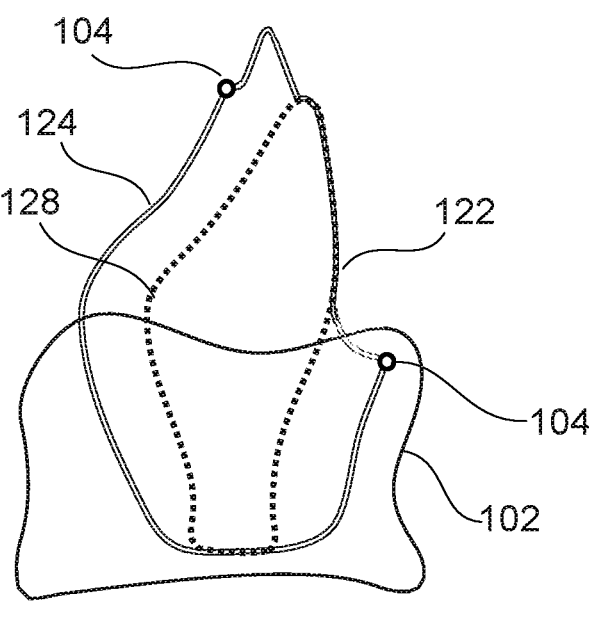
FIG. 50 shows a cross-sectional view of the exemplary three-dimensional digital preparation tooth model of FIG. 48.

FIG. 50 shows the three-dimensional digital preparation tooth model 124 of the prepared tooth with the preparation surface 122 defined within the boundaries 104 of the restoration area.

Figure 51:
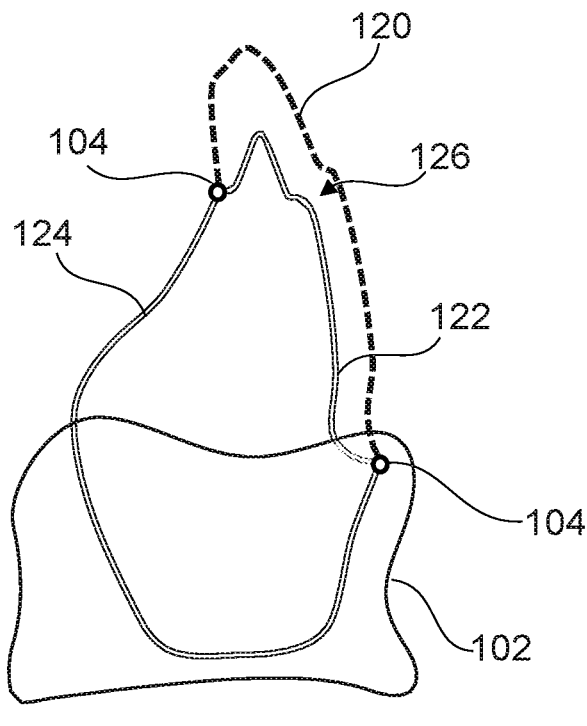
FIG. 51 shows a cross-sectional view of an exemplary three-dimensional digital dental restoration model with the restoration surface of FIG. 46.

FIG. 51 shows the three-dimensional digital preparation tooth model 124 of the prepared tooth with the three-dimensional digital dental restoration model 126 defining the dental restoration element arranged thereon, i.e., within the restoration area limited by the boundary 104 on the preparation surface 122.

Figure 52:
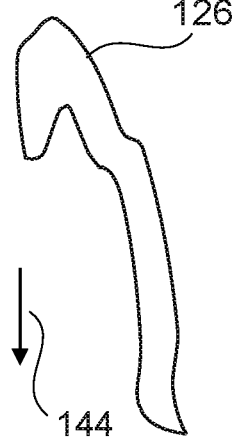
FIG. 52 shows a cross-sectional view of the exemplary three-dimensional digital dental restoration model of FIG. 51.

FIG. 52 shows the three-dimensional digital dental restoration model 126 generated using the preparation surface 122 of the tooth and the restoration surface 120 of the dental restoration element defining the contours of the three-dimensional digital dental restoration model 126. The three-dimensional digital dental restoration model 126 illustrated in FIG. 52 may, e.g., be configured to be arranged on the prepared tooth along the insertion direction 144.

Figure 53:
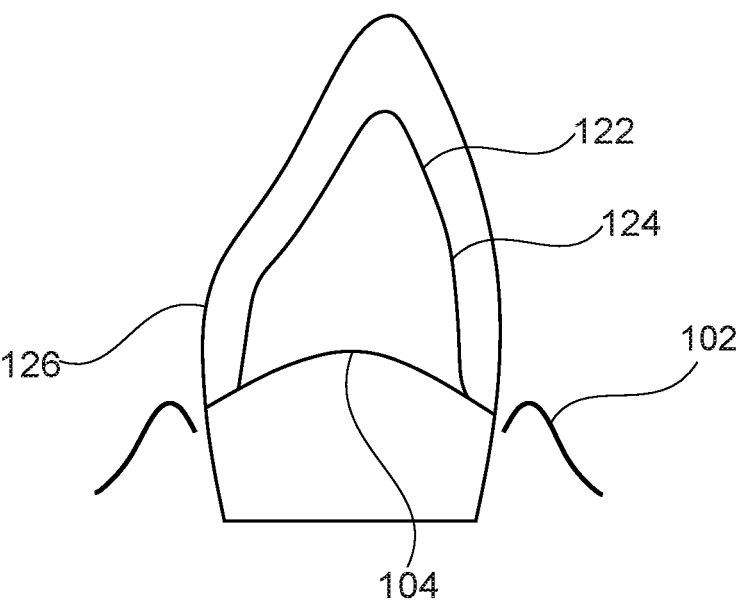
FIG. 53 shows a cross-sectional view of an exemplary three-dimensional digital dental restoration model.

FIG. 53 shows a cross-sectional view of an exemplary three-dimensional digital dental restoration model 126 defining a dental restoration element to be arranged on a prepared incisor tooth. The prepared tooth may be prepared as defined by a three-dimensional digital preparation tooth model 124 defining a preparation surface 122. The three-dimensional digital dental restoration model 126 is arranged on the three-dimensional digital preparation tooth model 124. A boundary 104 of the preparation surface 122 defined by a margin line of a restoration surface is here defined by a cervical margin line. The three-dimensional digital gingiva model 102 is descriptive of a form and a position of a gingiva around the prepared tooth described by the three-dimensional digital preparation tooth model 124 within the dentition. The boundary 104 in form of the cervical margin line, also referred to as finish line, may, e.g., be of one of the following types: feather edge, knife edge, chamfer, bevel, shoulder, beveled shoulder.

Figure 54:
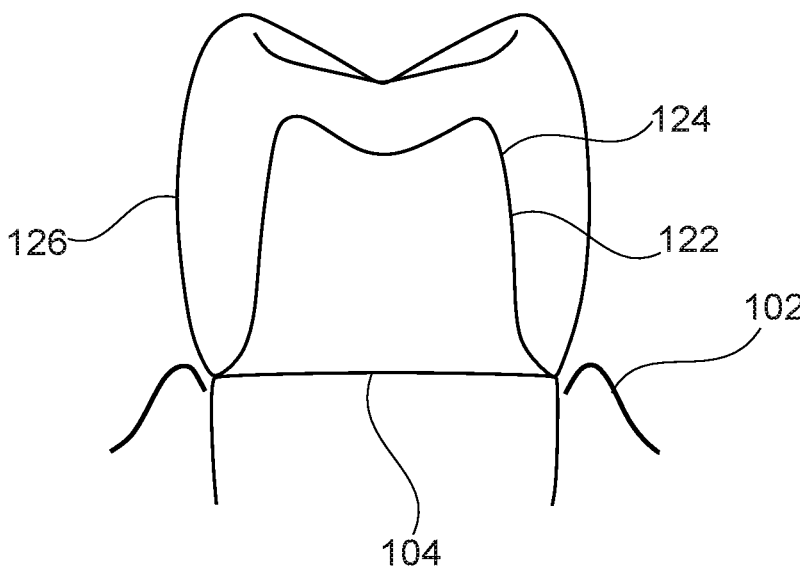
FIG. 54 shows a cross-sectional view of an exemplary three-dimensional digital dental restoration model.

FIG. 54 shows a cross-sectional view of an exemplary three-dimensional digital dental restoration model 126 defining a dental restoration element to be arranged on a prepared molar tooth. The prepared tooth may be prepared as defined by a three-dimensional digital preparation tooth model 124 defining a preparation surface 122. The three-dimensional digital dental restoration model 126 is arranged on the three-dimensional digital preparation tooth model 124. A boundary 104 of the preparation surface 122 defined by a margin line of a restoration surface is here defined by a cervical margin line. The three-dimensional digital gingiva model 102 is descriptive of a form and a position of a gingiva around the prepared tooth described by the three-dimensional digital preparation tooth model 124 within the dentition. The boundary 104 in form of the cervical margin line, also referred to as finish line, may, e.g., be of one of the following types: feather edge, knife edge, chamfer, bevel, shoulder, beveled shoulder.

Figure 55:
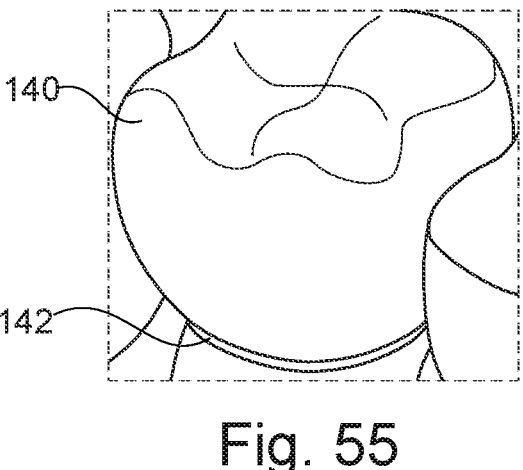
FIG. 55 shows an exemplary dental restorative element.

FIG. 55 shows an exemplary dental restoration element 140 in form of a crown for a molar tooth arranged on a prepared molar tooth 142.

Figure 56:
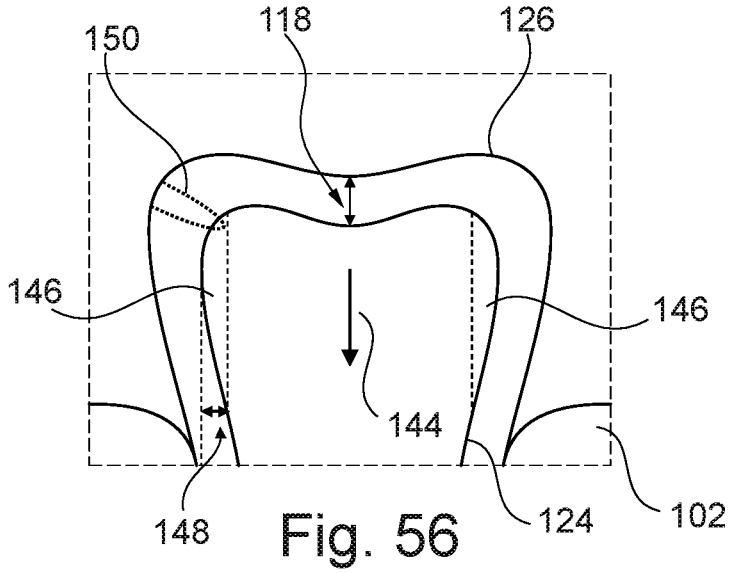
FIG. 56 shows a cross-sectional view of a three-dimensional digital restorative tooth model.

FIG. 56 shows a cross-sectional view of an exemplary of a three-dimensional digital dental restoration model 126 and a three-dimensional digital preparation tooth model 124. The three-dimensional digital preparation tooth model 124 is reduced by a predefined volume having a thickness comprising a required material thickness 118 required by a predefined restoration material of the dental restoration element. The thickness may further comprise a predefined additional minimum space for applying a bonding material for bonding the dental restoration element.

A preparation, i.e., the three-dimensional digital preparation tooth model 124 may further be adjusted to block out in an insertion direction 144 of the dental restoration element undercuts 148 of the three-dimensional digital preparation tooth model 124. For this purpose, preparation parameters may be determined such that sections 146 of the three-dimensional digital preparation tooth model 124 may be removed by the preparation as well. The insertion direction 140 may, e.g., extend perpendicular to an occlusal plane.

Alternatively or additionally, the tooth to be prepared may comprise one or more defects 150, here projected onto the illustration of the three-dimensional digital dental restoration model 126 and a three-dimensional digital preparation tooth model 124, to be repaired by the preparation and restoration to be applied to the tooth. Here a defect 150 is projected into the cross-sectional view of an exemplary of the three-dimensional digital preparation tooth model 124. The preparation of the three-dimensional digital preparation tooth model 124 is insufficient to remove defect 150 completely. Thus, the preparation parameters may further be adjusted to also remove any section 146 of the three-dimensional digital preparation tooth model 124, which comprises at least a part of the defect 150, thereby completely removing the defects 150.

Figure 57:
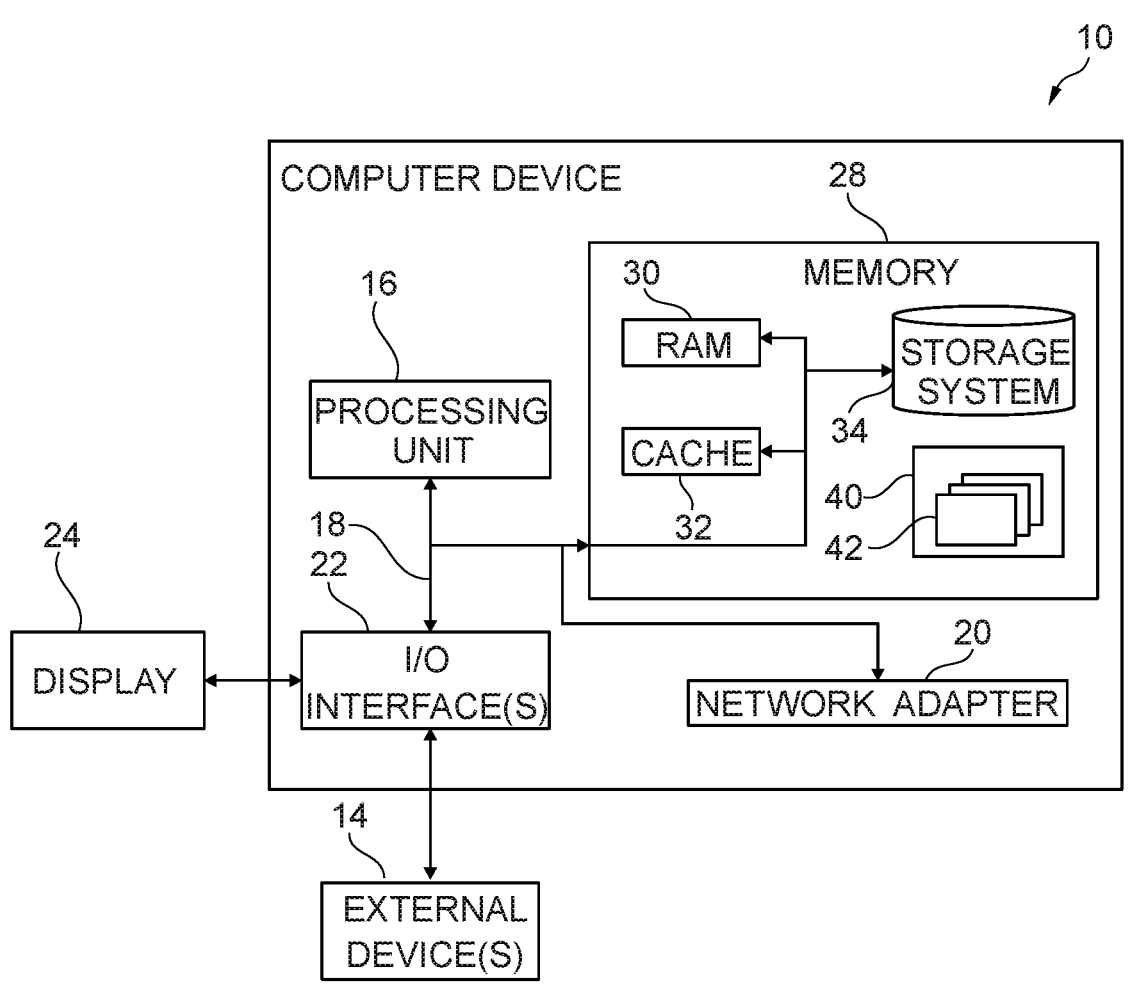
FIG. 57 shows an exemplary computer device for determining a preparation surface.

FIG. 57 shows a schematic diagram of an exemplary computer device 10 for determining a preparation surface of a tooth for preparing the tooth for receiving a dental restoration element. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 57, computer device 10 is shown in the form of a general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include a three-dimensional digital tooth model. The three-dimensional digital tooth model is descriptive of a current form and of a position of the tooth within the dentition of a patient. For example, three-dimensional digital tooth model may be comprised by a three-dimensional digital dentition model. The three-dimensional digital dentition model may comprise a plurality of three-dimensional digital tooth models for a plurality of teeth comprised by the dentition. Memory 28 may, e.g., include a three-dimensional digital gingiva model descriptive of a current form and of a position of a gingiva around the tooth within the dentition. The three-dimensional digital gingiva model may, e.g., be comprised by the three-dimensional digital dentition model or may be provided on its own.

Memory 28 may, e.g., include scan data of a patient's mouth from an intraoral scan or from a scan of a classical mold/impression, e.g., providing information about the surface structure of the patient's intraoral tissue comprising teeth and the gingiva. The scan data may comprise scan data of the tooth, to which the one or more ortho-restorative measures are to be applied.

Memory 28 may, e.g., include a three-dimensional digital restorative tooth model. The three-dimensional digital restorative tooth model defines a preliminary target form of the tooth to be achieved by applying the dental restoration element. Memory 28 may, e.g., include a digital tooth library providing a plurality of three-dimensional digital library tooth models. This digital tooth library may be used for providing the three-dimensional digital restorative tooth model in form of a three-dimensional digital library tooth model selected from the digital tooth library.

Memory 28 may, e.g., include a trained machine learning module configured to provide the three-dimensional digital restorative tooth model as output in response to receiving the three-dimensional digital tooth model as input. The trained machine learning module may, e.g., have been received by the computer device 10. The trained machine learning module may, e.g., have been trained by the computer device 10 using training datasets with training data received and/or generated by the computer device 10. For training the machine learning module, the memory 28 may comprise a machine learning module to be trained as well as training datasets with training data for training the machine learning module to provide a three-dimensional digital restorative tooth model. The machine learning module included in memory 28 for providing the three-dimensional digital restorative tooth model may, e.g., be an untrained machine learning module, a pre-trained machine learning module or a partially trained machine learning module.

Memory 28 may, e.g., include a library of pulp chambers comprising a plurality of three-dimensional digital pulp chamber models.

Memory 28 may, e.g., include trained machine learning module configured to provide a three-dimensional digital pulp chamber model as output in response to receiving the three-dimensional digital tooth model as input. The trained machine learning module may, e.g., have been received by the computer device 10. The trained machine learning module may, e.g., have been trained by the computer device 10 using training datasets with training data received and/or generated by the computer device 10. For training the machine learning module, the memory 28 may comprise a machine learning module to be trained as well as training datasets with training data for training the machine learning module to provide a three-dimensional digital pulp chamber model. The machine learning module included in memory 28 for providing a three-dimensional digital pulp chamber model may, e.g., be an untrained machine learning module, a pre-trained machine learning module or a partially trained machine learning module.

Memory 28 may, e.g., include a library of roots comprising a plurality of typical forms of roots.

Program 40 may have a set of one or more program modules 42 and by way of example be stored in memory 28. The program modules 42 may comprise an operating system, one or more application programs, other program modules, and/or program data. Each of these program modules 42, i.e., the operating system, the one or more application programs, the other program modules, and/or the program data or some combination thereof, may include an implementation of a networking environment. One or more of the program modules 42 may be configured for determining a preparation surface. One of the program modules 42 may, e.g., further be configured for generating a three-dimensional digital restorative tooth model. One of the program modules 42 may, e.g., further be configured for generating a three-dimensional digital dental restoration model. One of the program modules 42 may, e.g., be configured to train a machine learning module to be trained. The machine learning module to be trained may, e.g., be an untrained machine learning module, a pre-trained machine learning module or a partially trained machine learning module.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

The computer device 10 shown in FIG. 57 may be configured for determining a preparation surface of a tooth for preparing the tooth for receiving a dental restoration element. For this purpose, a three-dimensional digital tooth model may be received. The three-dimensional digital tooth model is descriptive of a current form and of a position of the tooth within a dental situation of a patient. A three-dimensional digital restorative tooth model is received, which defines a preliminary target form of the tooth to be achieved by applying the dental restoration element. A definition of a restoration area is received. The definition indicates a surface area of the tooth, at which the dental restoration element is to be arranged. A first value selected for a basic preparation depth of the preparation within the restoration area of the three-dimensional digital tooth model is received. Furthermore, a second value selected for a restoration thickness of the dental restoration element is received. A first reference surface using an inward projection of the restoration area of the three-dimensional digital tooth model into the three-dimensional digital tooth model depending on the first value selected for the basic preparation depth. Furthermore, a second reference surface is determined using an inward projection of a surface section of the three-dimensional digital restorative tooth model overlapping with the restoration area into the three-dimensional digital restorative tooth model depending on the second value selected for the restoration thickness. One or more preparation reference surface sections are determined using the first and second reference surface. The determined one or more preparation reference surface sections are used to determine the preparation surface of the tooth.

Figure 58:
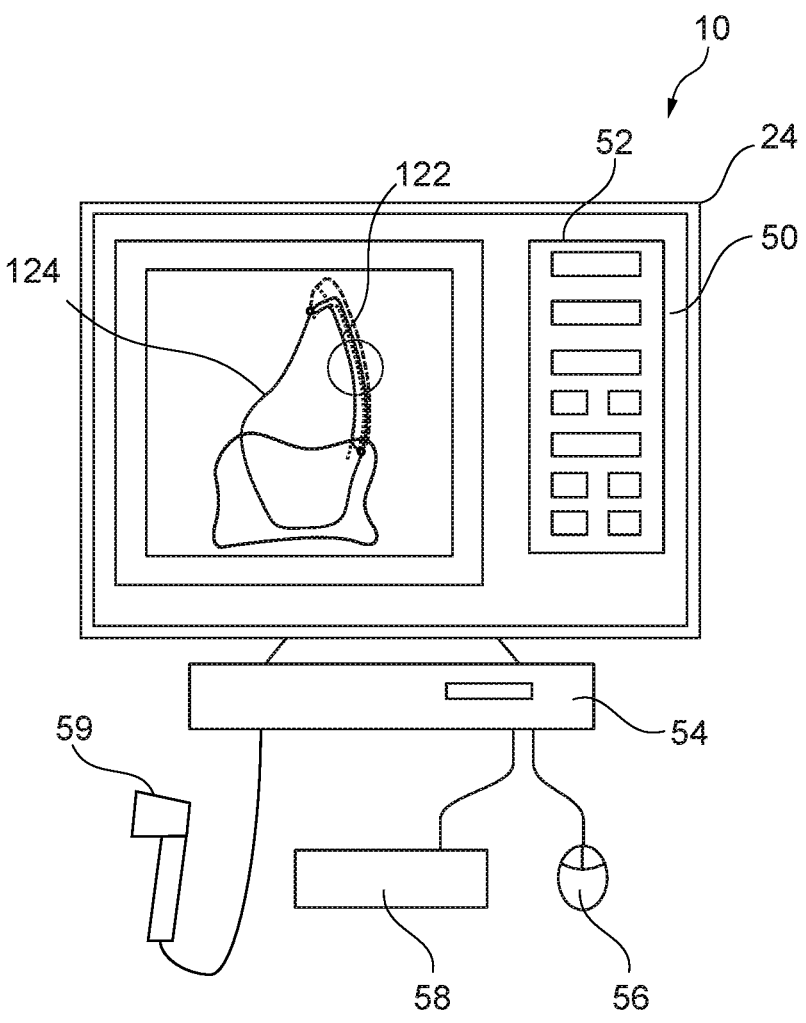
FIG. 58 shows an exemplary computer device for determining a preparation surface.

FIG. 58 shows an exemplary computer device 10 for determining a preparation surface of a tooth for preparing the tooth for receiving a dental restoration element. The computer device 10 may, e.g., be configured as shown in FIG. 57. The computer device 10 may comprise a hardware component 54 comprising one or more processors as well as a memory storing machine-executable program instructions. Execution of the program instructions by the one or more processors may cause the one or more processors to control the computer device 10 to determine one or more parameters of one or more ortho-restorative measures to be applied to a tooth.

The computer device 10 may further comprise one or more input devices, like a keyboard 58 and a mouse 56, enabling a user to interact with the computer device 10. Furthermore, the computer device 10 may comprise one or more output devices, like a display 24 providing a graphical user interface 50 with control elements 52, e.g., GUI elements, enabling the user to control the determining one or more parameters of one or more ortho-restorative measures to be applied to a tooth. The computer device 10 may further comprise an intraoral scanner 59, e.g., configured for scanning a patient's oral cavity, an imprint of a patient's oral cavity and/or a positive of a patient's oral cavity generated using an imprint.

Figure 59:
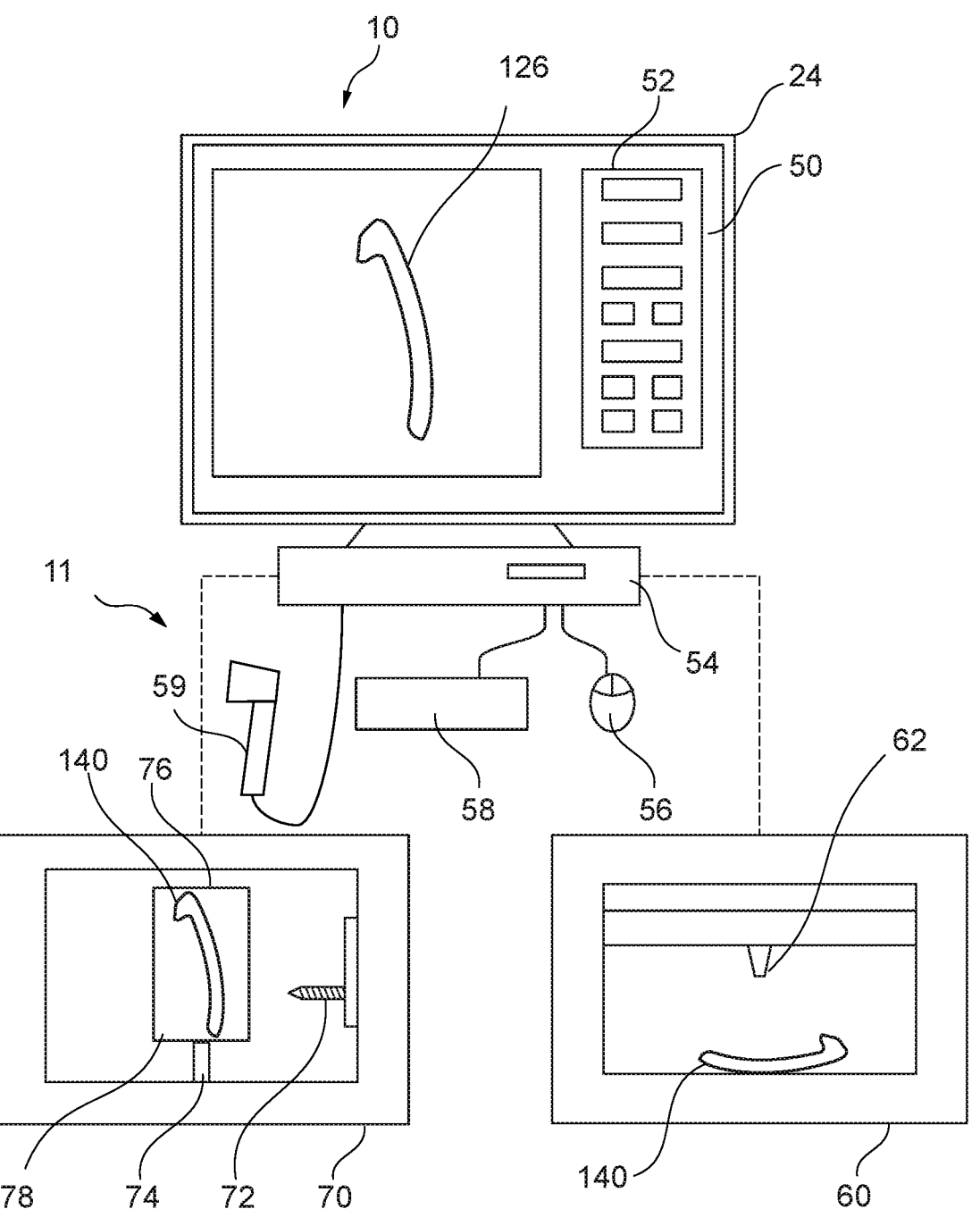
FIG. 59 shows an exemplary system for manufacturing a dental restoration element.

FIG. 59 shows an exemplary manufacturing system 11 for manufacturing a dental restoration element. A three-dimensional digital dental restoration model 126 defining the dental restoration element 140 may be provided. This three-dimensional digital dental restoration model 126 may, e.g., be used as a template for manufacturing the dental restoration element 140 as a physical copy of the template.

The manufacturing system 11 may comprise the computer device 10 of FIG. 58. The computer device 10 may further be configured to control one or more manufacturing devices 60, 70. For example, the manufacturing system 11 may comprise a manufacturing device in form of a machining device 70 controlled by the computer device 10. The machining device 70 may be configured to machining a blank 76 using one or more machining tools 72. The blank 76 of raw material 78, may be provided using a holding device 74 and cut into a desired shape and size of the element to be manufactured, e.g., the dental restoration element 140. The machining tool 72 may, e.g., be a milling tool.

For example, the manufacturing system 11 may comprise a manufacturing device in form of a 3D printing device 60. The 3D printing device 60 may be controlled by the computer device 10 and configured to print an element to be manufactured, e.g., the dental restoration element. The 3D printing device 60 may comprise a printing element 62 configured to print the respective element, like the dental restoration element 140, layer by layer. The printing element 62 may, e.g., comprise a nozzle configured for distributing printing material.

In case the element to be manufactured using the 3D printing device 60 is made using metal, the 3D printing device 60 may, e.g., be configured for executing selective laser sintering or melting. Selective laser sintering uses a laser for sintering a powdered material, aiming the laser automatically at points in space defined by a three-dimensional digital model of the element to be printed. The laser energy may result in a local sintering or melting of the powdered material, binding the material together to create a solid structure. For example, the printing element 62 of the 3D printing device 60 may comprise a laser and/or a distributing device for distributing the powdered material.

For example, the three-dimensional digital restoration model may be used as a positive to define a negative of the physical dental restoration element in form of a negative 3D digital restoration model. The negative 3D digital restoration model may be used to manufacture, e.g., using machining device 70 or 3D printing device 60, a casting matrix. The casting matrix may be configured for casting the physical dental restoration element by inserting restoration material into the casting matrix and curing the inserted restoration material.

Figure 60:
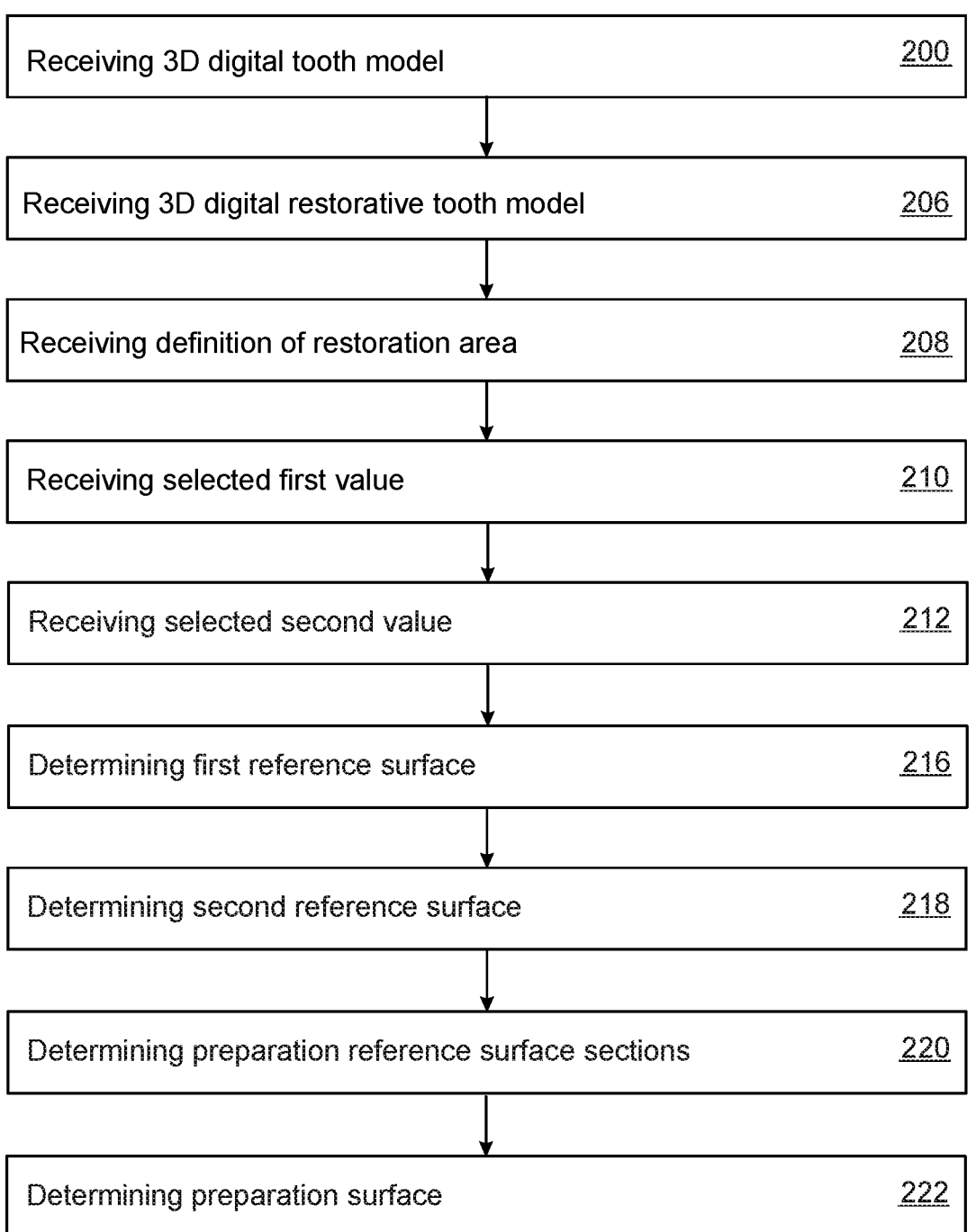
FIG. 60 shows a flowchart illustrating an exemplary method for determining a preparation surface.

FIG. 60 shows an exemplary method for determining a preparation surface of a tooth for preparing the tooth for receiving a dental restoration element. In block 200, a three-dimensional digital tooth model is received. The three-dimensional digital tooth model is descriptive of a current form and of a position of the tooth within a dental situation of a patient. In block 206, a three-dimensional digital restorative tooth model is received, which defines a preliminary target form of the tooth to be achieved by applying the dental restoration element. In block 208, a definition of a restoration area is received. The definition indicates a surface area of the tooth, at which the dental restoration element is to be arranged. In block 210, a first value selected for a basic preparation depth of the preparation within the restoration area of the three-dimensional digital tooth model is received. In block 212, a second value selected for a restoration thickness of the dental restoration element is received. In block 216, a first reference surface using an inward projection of the restoration area of the three-dimensional digital tooth model into the three-dimensional digital tooth model depending on the first value selected for the basic preparation depth. In block 218, a second reference surface is determined using an inward projection of a surface section of the three-dimensional digital restorative tooth model overlapping with the restoration area into the three-dimensional digital restorative tooth model depending on the second value selected for the restoration thickness. In block 220, one or more preparation reference surface sections are determined using the first and second reference surface. For example, each of the preparation reference surface sections determined in block 220 satisfies one of the following criteria: the preparation reference section being a section of the first reference surface extending below the second reference surface; the preparation reference surface section being a section of the first reference surface coinciding with a section of the second reference surface; the preparation reference surface section being a section of the second reference surface extending below the first reference surface. In block 222, the determined one or more preparation reference surface sections are used to determine the preparation surface of the tooth.

Figure 61:
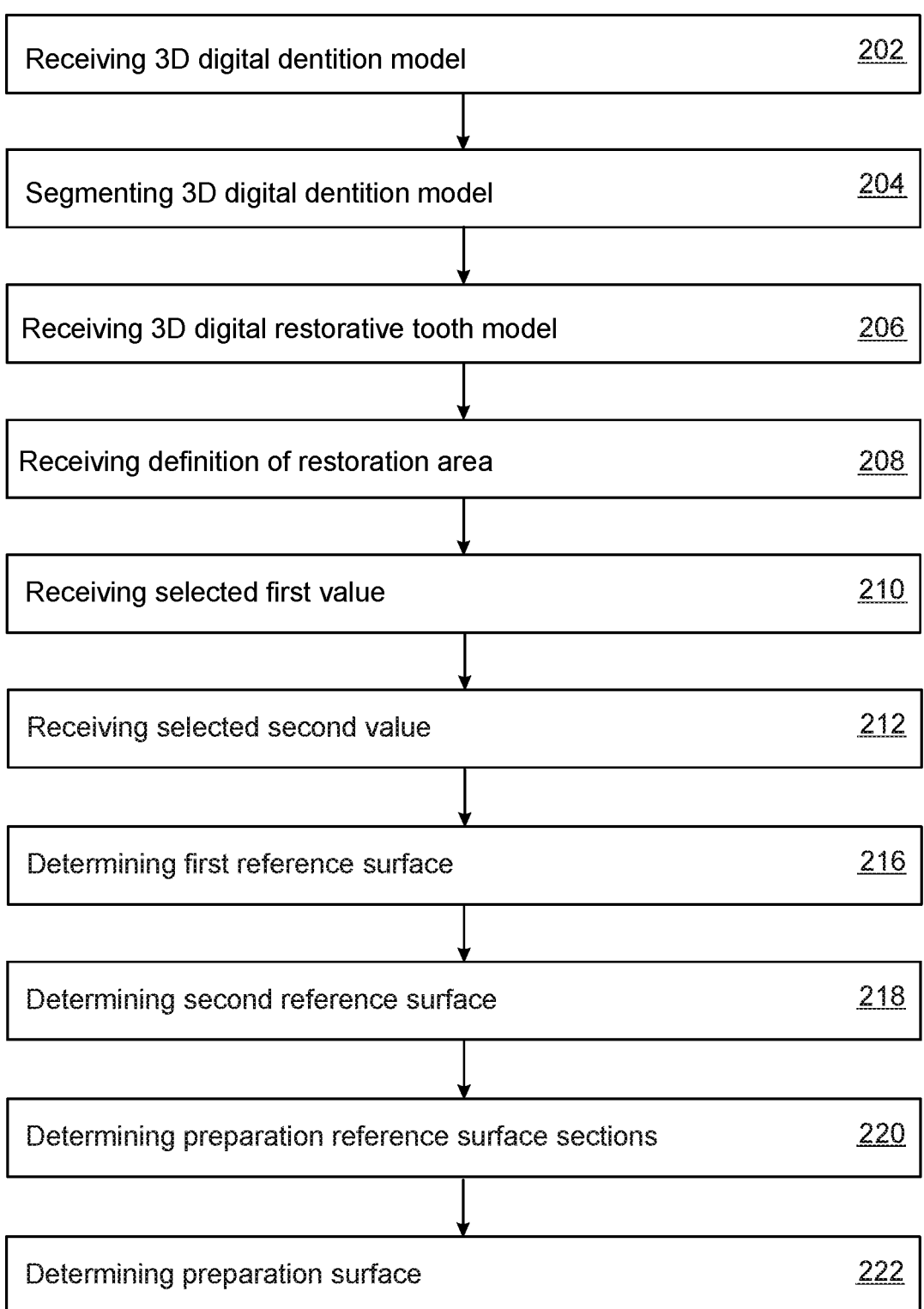
FIG. 61 shows a flowchart illustrating an exemplary method for determining a preparation surface.

FIG. 61 shows an exemplary method for determining a preparation surface of a tooth for preparing the tooth for receiving a dental restoration element.

In block 202, a three-dimensional digital dentition model of the dentition of the patient comprising a plurality of three-dimensional digital tooth models descriptive of current forms and of positions of the teeth within the dentition is received. The three-dimensional digital tooth models may e.g., be provided using scan data of the respective teeth of the patient. For example, the scan data of the teeth may be comprised by scan data of the patient's dentition.

The three-dimensional digital dentition model of the dentition of the patient may be provided using scan data of the patient's dentition. The three-dimensional digital dentition model may, e.g., be generated by a computer system executing the method for determining the preparation surface of a tooth of the patient's dentition or it may be received from an external source. The external source may, e.g., be a server, like a cloud server, providing the three-dimensional digital dentition model via a network. The external source may, e.g., be a removable storage device providing the three-dimensional digital dentition model via a direct communication connection, e.g., wireless or via a wire.

The three-dimensional digital dentition model may, e.g., further comprising a three-dimensional digital gingiva model of the gingiva of the patient. The three-dimensional digital gingiva model is descriptive of a current form and of a position of a gingiva around the teeth within the dentition.

The three-dimensional digital tooth model is descriptive of a current form and of a position of the tooth within a dental situation of a patient. In block 204, the three-dimensional digital tooth model of the tooth, for which the preparation surface is to be determined, is identified within the three-dimensional digital dentition model of the dentition of the patient using segmentation. Furthermore, the three-dimensional digital gingiva model of the gingiva of the patient may be identified using segmentation.

In block 206, a three-dimensional digital restorative tooth model is received, which defines a preliminary target form of the tooth to be achieved by applying the dental restoration element. In block 208, a definition of a restoration area is received. The definition indicates a surface area of the tooth, at which the dental restoration element is to be arranged. In block 210, a first value selected for a basic preparation depth of the preparation within the restoration area of the three-dimensional digital tooth model is received. In block 212, a second value selected for a restoration thickness of the dental restoration element is received. In block 216, a first reference surface using an inward projection of the restoration area of the three-dimensional digital tooth model into the three-dimensional digital tooth model depending on the first value selected for the basic preparation depth. In block 218, a second reference surface is determined using an inward projection of a surface section of the three-dimensional digital restorative tooth model overlapping with the restoration area into the three-dimensional digital restorative tooth model depending on the second value selected for the restoration thickness. In block 220, one or more preparation reference surface sections are determined using the first and second reference surface. For example, each of the preparation reference surface sections determined in block 220 satisfies one of the following criteria: the preparation reference section being a section of the first reference surface extending below the second reference surface; the preparation reference surface section being a section of the first reference surface coinciding with a section of the second reference surface; the preparation reference surface section being a section of the second reference surface extending below the first reference surface. In block 222, the determined one or more preparation reference surface sections are used to determine the preparation surface of the tooth.

Figure 62A:
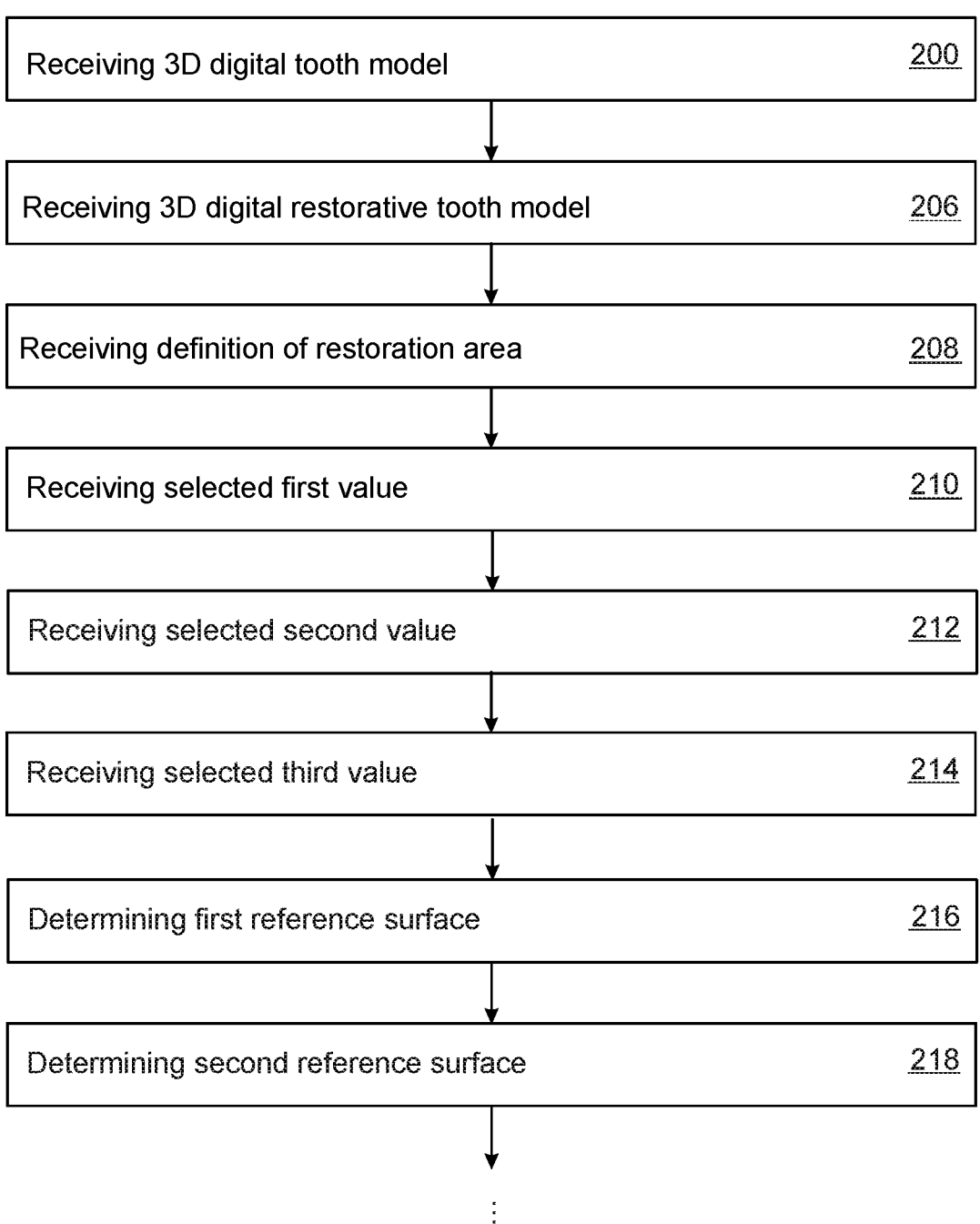
FIGS. 62A and 62B show a flowchart illustrating an exemplary method for manufacturing a dental restoration element.
Figure 62B:
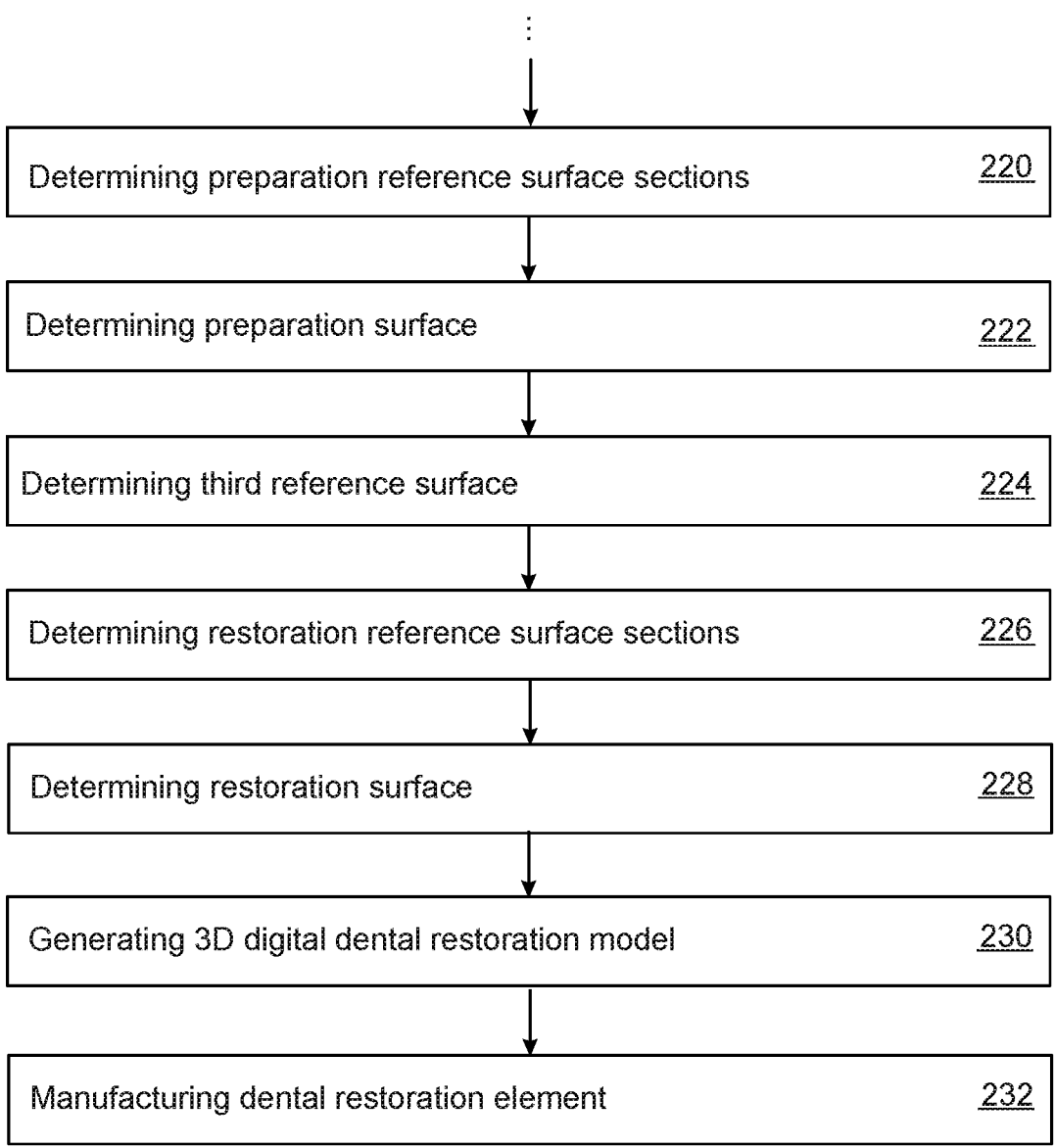

FIGS. 62A and 62B show an exemplary method for manufacturing a dental restoration element. The flowchart illustrating the method has been split over two images, which together form the respective method, in order to increase to improve intelligibility.

In block 200, a three-dimensional digital tooth model is received. The three-dimensional digital tooth model is descriptive of a current form and of a position of the tooth within a dental situation of a patient. In block 206, a three-dimensional digital restorative tooth model is received, which defines a preliminary target form of the tooth to be achieved by applying the dental restoration element. In block 208, a definition of a restoration area is received. The definition indicates a surface area of the tooth, at which the dental restoration element is to be arranged. In block 210, a first value selected for a basic preparation depth of the preparation within the restoration area of the three-dimensional digital tooth model is received. In block 212, a second value selected for a restoration thickness of the dental restoration element is received.

In block 214, a third value selected for a required material thickness of the dental restoration element is received.

In block 216, a first reference surface using an inward projection of the restoration area of the three-dimensional digital tooth model into the three-dimensional digital tooth model depending on the first value selected for the basic preparation depth. In block 218, a second reference surface is determined using an inward projection of a surface section of the three-dimensional digital restorative tooth model overlapping with the restoration area into the three-dimensional digital restorative tooth model depending on the second value selected for the restoration thickness. In block 220, one or more preparation reference surface sections are determined using the first and second reference surface. For example, each of the preparation reference surface sections determined in block 220 satisfies one of the following criteria: the preparation reference section being a section of the first reference surface extending below the second reference surface; the preparation reference surface section being a section of the first reference surface coinciding with a section of the second reference surface; the preparation reference surface section being a section of the second reference surface extending below the first reference surface.

In block 222, the determined one or more preparation reference surface sections are used to determine the preparation surface of the tooth.

In block 224, a third reference surface is determined using an outward projection of the preparation surface depending on the third value selected for the required material thickness. In block 226, one or more restoration reference surface sections are determined using the three-dimensional digital restorative tooth model and the third reference surface. In block 228, the one or more restoration reference surface sections are used to determine a restoration surface of the dental restoration element.

In block 230, the preparation surface of the tooth determined in block 222 and the restoration surface of the dental restoration element determined in block 228 are used for generating a three-dimensional digital dental restoration model defining a form of the dental restoration element. In block 232, a manufacturing device is controlled for manufacturing the dental restoration element in form of a physical copy of the three-dimensional digital dental restoration model generated in block 230.

Figure 63A:
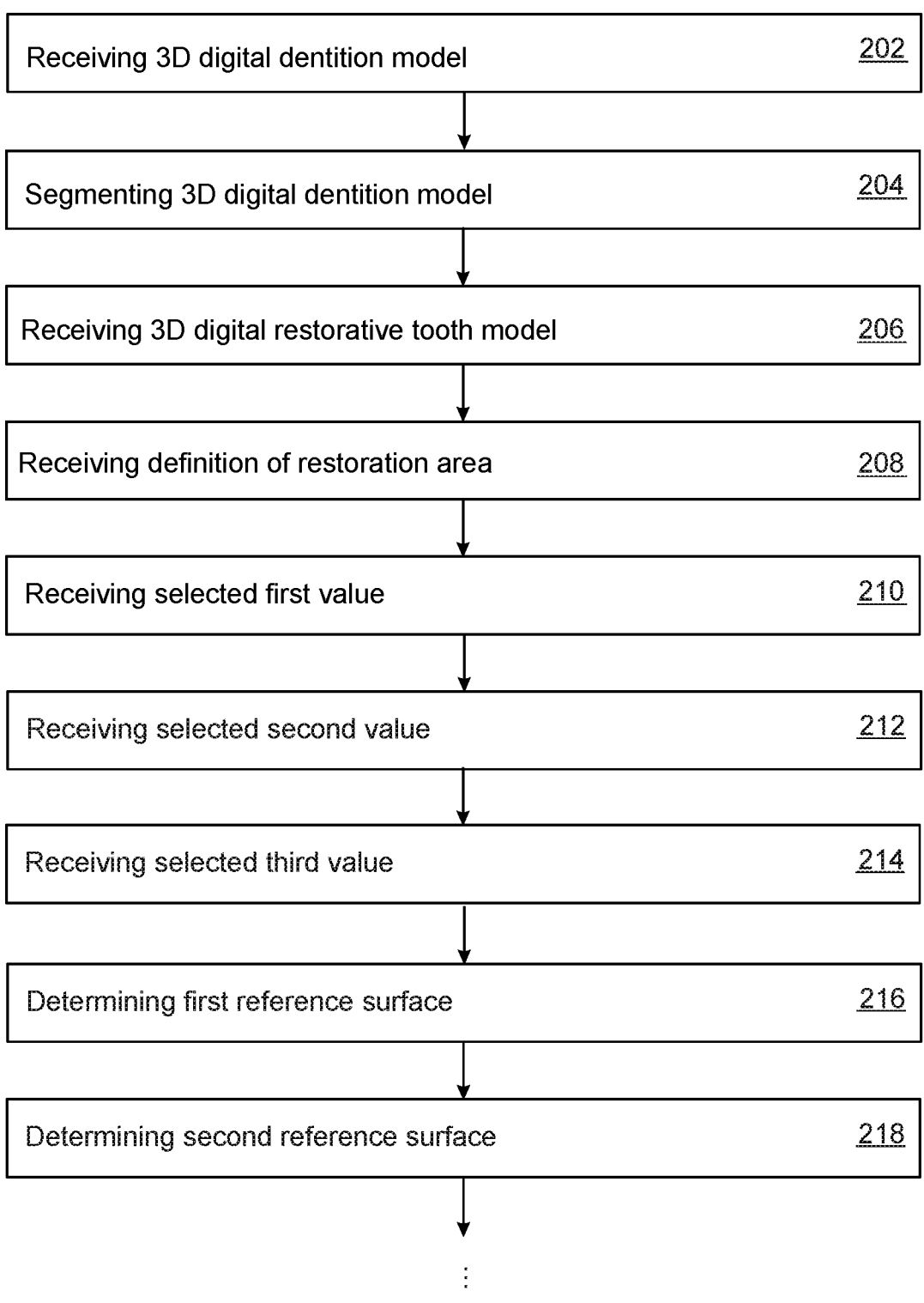
FIGS. 63A and 63B shows a flowchart illustrating an exemplary method for manufacturing a dental restoration element.
Figure 63B:
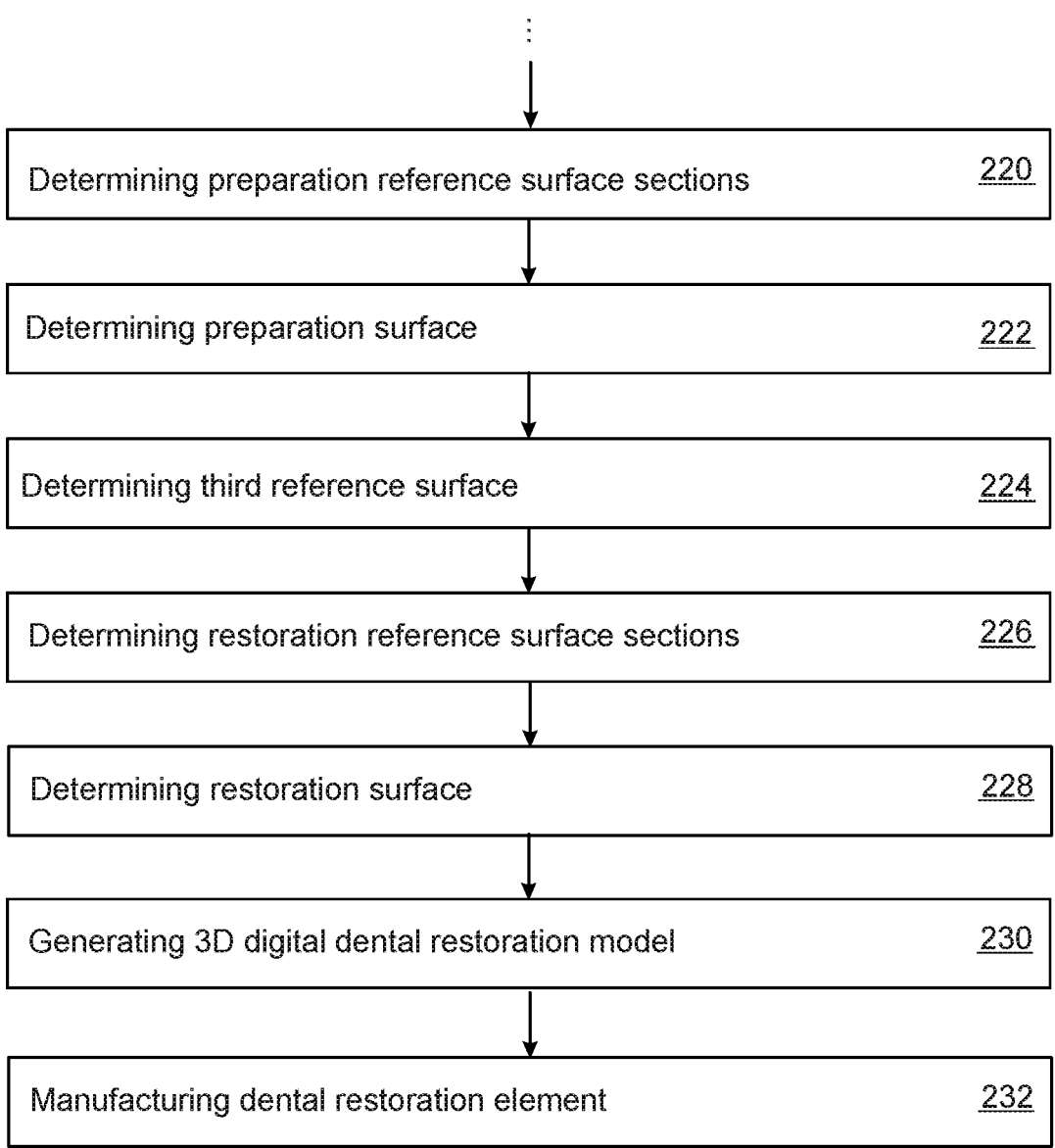

FIGS. 63A and 63B show an exemplary method for manufacturing a dental restoration element. The flowchart illustrating the method has been split over two images, which together form the respective method, in order to increase to improve intelligibility.

In block 202, a three-dimensional digital dentition model of the dentition of the patient comprising a plurality of three-dimensional digital tooth models descriptive of current forms and of positions of the teeth within the dentition is received. The three-dimensional digital tooth models may e.g., be provided using scan data of the respective teeth of the patient. For example, the scan data of the teeth may be comprised by scan data of the patient's dentition.

The three-dimensional digital dentition model of the dentition of the patient may be provided using scan data of the patient's dentition. The three-dimensional digital dentition model may, e.g., be generated by a computer system executing the method for determining the preparation surface of a tooth of the patient's dentition or it may be received from an external source. The external source may, e.g., be a server, like a cloud server, providing the three-dimensional digital dentition model via a network. The external source may, e.g., be a removable storage device providing the three-dimensional digital dentition model via a direct communication connection, e.g., wireless or via a wire.

The three-dimensional digital dentition model may, e.g., further comprising a three-dimensional digital gingiva model of the gingiva of the patient. The three-dimensional digital gingiva model is descriptive of a current form and of a position of a gingiva around the teeth within the dentition.

In block 204, the three-dimensional digital tooth model of the tooth, for which the preparation surface is to be determined, is identified within the three-dimensional digital dentition model of the dentition of the patient using segmentation. Furthermore, the three-dimensional digital gingiva model of the gingiva of the patient may be identified using segmentation.

The three-dimensional digital tooth model is descriptive of a current form and of a position of the tooth within a dental situation of a patient. In block 206, a three-dimensional digital restorative tooth model is received, which defines a preliminary target form of the tooth to be achieved by applying the dental restoration element. In block 208, a definition of a restoration area is received. The definition indicates a surface area of the tooth, at which the dental restoration element is to be arranged. In block 210, a first value selected for a basic preparation depth of the preparation within the restoration area of the three-dimensional digital tooth model is received. In block 212, a second value selected for a restoration thickness of the dental restoration element is received.

In block 214, a third value selected for a required material thickness of the dental restoration element is received.

In block 216, a first reference surface using an inward projection of the restoration area of the three-dimensional digital tooth model into the three-dimensional digital tooth model depending on the first value selected for the basic preparation depth. In block 218, a second reference surface is determined using an inward projection of a surface section of the three-dimensional digital restorative tooth model overlapping with the restoration area into the three-dimensional digital restorative tooth model depending on the second value selected for the restoration thickness. In block 220, one or more preparation reference surface sections are determined using the first and second reference surface. For example, each of the preparation reference surface sections determined in block 220 satisfies one of the following criteria: the preparation reference section being a section of the first reference surface extending below the second reference surface; the preparation reference surface section being a section of the first reference surface coinciding with a section of the second reference surface; the preparation reference surface section being a section of the second reference surface extending below the first reference surface.

In block 222, the determined one or more preparation reference surface sections are used to determine the preparation surface of the tooth.

In block 224, a third reference surface is determined using an outward projection of the preparation surface depending on the third value selected for the required material thickness. In block 226, one or more restoration reference surface sections are determined using the three-dimensional digital restorative tooth model and the third reference surface. In block 228, the one or more restoration reference surface sections are used to determine a restoration surface of the dental restoration element.

In block 230, the preparation surface of the tooth determined in block 222 and the restoration surface of the dental restoration element determined in block 228 are used for generating a three-dimensional digital dental restoration model defining a form of the dental restoration element. In block 232, a manufacturing device is controlled for manufacturing the dental restoration element in form of a physical copy of the three-dimensional digital dental restoration model generated in block 230.

Figure 64:
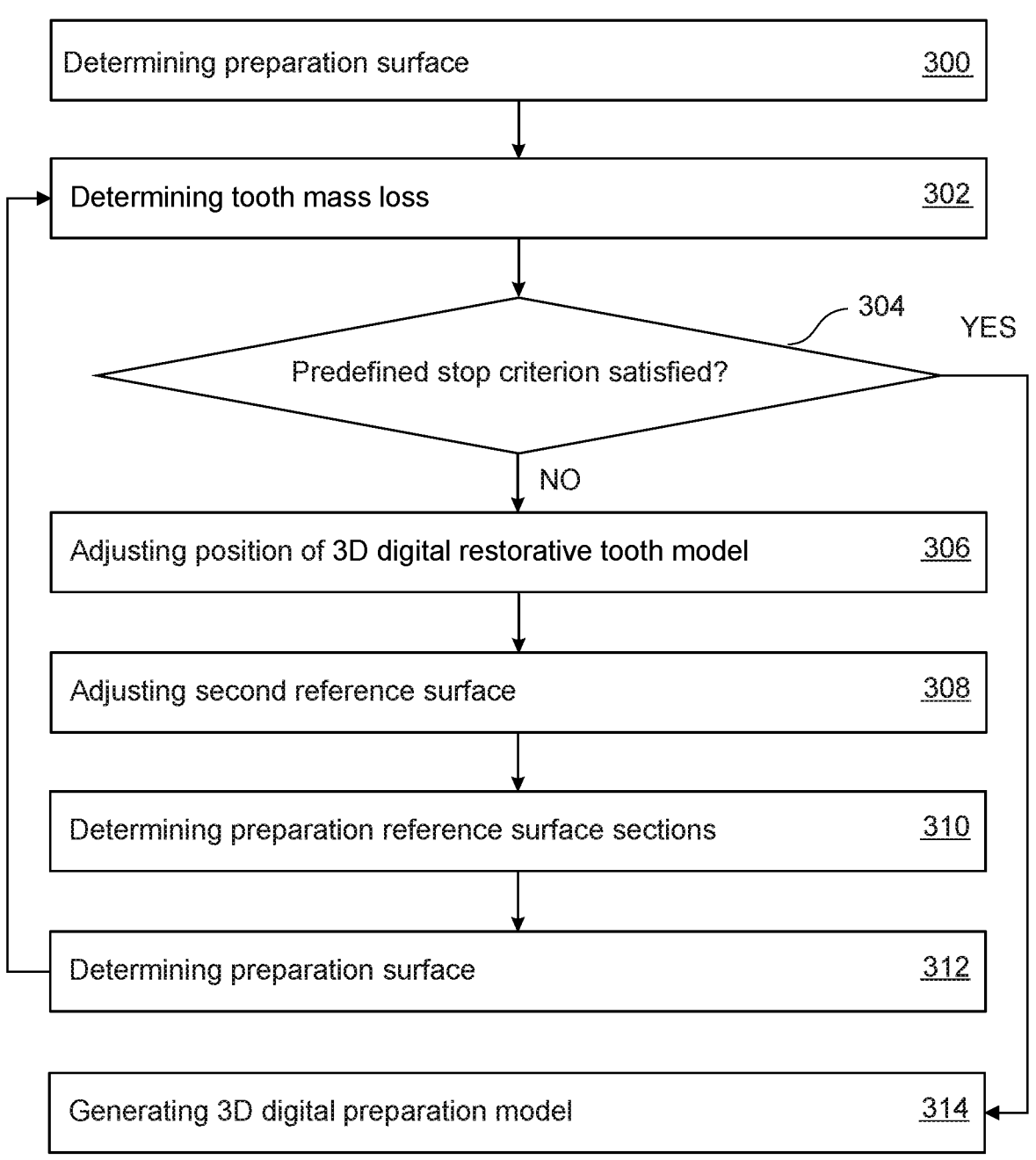
FIG. 64 shows a flowchart illustrating an exemplary method for reducing a tooth mass loss.

FIG. 64 shows an exemplary method for reducing a tooth mass loss resulting from preparing a preparation surface, e.g., determined according to any of the methods of FIG. 60, FIG. 61, FIGS. 62A and 62B or FIGS. 63A and 63B. In block 300, the preparation surface is determined. Block 300 corresponds, e.g., to block 222 of any of the methods of FIG. 60, FIG. 61, FIGS. 62A and 628 or FIGS. 63A and 63B. In block 302, the preparation surface of the tooth and the three-dimensional digital preparation tooth model are used for determining a tooth material loss resulting from preparing the preparation surface. The three-dimensional digital preparation tooth model may, e.g., be the three-dimensional digital preparation tooth model received in block 200 of FIG. 60 or FIGS. 62A and 62B or the three-dimensional digital preparation tooth model received in blocks 202 and 204 of FIG. 61 or FIGS. 63A and 63B.

In block 304, it is checked, whether the tooth mass loss determined in block 302 satisfies one or more predefined first criteria. The one or more predefined first criteria may, e.g., comprise one or more of the following criteria: the adjusted second reference surface comprising no sections extending below the first reference surface due to the iterative one or more iterative adjustments; the re-determining tooth material loss being equal to a basic tooth mass loss determined using the first reference surface and the three-dimensional digital preparation tooth model; the re-determined tooth mass loss reaching a minimum; the adjustment of the position of the three-dimensional digital restorative tooth model reaching a predefined first threshold; the iteration reaching a predefined first maximum number of iteration steps.

In case the one or more predefined first criteria are satisfied, the method is, e.g., continued in block 314. In block 314, the preparation surface determined in block 300 and the three-dimensional digital tooth model are used for generating a three-dimensional digital preparation tooth model defining a form of the prepared tooth.

Otherwise, the tooth mass loss may be reduced using an iterative approach. In block 306, a position of the three-dimensional digital restorative tooth model is adjusted relative to the position of the tooth, in order to reduce the tooth mass loss. In block 308, the second reference surface is adjusted for the adjusted position of the three-dimensional digital restorative tooth model. In block 310, the one or more preparation reference surface sections are re-determined using the first reference surface and the adjusted second reference surface. In block 312, the preparation surface of the tooth is re-determined using the re-determined one or more preparation reference surface sections. The re-determined preparation surface of the tooth and the three-dimensional digital preparation tooth model are used for re-determining the tooth mass loss in block 302 for the adjusted position of the three-dimensional digital restorative tooth model.

Figure 65:
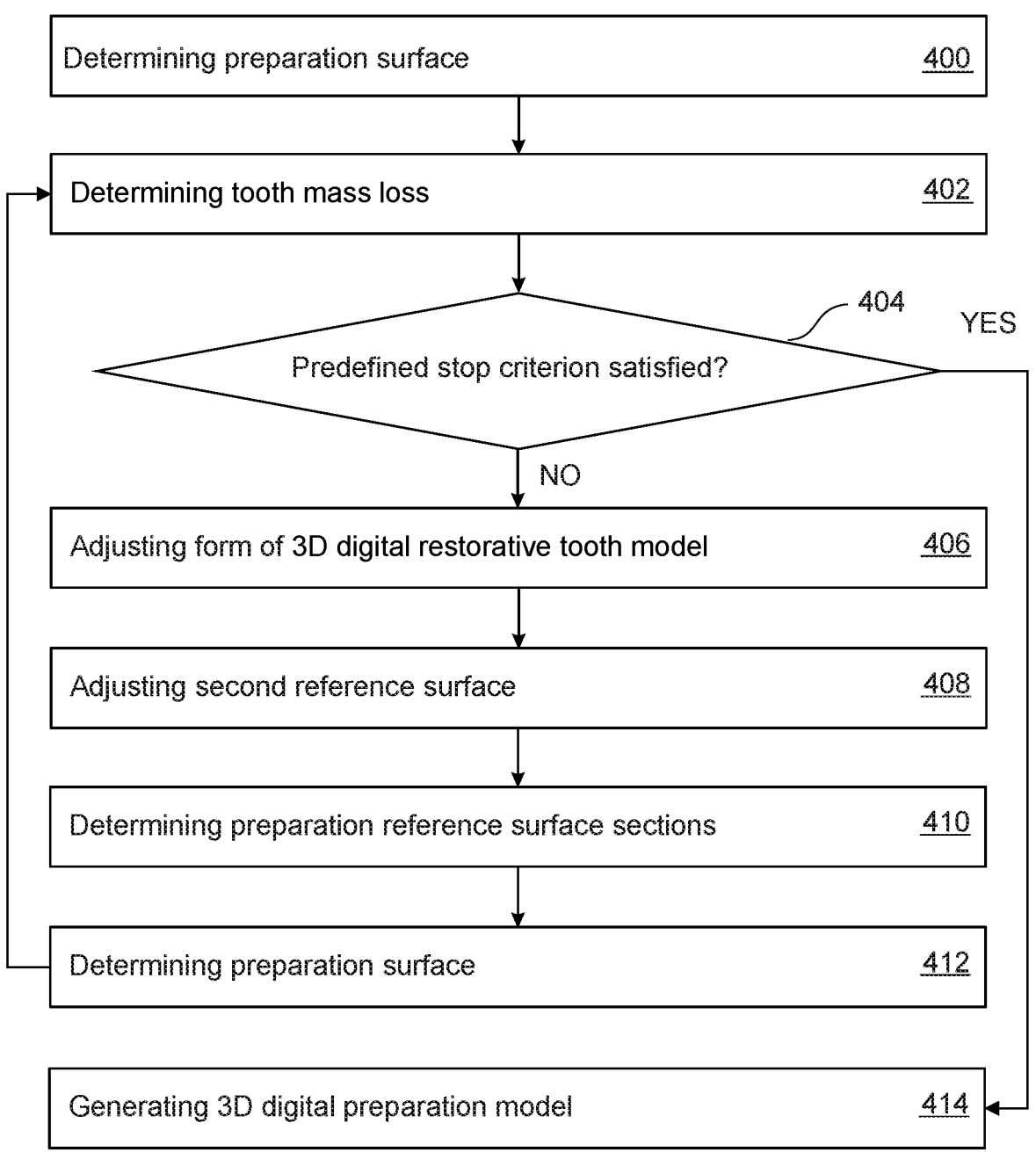
FIG. 65 shows a flowchart illustrating an exemplary method for reducing a tooth mass loss.

FIG. 65 shows an exemplary method for reducing a tooth mass loss resulting from preparing a preparation surface, e.g., determined according to any of the methods of FIG. 60, FIG. 61, FIGS. 62A and 62B or FIGS. 63A and 63B. In block 400, the preparation surface is determined. Block 400 corresponds, e.g., to block 222 of any of the methods of FIG. 60, FIG. 61, FIGS. 62A and 62B or FIGS. 63A and 63B. In block 402, the preparation surface of the tooth and the three-dimensional digital preparation tooth model are used for determining a tooth material loss resulting from preparing the preparation surface. The three-dimensional digital preparation tooth model may, e.g., be the three-dimensional digital preparation tooth model received in block 200 of FIG. 60 or FIGS. 62A and 628 or the three-dimensional digital preparation tooth model received in blocks 202 and 204 of FIG. 61 or FIGS. 63A and 63B.

In block 404, it is checked, whether the tooth mass loss determined in block 402 satisfies one or more predefined second criteria. The one or more predefined second criteria may, e.g., comprise one or more of the following criteria: the adjusted second reference surface comprising no sections extending below the first reference surface due to the iterative one or more iterative adjustments; the re-determining tooth material loss being equal to the basic tooth mass loss; the re-determined tooth mass loss reaching a minimum; the adjustment of the form of the three-dimensional digital restorative tooth model reaching a predefined second threshold; the iteration reaching a predefined second maximum number of iteration steps.

In case the one or more predefined second criteria are satisfied, the method is, e.g., continued in block 414. In block 414, the preparation surface determined in block 400 and the three-dimensional digital tooth model are used for generating a three-dimensional digital preparation tooth model defining a form of the prepared tooth.

Otherwise, the tooth mass loss may be reduced using an iterative approach. In block 406, a preliminary target form of the three-dimensional digital restorative tooth model is adjusted by adjusting a form of the three-dimensional digital restorative tooth model, in order to reduce the tooth mass loss. In block 408, the second reference surface is adjusted for the adjusted form of the three-dimensional digital restorative tooth model. In block 410, the one or more preparation reference surface sections are re-determined using the first reference surface and the adjusted second reference surface. In block 412, the preparation surface of the tooth is re-determined using the re-determined one or more preparation reference surface sections. The re-determined preparation surface of the tooth and the three-dimensional digital preparation tooth model are used for re-determining the tooth material loss in block 402 for the adjusted form of the three-dimensional digital restorative tooth model.

Figure 66:
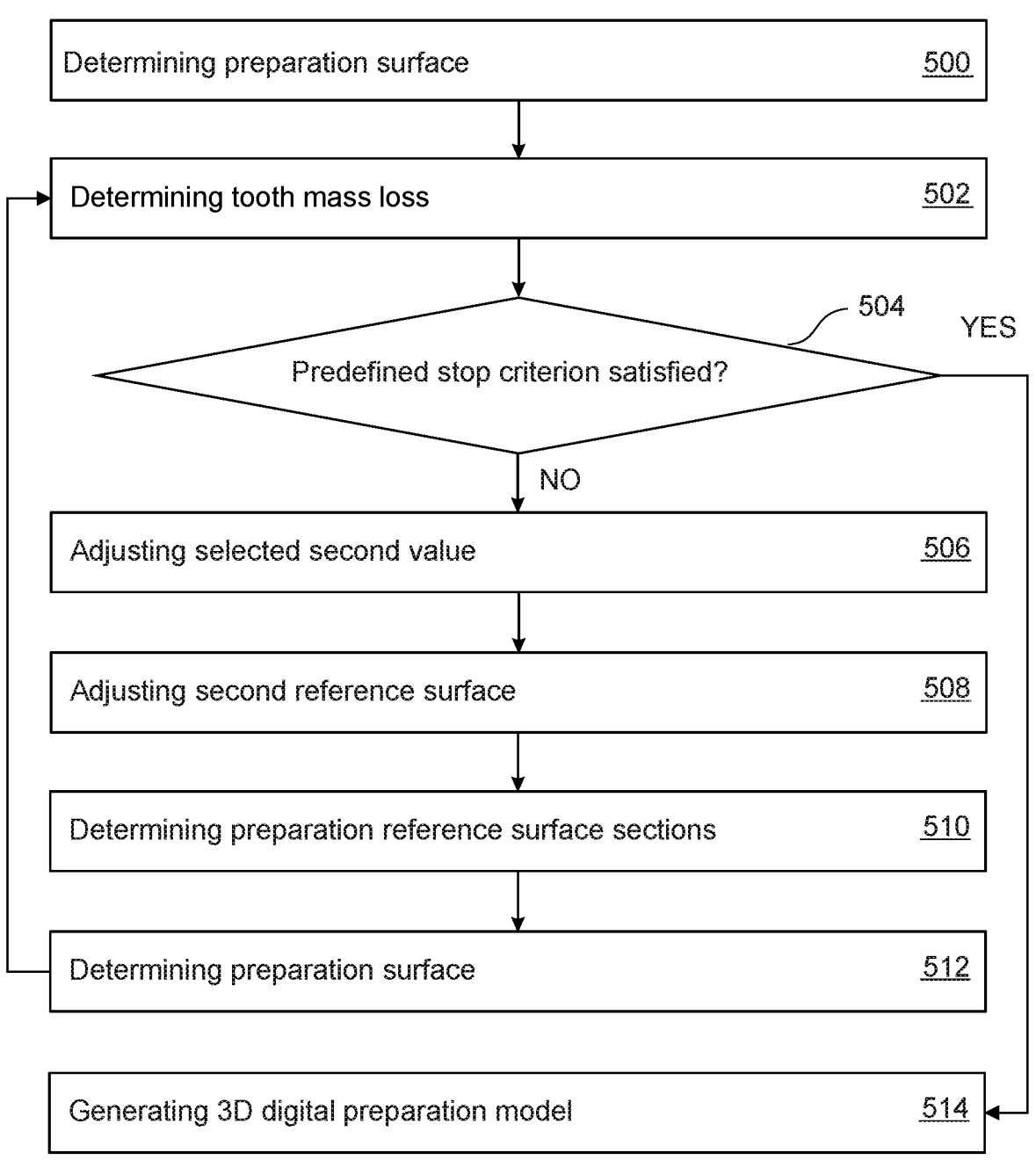
FIG. 66 shows a flowchart illustrating an exemplary method for reducing a tooth mass loss.

FIG. 66 shows an exemplary method for reducing a tooth mass loss resulting from preparing a preparation surface, e.g., determined according to any of the methods of FIG. 60, FIG. 61, FIGS. 62A and 62B or FIGS. 63A and 63B. In block 500, the preparation surface is determined. Block 500 corresponds, e.g., to block 222 of any of the methods of FIG. 60, FIG. 61, FIGS. 62A and 62B or FIGS. 63A and 63B. In block 502, the preparation surface of the tooth and the three-dimensional digital preparation tooth model are used for determining a tooth material loss resulting from preparing the preparation surface. The three-dimensional digital preparation tooth model may, e.g., be the three-dimensional digital preparation tooth model received in block 200 of FIG. 60 or FIGS. 62A and 62B or the three-dimensional digital preparation tooth model received in blocks 202 and 204 of FIG. 61 or FIGS. 63A and 63B.

In block 504, it is checked, whether the tooth mass loss determined in block 502 satisfies one or more predefined third criteria. The one or more predefined third criteria may, e.g., comprise one or more of the following criteria: the adjusted second reference surface comprising no sections extending below the first reference surface due to the iterative one or more iterative adjustments; the re-determining tooth material loss being equal to the basic tooth mass loss; the re-determined tooth mass loss reaching a minimum; the adjustment of the second value reaching a predefined third threshold; the iteration reaching a predefined third maximum number of iteration steps.

In case the one or more predefined third criteria are satisfied, the method is, e.g., continued in block 514. In block 514, the preparation surface determined in block 500 and the three-dimensional digital tooth model are used for generating a three-dimensional digital preparation tooth model defining a form of the prepared tooth.

Otherwise, the tooth mass loss may be reduced using an iterative approach. In block 506, the second value selected for the restoration thickness of the dental restoration element is adjusted, in order to reduce the tooth mass loss. In block 508, the second reference surface is adjusted using the adjusted second value. In block 510, the one or more preparation reference surface sections are re-determined using the first reference surface and the adjusted second reference surface. In block 512, the preparation surface of the tooth is re-determined using the re-determined one or more preparation reference surface sections. The re-determined preparation surface of the tooth and the three-dimensional digital preparation tooth model are used for re-determining the tooth material loss in block 502 for the adjusted second value.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. For example, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. For example, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities. the computer program or program instructions are understood to be adapted to be executed by a processor associated or related to the respective entity.

A "user interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Although the invention has been described in reference to specific embodiments, it should be understood that the invention is not limited to these examples only and that many variations of these embodiments may be readily envisioned by the skilled person after having read the present disclosure. The invention may thus further be described without limitation and by way of example only by the following embodiments. The following embodiments may contain preferred embodiments. Accordingly, the term "feature combination" as used therein may refer to such a "preferred embodiment".

1. A method for determining a preparation surface of a tooth for preparing the tooth for receiving a dental restoration element, the method comprising:

receiving a three-dimensional digital tooth model, the three-dimensional digital tooth model being descriptive of a current form and of a position of the tooth within a dental situation of a patient;

receiving a three-dimensional digital restorative tooth model, the three-dimensional digital restorative tooth model defining a preliminary target form of the tooth to be achieved by applying the dental restoration element;

receiving a definition of a restoration area indicative of a surface area of the tooth, at which the dental restoration element is to be arranged;

receiving a first value selected for a basic preparation depth of the preparation within the restoration area of the three-dimensional digital tooth model;

receiving a second value selected for a restoration thickness of the dental restoration element;

determining a first reference surface using an inward projection of the restoration area of the three-dimensional digital tooth model into the three-dimensional digital tooth model depending on the first value selected for the basic preparation depth;

determining a second reference surface using an inward projection of a surface section of the three-dimensional digital restorative tooth model overlapping with the restoration area into the three-dimensional digital restorative tooth model depending on the second value selected for the restoration thickness;

determining one or more preparation reference surface sections using the first and second reference surface, determining the preparation surface of the tooth using the determined one or more preparation reference surface sections.

2. The method of feature combination 1, each of the determined preparation reference surface sections satisfying one of the following criteria:

the preparation reference section being a section of the first reference surface extending below the second reference surface;

the preparation reference surface section being a section of the first reference surface coinciding with a section of the second reference surface;

the preparation reference surface section being a section of the second reference surface extending below the first reference surface.

3. The method of any of the previous feature combinations, further comprising:

receiving a third value selected for a required material thickness of the dental restoration element;

determining a third reference surface using an outward projection of the preparation surface depending on the third value selected for the required material thickness;

determining one or more restoration reference surface sections using the three-dimensional digital restorative tooth model and the third reference surface;

determining a restoration surface of the dental restoration element using the one or more restoration reference surface sections.

4. The method of feature combination 3, each of the determined restoration reference surface sections satisfying one of the following criteria:

the restoration reference surface sections being a section of the third reference surface extending out of the three-dimensional digital restorative tooth model;

the restoration reference surface sections being a section of the third reference surface coinciding with a surface section of the three-dimensional digital restorative tooth model;

the restoration reference surface sections being a surface section of the three-dimensional digital restorative tooth model extending above the third reference surface.

5. The method of any of the previous feature combinations, further comprising determining a three-dimensional digital core model of a core of the three-dimensional digital tooth model to be excluded from preparation, the determining of the one or more preparation reference surface sections further using the determined three-dimensional digital core model, one or more of the determined one or more preparation reference surface sections being a surface section of the three-dimensional digital core model extending out of one or more of the following: the first reference surface, the second reference surface.

6. The method of any of the previous feature combinations, further comprising using the preparation surface and the three-dimensional digital tooth model for generating a three-dimensional digital preparation tooth model defining a form of the prepared tooth.

7. The method of any of the previous feature combinations, further comprising using the preparation surface of the tooth and the three-dimensional digital preparation tooth model for determining a tooth mass loss resulting from preparing the preparation surface.

8. The method of feature combination 7, further comprising for reducing the tooth mass loss:

adjusting a position of the three-dimensional digital restorative tooth model relative to the position of the tooth;

determining an effect of the adjusting of the position of the three-dimensional digital restorative tooth model on the tooth mass loss, the determining of the effect on the tooth mass loss comprising:

adjusting the second reference surface for the adjusted position of the three-dimensional digital restorative tooth model;

re-determining the one or more preparation reference surface sections using the first reference surface and the adjusted second reference surface;

re-determining the preparation surface of the tooth using the re-determined one or more preparation reference surface sections;

using the re-determined preparation surface of the tooth and the three-dimensional digital preparation tooth model for re-determining the tooth mass loss for the adjusted position of the three-dimensional digital restorative tooth model.

9. The method of feature combination 8, further comprising performing the adjusting of the position of the three-dimensional digital restorative tooth model and the determining of the effect on the tooth mass loss iteratively until one or more predefined first criteria are satisfied.

10. The method of feature combination 9, the one or more predefined first criteria comprising one or more of the following criteria: the adjusted second reference surface comprising no sections extending below the first reference surface due to the iterative one or more iterative adjustments; the re-determining tooth mass loss being equal to a basic tooth mass loss determined using the first reference surface and the three-dimensional digital preparation tooth model; the re-determined tooth mass loss reaching a minimum; the adjustment of the position of the three-dimensional digital restorative tooth model reaching a predefined first threshold; the iteration reaching a predefined first maximum number of iteration steps.

11. The method of any of feature combinations 7 to 10, further comprising for reducing the tooth mass loss:

adjusting the definition of the preliminary target form of the tooth by adjusting a form of the three-dimensional digital restorative tooth model;

determining an effect of the adjusting of the form of the three-dimensional digital restorative tooth model on the tooth mass loss, the determining of the effect on the tooth mass loss comprising:

adjusting the second reference surface for the adjusted form of the three-dimensional digital restorative tooth model;

re-determining the one or more preparation reference surface sections using the first reference surface and the adjusted second reference surface;

re-determining the preparation surface of the tooth using the re-determined one or more preparation reference surface sections;

using the re-determined preparation surface of the tooth and the three-dimensional digital preparation tooth model for re-determining the tooth mass loss for the adjusted form of the three-dimensional digital restorative tooth model.

12. The method of feature combination 11, further comprising performing the adjusting of the form of the three-dimensional digital restorative tooth model and the determining of the effect on the tooth mass loss iteratively until one or more predefined second criteria are satisfied.

13. The method of feature combination 12, the one or more predefined second criteria comprising one or more of the following criteria: the adjusted second reference surface comprising no sections extending below the first reference surface due to the iterative one or more iterative adjustments; the re-determining tooth mass loss being equal to the basic tooth mass loss; the re-determined tooth mass loss reaching a minimum; the adjustment of the form of the three-dimensional digital restorative tooth model reaching a predefined second threshold; the iteration reaching a predefined second maximum number of iteration steps.

14. The method of any of feature combinations 7 to 13, further comprising for reducing the tooth mass loss:

adjusting the second value selected for the restoration thickness of the dental restoration element;

determining an effect of the adjusting of the second value on the tooth mass loss, the determining of the effect on the tooth mass loss comprising:

adjusting the second reference surface using the adjusted second value;

re-determining the one or more preparation reference surface sections using the first reference surface and the adjusted second reference surface;

re-determining the preparation surface of the tooth using the re-determined one or more preparation reference surface sections;

using the re-determined preparation surface of the tooth and the three-dimensional digital preparation tooth model for re-determining the tooth mass loss for the adjusted second value.

15. The method of feature combination 14, further comprising performing the adjusting of the second value selected for a restoration thickness of the dental restoration element and the determining of the effect on the tooth mass loss iteratively until one or more predefined third criteria are satisfied.

16. The method of feature combination 15, the one or more predefined third criteria comprising one or more of the following criteria: the adjusted second reference surface comprising no sections extending below the first reference surface due to the iterative one or more iterative adjustments; the re-determining tooth mass loss being equal to the basic tooth mass loss; the re-determined tooth mass loss reaching a minimum; the adjustment of the second value reaching a predefined third threshold; the iteration reaching a predefined third maximum number of iteration steps.

17. The method of any of feature combinations 3 to 16, further comprising controlling a manufacturing device for manufacturing on or more of the following: a positive of at least a part of the prepared tooth in form of a physical copy of at least a part the three-dimensional digital preparation tooth model, a negative of the at least a part of the prepared tooth in form of a physical copy of at least a part of a three-dimensional digital negative of the three-dimensional digital preparation tooth model.

18. The method of any of feature combinations 3 to 17, further comprising using the preparation surface of the tooth and the restoration surface of the dental restoration element for generating a three-dimensional digital dental restoration model defining a form of the dental restoration element.

19. The method of feature combination 18, further comprising controlling the manufacturing device for manufacturing the dental restoration element in form of a physical copy of the three-dimensional digital dental restoration model.

20. The method of any of the previous feature combinations, the dental restoration element being one of the following: a veneer, an inlay, an onlay, an overlay, a crown, a bridge, a mockup, a waxup, a provisional.

21. A computer program product for determining a preparation surface of a tooth for preparing the tooth for receiving a dental restoration element, the computer program product comprising a computer readable storage medium having program instructions embodied therewith, the program instructions being executable by a processor of a computer device to cause the computer device to:

receive a three-dimensional digital tooth model, the three-dimensional digital tooth model being descriptive of a current form and of a position of the tooth within a dental situation of a patient;

receive a three-dimensional digital restorative tooth model, the three-dimensional digital restorative tooth model defining a preliminary target form of the tooth to be achieved by applying the dental restoration element;

receive a definition of a restoration area indicative of a surface area of the tooth, at which the dental restoration element is to be arranged;

receive a first value selected for a basic preparation depth of the preparation within the restoration area of the three-dimensional digital tooth model;

receive a second value selected for a restoration thickness of the dental restoration element;

determine a first reference surface using an inward projection of the restoration area of the three-dimensional digital tooth model into the three-dimensional digital tooth model depending on the first value selected for the basic preparation depth;

determine a second reference surface using an inward projection of a surface section of the three-dimensional digital restorative tooth model overlapping with the restoration area into the three-dimensional digital restorative tooth model depending on the second value selected for the restoration thickness;

determine one or more preparation reference surface sections using the first and second reference surface, determine the preparation surface of the tooth using the determined one or more preparation reference surface sections.

22. A computer program for determining a preparation surface of a tooth for preparing the tooth for receiving a dental restoration element, the computer program comprising program instructions embodied therewith, the program instructions being executable by a processor of a computer device to cause the computer device to:

receive a three-dimensional digital tooth model, the three-dimensional digital tooth model being descriptive of a current form and of a position of the tooth within a dental situation of a patient;

receive a three-dimensional digital restorative tooth model, the three-dimensional digital restorative tooth model defining a preliminary target form of the tooth to be achieved by applying the dental restoration element;

receive a definition of a restoration area indicative of a surface area of the tooth, at which the dental restoration element is to be arranged;

receive a first value selected for a basic preparation depth of the preparation within the restoration area of the three-dimensional digital tooth model;

receive a second value selected for a restoration thickness of the dental restoration element;

determine a first reference surface using an inward projection of the restoration area of the three-dimensional digital tooth model into the three-dimensional digital tooth model depending on the first value selected for the basic preparation depth;

determine a second reference surface using an inward projection of a surface section of the three-dimensional digital restorative tooth model overlapping with the restoration area into the three-dimensional digital restorative tooth model depending on the second value selected for the restoration thickness;

determine one or more preparation reference surface sections using the first and second reference surface, determine the preparation surface of the tooth using the determined one or more preparation reference surface sections.

23. A computer device for determining a preparation surface of a tooth for preparing the tooth for receiving a dental restoration element, the computer device comprising a processor and a memory storing program instructions executable by the processor, execution of the program instructions by the processor causing the computer device to:

receive a three-dimensional digital tooth model, the three-dimensional digital tooth model being descriptive of a current form and of a position of the tooth within a dental situation of a patient;

receive a three-dimensional digital restorative tooth model, the three-dimensional digital restorative tooth model defining a preliminary target form of the tooth to be achieved by applying the dental restoration element;

receive a definition of a restoration area indicative of a surface area of the tooth, at which the dental restoration element is to be arranged;

receive a first value selected for a basic preparation depth of the preparation within the restoration area of the three-dimensional digital tooth model;

receive a second value selected for a restoration thickness of the dental restoration element;

determine a first reference surface using an inward projection of the restoration area of the three-dimensional digital tooth model into the three-dimensional digital tooth model depending on the first value selected for the basic preparation depth;

determine a second reference surface using an inward projection of a surface section of the three-dimensional digital restorative tooth model overlapping with the restoration area into the three-dimensional digital restorative tooth model depending on the second value selected for the restoration thickness;

determine one or more preparation reference surface sections using the first and second reference surface,

determine the preparation surface of the tooth using the determined one or more preparation reference surface sections.

24. A system comprising the computer device of feature combination 23, the system further comprising a manufacturing device configured for manufacturing the dental restoration element, execution of the program instructions by the processor further causing the computer device to:

use the preparation surface of the tooth and the restoration surface of the dental restoration element for generating a three-dimensional digital dental restoration model defining a form of the dental restoration element;

control the manufacturing device for manufacturing the dental restoration element in form of a physical copy of the three-dimensional digital dental restoration model.

REFERENCE SIGNS LIST 10 computer device
11 manufacturing system
14 external device
16 processing unit
18 bus
20 network adapter
22 I/O interface
24 display
28 memory
30 RAM
32 cache
34 storage system
40 program
42 program module
50 user interface
52 control elements
54 hardware device
56 keyboard
58 mouse
59 scanner
60 3D printing device
62 printing element
70 machining device
72 machining tool
74 holding device
76 blank
78 raw material
100 3D digital tooth model
102 3D digital gingiva model
104 boundary
106 3D digital restorative tooth model
108 first reference surface
110 second reference surface
112 first value
114 second value
116 third reference surface
118 third value
120 restoration surface
122 preparation surface
124 3D digital preparation tooth model
126 3D digital restoration model
128 3D digital core model
130 tooth mass loss
140 dental restoration element
142 prepared tooth 144 insertion direction
146 section of 3D digital preparation tooth model
148 undercut
150 defect

The invention claimed is:

1. A method for determining a preparation surface of a tooth for preparing the tooth for receiving a dental restoration element, the method comprising:

receiving a three-dimensional digital tooth model, the three-dimensional digital tooth model being descriptive of a current form and of a position of the tooth to be prepared within a dental situation of a patient;

receiving a three-dimensional digital restorative tooth model, the three-dimensional digital restorative tooth model defining a preliminary target form of the tooth to be achieved by applying the dental restoration element;

receiving a definition of a restoration area indicative of a surface area of the three-dimensional digital tooth model of the tooth to be prepared, at which the dental restoration element is to be arranged;

receiving a first value selected for a basic preparation depth of the preparation to be executed within the restoration area of the three-dimensional digital tooth model of the tooth to be prepared;

receiving a second value selected for a restoration thickness of the dental restoration element;

determining a first reference surface using an inward projection of the restoration area of the three-dimensional digital tooth model of the tooth to be prepared into the three-dimensional digital tooth model depending on the first value selected for the basic preparation depth;

determining a second reference surface using an inward projection of a surface section of the three-dimensional digital restorative tooth model overlapping with the restoration area of the three-dimensional digital tooth model of the tooth to be prepared into the three-dimensional digital restorative tooth model depending on the second value selected for the restoration thickness, the second reference surface intersecting the first reference surface one or more times;

determining one or more preparation reference surface sections using the first and second reference surface, determining the preparation surface for preparing the tooth to be prepared using the determined one or more preparation reference surface sections.

2. The method of claim 1, each of the determined preparation reference surface sections satisfying one of the following criteria:

the preparation reference section being a section of the first reference surface extending below the second reference surface;

the preparation reference surface section being a section of the first reference surface coinciding with a section of the second reference surface;

the preparation reference surface section being a section of the second reference surface extending below the first reference surface.

3. The method of claim 1, further comprising:

receiving a third value selected for a required material thickness of the dental restoration element;

determining a third reference surface using an outward projection of the preparation surface depending on the third value selected for the required material thickness;

determining one or more restoration reference surface sections using the three-dimensional digital restorative tooth model and the third reference surface;

determining a restoration surface of the dental restoration element using the one or more restoration reference surface sections.

4. The method of claim 3, each of the determined restoration reference surface sections satisfying one of the following criteria:

the restoration reference surface sections being a section of the third reference surface extending out of the three-dimensional digital restorative tooth model;

the restoration reference surface sections being a section of the third reference surface coinciding with a surface section of the three-dimensional digital restorative tooth model;

the restoration reference surface sections being a surface section of the three-dimensional digital restorative tooth model extending above the third reference surface.

5. The method of claim 1, further comprising determining a three-dimensional digital core model of a core of the three-dimensional digital tooth model to be excluded from preparation, the determining of the one or more preparation reference surface sections further using the determined three-dimensional digital core model, one or more of the determined one or more preparation reference surface sections being a surface section of the three-dimensional digital core model extending out of one or more of the following: the first reference surface, the second reference surface.

6. The method of claim 1, further comprising using the preparation surface and the three-dimensional digital tooth model for generating a three-dimensional digital preparation tooth model defining a form of the prepared tooth.

7. The method of claim 1, further comprising using the preparation surface of the tooth and the three-dimensional digital preparation tooth model for determining a tooth mass loss resulting from preparing the preparation surface.

8. The method of claim 7, further comprising for reducing the tooth mass loss:

adjusting a position of the three-dimensional digital restorative tooth model relative to the position of the tooth;

determining an effect of the adjusting of the position of the three-dimensional digital restorative tooth model on the tooth mass loss, the determining of the effect on the tooth mass loss comprising:

adjusting the second reference surface for the adjusted position of the three-dimensional digital restorative tooth model;

re-determining the one or more preparation reference surface sections using the first reference surface and the adjusted second reference surface;

re-determining the preparation surface of the tooth using the re-determined one or more preparation reference surface sections;

using the re-determined preparation surface of the tooth and the three-dimensional digital preparation tooth model for re-determining the tooth mass loss for the adjusted position of the three-dimensional digital restorative tooth model.

9. The method of claim 8, further comprising performing the adjusting of the position of the three-dimensional digital restorative tooth model and the determining of the effect on the tooth mass loss iteratively until one or more predefined first criteria are satisfied.

10. The method of claim 9, the one or more predefined first criteria comprising one or more of the following criteria: the adjusted second reference surface comprising no sections extending below the first reference surface due to the iterative one or more iterative adjustments; the re-determining tooth mass loss being equal to a basic tooth mass loss determined using the first reference surface and the three-dimensional digital preparation tooth model; the re-determined tooth mass loss reaching a minimum; the adjustment of the position of the three-dimensional digital restorative tooth model reaching a predefined first threshold; the iteration reaching a predefined first maximum number of iteration steps.

11. The method of claim 7, further comprising for reducing the tooth mass loss:

adjusting the definition of the preliminary target form of the tooth by adjusting a form of the three-dimensional digital restorative tooth model;

determining an effect of the adjusting of the form of the three-dimensional digital restorative tooth model on the tooth mass loss, the determining of the effect on the tooth mass loss comprising:

adjusting the second reference surface for the adjusted form of the three-dimensional digital restorative tooth model;

re-determining the one or more preparation reference surface sections using the first reference surface and the adjusted second reference surface;

re-determining the preparation surface of the tooth using the re-determined one or more preparation reference surface sections;

using the re-determined preparation surface of the tooth and the three-dimensional digital preparation tooth model for re-determining the tooth mass loss for the adjusted form of the three-dimensional digital restorative tooth model.

12. The method of claim 11, further comprising performing the adjusting of the form of the three-dimensional digital restorative tooth model and the determining of the effect on the tooth mass loss iteratively until one or more predefined second criteria are satisfied.

13. The method of claim 12, the one or more predefined second criteria comprising one or more of the following criteria: the adjusted second reference surface comprising no sections extending below the first reference surface due to the iterative one or more iterative adjustments; the re-determining tooth mass loss being equal to the basic tooth mass loss; the re-determined tooth mass loss reaching a minimum; the adjustment of the form of the three-dimensional digital restorative tooth model reaching a predefined second threshold; the iteration reaching a predefined second maximum number of iteration steps.

14. The method of claim 7, further comprising for reducing the tooth mass loss:

adjusting the second value selected for the restoration thickness of the dental restoration element;

determining an effect of the adjusting of the second value on the tooth mass loss, the determining of the effect on the tooth mass loss comprising:

adjusting the second reference surface using the adjusted second value;

re-determining the one or more preparation reference surface sections using the first reference surface and the adjusted second reference surface;

re-determining the preparation surface of the tooth using the re-determined one or more preparation reference surface sections;

using the re-determined preparation surface of the tooth and the three-dimensional digital preparation tooth model for re-determining the tooth mass loss for the adjusted second value.

15. The method of claim 14, further comprising performing the adjusting of the second value selected for a restoration thickness of the dental restoration element and the determining of the effect on the tooth mass loss iteratively until one or more predefined third criteria are satisfied.

16. The method of claim 15, the one or more predefined third criteria comprising one or more of the following criteria: the adjusted second reference surface comprising no sections extending below the first reference surface due to the iterative one or more iterative adjustments; the re-determining tooth mass loss being equal to the basic tooth mass loss; the re-determined tooth mass loss reaching a minimum; the adjustment of the second value reaching a predefined third threshold; the iteration reaching a predefined third maximum number of iteration steps.

17. The method of claim 6, further comprising controlling a manufacturing device for manufacturing on or more of the following: a positive of at least a part of the prepared tooth in form of a physical copy of at least a part the three-dimensional digital preparation tooth model, a negative of the at least a part of the prepared tooth in form of a physical copy of at least a part of a three-dimensional digital negative of the three-dimensional digital preparation tooth model.

18. The method of claim 3, further comprising using the preparation surface of the tooth and the restoration surface of the dental restoration element for generating a three-dimensional digital dental restoration model defining a form of the dental restoration element.

19. The method of claim 18, further comprising controlling the manufacturing device for manufacturing the dental restoration element in form of a physical copy of the three-dimensional digital dental restoration model.

20. The method of claim 1, the dental restoration element being one of the following: a veneer, an inlay, an onlay, an overlay, a crown, a bridge, a mockup, a waxup, a provisional.

21. A computer program product for determining a preparation surface of a tooth for preparing the tooth for receiving a dental restoration element, the computer program product comprising a computer readable storage medium having program instructions embodied therewith, the program instructions being executable by a processor of a computer device to cause the computer device to:

receive a three-dimensional digital tooth model, the three-dimensional digital tooth model being descriptive of a current form and of a position of the tooth to be prepared within a dental situation of a patient;

receive a three-dimensional digital restorative tooth model, the three-dimensional digital restorative tooth model defining a preliminary target form of the tooth to be achieved by applying the dental restoration element;

receive a definition of a restoration area indicative of a surface area of the three-dimensional digital tooth model of the tooth to be prepared, at which the dental restoration element is to be arranged;

receive a first value selected for a basic preparation depth of the preparation to be executed within the restoration area of the three-dimensional digital tooth model of the tooth to be prepared;

receive a second value selected for a restoration thickness of the dental restoration element;

determine a first reference surface using an inward projection of the restoration area of the three-dimensional digital tooth model of the tooth to be prepared into the three-dimensional digital tooth model depending on the first value selected for the basic preparation depth;

determine a second reference surface using an inward projection of a surface section of the three-dimensional digital restorative tooth model overlapping with the restoration area of the three-dimensional digital tooth model of the tooth to be prepared into the three-dimensional digital restorative tooth model depending on the second value selected for the restoration thickness, the second reference surface intersecting the first reference surface one or more times;

determine one or more preparation reference surface sections using the first and second reference surface, determine the preparation surface for preparing the tooth to be prepared using the determined one or more preparation reference surface sections.

22. A computer device for determining a preparation surface of a tooth for preparing the tooth for receiving a dental restoration element, the computer device comprising a processor and a memory storing program instructions executable by the processor, execution of the program instructions by the processor causing the computer device to:

receive a three-dimensional digital tooth model, the three-dimensional digital tooth model being descriptive of a current form and of a position of the tooth to be prepared within a dental situation of a patient;

receive a three-dimensional digital restorative tooth model, the three-dimensional digital restorative tooth model defining a preliminary target form of the tooth to be achieved by applying the dental restoration element;

receive a definition of a restoration area indicative of a surface area of the three-dimensional digital tooth model of the tooth to be prepared, at which the dental restoration element is to be arranged;

receive a first value selected for a basic preparation depth of the preparation to be executed within the restoration area of the three-dimensional digital tooth model of the tooth to be prepared;

receive a second value selected for a restoration thickness of the dental restoration element;

determine a first reference surface using an inward projection of the restoration area of the three-dimensional digital tooth model of the tooth to be prepared into the three-dimensional digital tooth model depending on the first value selected for the basic preparation depth;

determine a second reference surface using an inward projection of a surface section of the three-dimensional digital restorative tooth model overlapping with the restoration area of the three-dimensional digital tooth model of the tooth to be prepared into the three-dimensional digital restorative tooth model depending on the second value selected for the restoration thickness, the second reference surface intersecting the first reference surface one or more times;

determine one or more preparation reference surface sections using the first and second reference surface, determine the preparation surface for preparing the tooth to be prepared using the determined one or more preparation reference surface sections.

23. A system comprising the computer device of claim 22, the system further comprising a manufacturing device configured for manufacturing the dental restoration element, execution of the program instructions by the processor further causing the computer device to:

use the preparation surface of the tooth and the restoration surface of the dental restoration element for generating a three-dimensional digital dental restoration model defining a form of the dental restoration element;

control the manufacturing device for manufacturing the dental restoration element in form of a physical copy of the three-dimensional digital dental restoration model.

\* \* \* \* \*